(12) United States Patent
Ashrafi

(10) Patent No.: US 10,326,532 B2
(45) Date of Patent: Jun. 18, 2019

(54) SYSTEM AND METHOD PROVIDING NETWORK OPTIMIZATION FOR BROADBAND NETWORKS

(71) Applicant: NxGen Partners IP, LLC, Dallas, TX (US)

(72) Inventor: Solyman Ashrafi, Plano, TX (US)

(73) Assignee: NxGen Partners IP, LLC, Dallas, TX (US)

(*) Notice: Subject to any disclaimer, the term of this patent is extended or adjusted under 35 U.S.C. 154(b) by 0 days.

(21) Appl. No.: 16/040,814

(22) Filed: Jul. 20, 2018

(65) Prior Publication Data

US 2018/0351652 A1    Dec. 6, 2018

Related U.S. Application Data

(63) Continuation-in-part of application No. 15/689,769, filed on Aug. 29, 2017, which is a continuation-in-part of application No. 15/664,764, filed on Jul. 31, 2017, now Pat. No. 9,949,133.

(60) Provisional application No. 62/540,308, filed on Aug. 2, 2017, provisional application No. 62/381,071, filed on Aug. 30, 2016, provisional application No.
(Continued)

(51) Int. Cl.
| | |
|---|---|
| H04L 12/28 | (2006.01) |
| H04B 10/61 | (2013.01) |
| H04L 12/24 | (2006.01) |
| H04B 10/2575 | (2013.01) |
| H04J 14/02 | (2006.01) |
| H04W 24/02 | (2009.01) |
| H04W 28/02 | (2009.01) |
| G06F 9/455 | (2018.01) |

(Continued)

(52) U.S. Cl.
CPC ....... *H04B 10/616* (2013.01); *G06F 9/45558* (2013.01); *H04B 10/25753* (2013.01); *H04J 3/1652* (2013.01); *H04J 14/02* (2013.01); *H04L 41/08* (2013.01); *H04L 41/5003* (2013.01); *H04W 24/02* (2013.01); *H04W 28/02* (2013.01); *G06F 2009/45595* (2013.01)

(58) Field of Classification Search
CPC . H04J 3/1652; H04W 24/02; H04B 10/25753
USPC .......................... 370/252, 254, 386
See application file for complete search history.

(56) References Cited

U.S. PATENT DOCUMENTS

| | | |
|---|---|---|
| 9,267,877 B2 | 2/2016 | Ashrafi et al. |
| 9,331,875 B2 | 5/2016 | Ashrafi et al. |

(Continued)

OTHER PUBLICATIONS

D. Katz and D. Ward; Bidirectional Forwarding Detection (BFD). RFC 5880 (Proposed Standard); Jun. 2010; Updated by RFC 7419.
(Continued)

*Primary Examiner* — John Pezzlo

(57) ABSTRACT

A backhaul network comprises at least two of a distribution point, a splitter, an amplifier, a coupler and an optical network for use within the backhaul network. Predetermined locations are selected for the at least two of the distribution point, the splitter, the amplifier, the coupler and the optical network within the backhaul network based upon a constrained optimization process that reduces cost and improves backhaul network reliability. Each of the at least two of the distribution point, the splitter, the amplifier, the coupler and the optical network are located at one of the predetermined locations from the constrained optimization process.

30 Claims, 29 Drawing Sheets

Related U.S. Application Data

62/381,073, filed on Aug. 30, 2016, provisional application No. 62/371,279, filed on Aug. 5, 2016.

(51) Int. Cl.
*H04J 3/16* (2006.01)
*H04J 1/16* (2006.01)

(56) References Cited

U.S. PATENT DOCUMENTS

| | | | |
|---|---|---|---|
| 9,662,019 B2 | 5/2017 | Ashrafi et al. | |
| 2011/0243553 A1* | 10/2011 | Russell | G06Q 30/0631 398/25 |
| 2011/0285589 A1* | 11/2011 | Bull | G01S 5/0242 342/387 |
| 2012/0303835 A1 | 11/2012 | Kempf | |
| 2013/0028073 A1 | 1/2013 | Tatipamula | |
| 2013/0165177 A1 | 6/2013 | Berg | |
| 2013/0207841 A1* | 8/2013 | Negus | H04W 4/00 342/359 |
| 2013/0332359 A1 | 12/2013 | Qteishat | |
| 2014/0254373 A1 | 9/2014 | Varma | |
| 2015/0055623 A1 | 2/2015 | Li | |
| 2015/0207724 A1 | 7/2015 | Choudhury | |
| 2015/0350077 A1 | 12/2015 | Durrani | |
| 2016/0041523 A1 | 2/2016 | Ashrafi et al. | |
| 2016/0262068 A1 | 9/2016 | Won | |
| 2016/0285750 A1 | 9/2016 | Saquib | |
| 2016/0337937 A1 | 11/2016 | McCann | |
| 2017/0048290 A1 | 2/2017 | Cui | |
| 2018/0324605 A1* | 11/2018 | Agarwal | H04W 36/32 |

OTHER PUBLICATIONS

N.L.M. van Adrichem, B.J. Van Asten, and F.A. Kuipers; Fast recovery in software-defined networks; Software Defined Networks (EWSDN), 2014 Third European Workshop; pp. 61-66; Sep. 2014.
P. Sun, M. Yu, M. J. Freedman, J. Rexford, and D. Walker; Hone: Joint host-network traffic management in software-defined networks; Journal of Network and Systems Management, vol. 23, No. 2; 2015.
P. Dely, A. Kassler, and N. Bayer; Openflow for wireless mesh networks; Computer Communications and Networks (ICCCN), 2011; Proceedings of 20th International Conference; Jul. 2011.
A. Patro and S. Banerjee; Outsourcing coordination and management of home wireless access points through an open api; Computer Communications (INFOCOM); 2015 IEEE Conference on. IEEE; 2015.
K. Phemius and M. Bouet; Monitoring latency with openflow; Network and Service Management (CNSM), 2013; 9th International Conference on. IEEE; 2013.
S. Ashrafi, et al. "Performance Metrics and Design Considerations for a Free-Space Optical Orbital-Angular-Momentum-Multiplexed Communication Link," Optics Letters vol. 40 (Optical Society of America, 2015).
S. Ashrafi, et al. "Optical communications using orbital angular momentum beams," Advances in Optics and Photonics vol. 7 (Optical Society of America, 2015).
S. Ashrafi, et al. "Enhanced Spectral Efficiency of 2.36 bits/s/Hz using Multiple Layer Overlay Modulation for QPSK ever a 14-km Single Mode Fiber Link," OSA Technical Digest (Optical Society of America, 2015).
S. Ashrafi, et al. "400-Gbit/s Free Space Optical Communications Link Over 120-meter Using Multiplexing of 4 Collocated Orbital-Angular-Momentum Beams," OSA Technical Digest (Optical Society of America, 2015).
S. Ashrafi, et al, "Experimental Demonstration of Two-Mode 16-Gbit/s Free-Space mm-Wave Communications Link Using Thin Metamaterial Plates to Generate Orbital Angular Momentum Beams," (The Institute of Electrical and Electronics Engineers, 2015).
S. Ashrafi, et al. "Experimental Measurements of Multipath-Induced Intra- and Inter-Channel Crosstalk Effects in a Millimeter-Wave Communications Link using Orbital-Angular-Momentum Multiplexing," (The Institute of Electrical and Electronics Engineers, 2015).
S. Ashrafi, et al. "Demonstration of an Obstruction-Tolerant Millimeter-Wave Free-Space Communications Link of Two 1-Gbaud 16-QAM Channels using Bessel Beams Containing Orbital Angular Momentum," (Society of Photo-optical Instrumentation Engineers, 2015).
S. Ashrafi, et al. "Acoustically Induced Stresses in Elastic Cylinders and their Visualization," (Acoustical Society of America, 1987).
S. Ashrafi, et al. "Spurious Resonances and Modelling of Composite Resonators," (The Institute of Electrical and Electronics Engineers, 1983).
S. Ashrafi, et al. "Splitting and Contrary Motion of Coherent Bremsstrahlung Peaks in Strained-Layer Superlattices," (Optical Society of America, 1991).
S. Ashrafi, et al. "Channeling Radiation of Electrons in Crystal Lattices," Essays on Classical and Quantum Dynamics, Chap. 12 (1991).
S. Ashrafi, et al. "Splitting of Channeling-Radiation Peaks in Strained-Layer Superlattices," Journal vol. 8 (Optical Society of America, 1991).
S. Ashrafi, et al. "Evidence of Chaotic Pattern in Solar Flux Through a Reproducible Sequence of Period-Doubling-Type Bifurcations," Technical Report (National Aeronautics and Space Administration, 1991).
S. Ashrafi, et al. "Lyapunov Exponent of Solar Flux Time Series," (Proceedings of First Experimental Chaos Conference, 1991).
S. Ashrafi, et al, "Combining Schatten's Solar Activity Prediction Model with a Chaotic Prediction Model," Technical Report (National Aeronautics and Space Administration, 1991).
S. Ashrafi, et al, "Future Mission Studies: Forecasting Solar Flux Directly from its Chaotic Time Series," Technical Report (National Aeronautics and Space Administration, 1991).
S. Ashrafi, et al, "Future Mission Studies: Preliminary Comparisons of Solar Flux Models," Technical Report (National Aeronautics and Space Administration, 1991).
S. Ashrafi, et al, "Nonlinear Techniques for Forecasting Solar Activity Directly From its Time Series," Technical Report (National Aeronautics and Space Administration, 1992).
S. Ashrafi, et al, "Detecting and Disentangling Nonlinear Structure from Solar Flux Time Series," Conference Paper (National Aeronautics and Space Administration, 1993).
S. Ashrafi, et al, "Solar Flux Forecasting Using Mutual Information with an Optimal Delay," Conference Paper (National Aeronautics and Space Administration, 1993).
S. Ashrafi, et al, "PCS System Design Issues in the Presence of Microwave OFS," Electromagnetic Wave Interaction: Series on Stability, Vibration and Control of Systems: vol. 12 (1996).
S. Ashrafi, et al, "Performance Enhancement of an Orbital-Angular-Momentum-Based Free-Space Optical Communication Link Through Beam Divergence Controlling," OSA Technical Digest (Optical Society of America, 2015).
S. Ashrafi, et al, "Demonstration of Distance Emulation for an Orbital-Angular-Momentum Beam," OSA Technical Digest (Optical Society of America, 2015).
S. Ashrafi, et al, "Free-Space Optical Communications Using Orbital-Angular-Momentum Multiplexing Combined with MIMO-Based Spatial Multiplexing," OSA Technical Digest (Optical Society of America, 2015).
S. Ashrafi, et al, "Experimental Demonstration of a 400-Gbit/s Free Space Optical Link Using Multiple Orbital-Angular-Momentum Beams with Higher Order Radial Indices," OSA Technical Digest (Optical Society of America, 2015).
A. Doria et al.; General switch management protocol (GSMP) V3; Tech. Rep., 2002; doi: http://dx.doi.org/10.17487/RFC3292.
T. Wu, L. Rui, A. Xiong, and S. Guo; An automation PCI allocation method for eNodeB and home eNodeB cell; Proc. IEEE 6th Int. Conf. Wireless Commun. Netw. Mobile Comput. (WiCOM); Sep. 2010, pp. 1-4.

(56) References Cited

OTHER PUBLICATIONS

A. Berl, H. de Meer, H. Hlavacs, and T. Treutner; Virtualization in energy-efficient future home environments; IEEE Commun. Mag., vol. 47, No. 12, pp. 62-67, Dec. 2009.

R. Mortier et al.; Control and understanding: Owning your home net-work; Proc. IEEE 4th Int. Conf. Commun. Syst. Netw. (COMSNETS), Jan. 2012, pp. 1-10.

H. Ludwig et al.; Web service level agreement (WSLA) language specification; IBM Corp., New York, NY, USA; Tech. Rep., 2003, pp. 815-824.

F. T. Leighton and D. M. Lewin; Content delivery network using edge-of-network servers for providing content delivery to a set of participating content providers; U.S. Pat. No. 6,553,413, Apr. 22, 2003.

E. D. Zwicky, S. Cooper, and D. B. Chapman; Building Internet Firewalls; Sebastopol, CA, USA: O'Reilly Media, 2000.

H. Hawilo, A. Shami, M.Mirahmadi, and R. Asal; NFV: State of the art, challenges, and implementation in next generation mobile net-works (vEPC); IEEE Netw., vol. 28, No. 6, pp. 18-26, Nov./Dec. 2014.

A. Gember et al. (2013); Stratos: A network-aware orchestration layer for virtual middleboxes in clouds; [Online]. Available: http://arxiv.org/abs/1305.0209.

J. Case, M. Fedor, M. Schoffstall, and J. Davin; A Simple Network Management Protocol (SNMP); document 1157, 1989.

N. Handigol, S. Seetharaman, M. Flajslik, N. McKeown, and R. Johari; Plug-n-serve: Load-balancing Web traffic using OpenFlow; Proc. ACM SIGCOMM Demo, 2009, pp. 1-2.

A. Doria et al.; Forwarding and Control Element Separation (ForCES) Protocol Specification; document 5810; 2010.

B. Raghavan, M. Casado, T. Koponen, S. Ratnasamy, A. Ghodsi, and S. Shenker; Software-defined Internet architecture: Decoupling archi-tecture from infrastructure; Proc. 11th ACM Workshop Hot Topics Netw., 2012, pp. 43-48.

R. Bifulco, R. Canonico, M. Brunner, P. Hasselmeyer, and F. Mir; A practical experience in designing an OpenFlow controller; Proc. IEEE Eur. Workshop Softw. Defined Netw. (EWSDN), Oct. 2012, pp. 61-66.

Gu et al.; Serverswitch: A programmable and high performance platform for data center networks; Proc. NSDI, vol. 11. 2011, pp. 1-14.

D. Drutskoy, E. Keller, and J. Rexford; Scalable network virtualization in software-defined networks; IEEE Internet Comput., vol. 17, No. 2, pp. 20-27, Mar./Apr. 2013.

N. McKeown et al.; OpenFlow: Enabling innovation in campus net-works; ACM SIGCOMM Comput. Commun. Rev., vol. 38, No. 2, pp. 69-74, 2008.

A. Dixit, F. Hao, S. Mukherjee, T. V. Lakshman, and R. Kompella; Towards an elastic distributed SDN controller; Proc. 2nd ACM SIGCOMM Workshop Hot Topics Softw. Defined Netw., 2013, pp. 7-12.

D. Joseph and I. Stoica; Modeling middleboxes; IEEE Netw., vol. 22, No. 5, pp. 20-25, Sep./Oct. 2008.

J. Martins et al.; ClickOS and the art of network function virtualization; Proc. 11th USENIX Symp. Netw. Syst. Design Implement. (NSDI), Seattle, WA, USA, 2014, pp. 459-473.

P. Quinn and T. Nadeau; Service Function Chaining Problem Statement; document draft-quinn-sfc-problem-statement-02, 2013.

Y. Li, M. Chen; Software-Defined Network Function Virtualization: A Survey; IEEE 2015, pp. 2169-3536.

A. Hurtado-Borras, J. Pala-Sole, D. Camps-Mur, and S. Sallent-Ribes; sdn wireless backhauling or small cells; Communications (ICC); 2015 IEEE International Conference; pp. 3897-3902; Jun. 2015.

Kari Seppänen, Jorma Kilpi, and Tapio Suihko; Integrating wmn based mobile backhaul with sdn control; Mob.Netw. Appl., 20(1):32-39; Feb. 2015.

Open Networking Foundation; Openflow switch specification; Version 1.1.0 implemented (wire protocol 0x02).

\* cited by examiner

SYSTEM AND METHOD PROVIDING NETWORK OPTIMIZATION FOR BROADBAND NETWORKS

CROSS-REFERENCE TO RELATED APPLICATIONS

This application claims the benefit of U.S. Provisional Application No. 62/540,308, filed Aug. 2, 2017 and entitled OPTIMUM FIBER LINKS FOR ALL BROADBAND ACCESS. This application is also a Continuation In Part of U.S. patent application Ser. No. 15/664,764, filed Jul. 31, 2017 and entitled ULTRA-BROADBAND VIRTUALIZED TELECOM AND INTERNET, now U.S. Pat. No. 9,949,133 issued Apr. 17, 2018, which U.S. patent application Ser. No. 15/664,764 claims the benefit of U.S. Provisional Application No. 62/371,279, filed Aug. 5, 2016 and entitled ULTRA-BROADBAND VIRTUALIZED TELECOM AND INTERNET. This application is also a Continuation In Part of U.S. patent application Ser. No. 15/689,769 filed Aug. 29, 2017 and entitled USING LTE CONTROL CHANNEL TO SEND OPENFLOW MESSAGE DIRECTLY TO SMALL CELLS TO REDUCE LATENCY IN AN SDN-BASED MULTI-HOP WIRELESS BACKHAUL NETWORK, which published as U.S. Patent Publication No. US 2018-0063848 A1 on Mar. 1, 2018, which U.S. patent application Ser. No. 15/689,769 claims the benefit of U.S. Provisional Application No. 62/381,073, filed Aug. 30, 2016 and entitled USING LTE CONTROL CHANNEL TO SEND OPENFLOW MESSAGE DIRECTLY TO SMALL CELLS TO REDUCE LATENCY IN AN SDN-BASED MULTI-HOP WIRELESS BACKHAUL NETWORK and which U.S. patent application Ser. No. 15/689,769 also claims the benefit of U.S. Provisional Application No. 62/381,071 filed Aug. 30, 2016 and entitled AN SDN-BASED CHANNEL ESTIMATION FOR MULTIPLEXING BETWEEN LOS MMWAVES, NLOS SUB-6 GHZ AND FSO. U.S. Patent Application Nos. 62/540,308; 15/664,764; 62/371,279; 15/689,769; 62/381,073; 62/381,071; U.S. Pat. No. 9,949,133; and U.S. Patent Publication No. US 2018-0063848 A1 are incorporated by reference herein in their entirety.

TECHNICAL FIELD

The present invention relates to broadband network configuration, and more particularly, to a system and method for optimizing selection and placement of network components within a broadband network.

BACKGROUND

The expansion of applications and data that are being implemented using data networks interconnected via the Internet have vastly expanded the need for broadband data transmission capabilities. Data streaming of audio and video files and the never ending increase in network data applications have greatly strained the resources provided by broadband networks requiring optimization of network capabilities by the broadband system providers. One manner for improving broadband network capabilities is optimizing resources and placement during the construction of broadband access networks. Thus, some tool enabling a most optimal creation of a broadband access network would greatly benefit broadband access providers such that they were able to maximize their data throughput and reliability based upon allocated system resources.

SUMMARY

The present invention, as disclosed and described herein, in one aspect thereof comprise a backhaul network including at least two of a distribution point, a splitter, an amplifier, a coupler and an optical network for use within the backhaul network. Predetermined locations are selected for the at least two of the distribution point, the splitter, the amplifier, the coupler and the optical network within the backhaul network based upon a constrained optimization process that reduces cost and improves backhaul network reliability. Each of the at least two of the distribution point, the splitter, the amplifier, the coupler and the optical network are located at one of the predetermined locations from the constrained optimization process.

BRIEF DESCRIPTION OF THE DRAWINGS

For a more complete understanding, reference is now made to the following description taken in conjunction with the accompanying Drawings in which:

FIG. 26 illustrates a block diagram of a Backhaul Network Key Performance Indicator;

DETAILED DESCRIPTION

Figure 1:
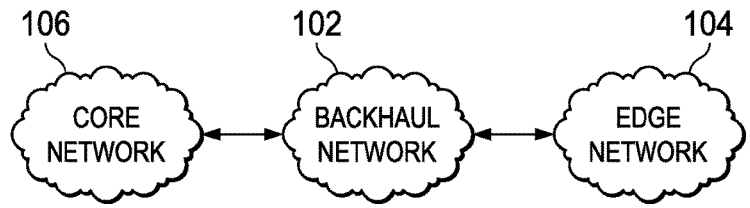
FIG. 1 illustrates the manner in which a backhaul network interconnects an edge network and a core network.

Referring now to the drawings, wherein like reference numbers are used herein to designate like elements throughout, the various views and embodiments of a system and method providing network optimization for broadband networks is illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated the manner in which a backhaul network 102 is used for interconnecting an edge network 104 with a core network 106. In a hierarchical network the backhaul network 102 comprises the intermediate links between the core network 106 (backbone network) and the small subnetworks at the edge of the entire hierarchical network. The backhaul network 102 carries packets/data to and from the core network 106. For example, in a telecommunications network cell phones communicating with a cell tower constitute a local subnetwork. The connection between the cell tower and the rest of the world begins with a backhaul links to the core of the Internet service provider network. Backhaul networks 102 may be used to describe the entire wired part of the network, although some networks have wireless instead of wired backhaul, in whole or in part, for example using microwave bands, mesh networks and edge network topologies. The backhaul network 102 may use high-capacity wireless channels to get packets to the microwave or fiber links.

Backhaul networks 102 may use a variety of technologies. The choice of backhaul technology must take into account parameters such as capacity, cost, reach and the need for such resources as frequency spectrum, optical fiber, wiring or rights-of-way. Generally, backhaul solutions can largely be categorized into wired (leased lines or copper/fiber) or wireless (point-to-point, point to multipoint over high-capacity radio links). Wired solutions are usually very expensive and often impossible to deploy in remote areas. This makes wireless a more suitable and/or viable option. Multi-hop wireless architecture can overcome the hurdles of wired solutions by creating efficient large coverage areas with growing demand in emerging markets where cost is often a major factor in deciding technologies. Wireless backhaul solutions are able to offer carrier grade services which are not easily feasible with wired backhaul connectivity. Backhaul technologies include free space optics, point-to-point microwave radio relay transmission (terrestrial or by satellite), point to multipoint microwave access technologies, such as LMDS, Wi-Fi, WiMAX, DSL variants such as ADSL and SHDSL, PDH and SDH Lasse Esso and ET interfaces, such as (fractional) E1/T1, E3, T3, STM-1/OC-3, etc. and ethernet. The system such as that more fully herein below may also be used within the systems such as that describe in U.S. patent application Ser. No. 14/882,085 entitled APPLICATION OF ORBITAL ANGULAR MOMENTUM TO FIBER, FSO AND RF filed on Oct. 15, 2015 which is incorporated herein by reference in its entirety to transmit information.

In addition to the plane wave embodiments that are disclosed in the described system for SDN-based channel estimation for multiplexing between LOS mmWaves, NLOS sub-6 GHz and FSO described herein, a system for implementing the twisted waves generated by the application of orthogonal functions to a plane wave may also be utilized. For example, the various embodiments disclosed in U.S. patent application Ser. No. 15/216,474 entitled SYSTEM AND METHOD FOR COMBINING MIMO AND MODE-DIVISION MULTIPLEXING filed on Jul. 21, 2016 and U.S. patent application Ser. No. 15/144,297 entitled SYSTEM AND METHOD FOR COMMUNICATION USING ORBITAL ANGULAR MOMENTUM WITH MULTIPLE LAYER OVERLAY MODULATION filed on May 2, 2016, each of which is incorporated herein by reference in their entirety may be used.

Hybrid (Heterogeneous) networks consist of networks including devices wherein in the components providing the transmission of data are all the same but may each be configured using the included operating software to provide different types of transmissions including but not limited to point-to-point (P2P); point-to-multipoint (P2MP); multi-point-to-multipoint (MP2MP); etc. The described system supports complex heterogeneous networks (HetNet) incorporating multiple services, standards and sites.

Architecture relates to the various system layers and their application to the system from the application layer to the hardware layer such as that described in U.S. Nonprovisional application Ser. No. 15/664,764, filed on Jul. 31, 2017, and entitled ULTRA-BROADBAND VIRTUALIZED TELECOM AND INTERNET.

Multiband as used herein relates to licensed and unlicensed bands as established in FCC regulations. Licensed bands include, but are not limited to, 24 GHz, 30 GHz, 28 GHz and sub-6 GHz. Unlicensed bands include, but are not limited to, U bands (60 GHz), E bands (71-76 GHz, 81-86 GHz) and WiFi.

Topology for systems implementing the described components may configure the nodes in a tree topology or a ring topology. The tree topology comprises a number of nodes interconnected in a tree structure beginning with a single node that expands to multiple second nodes and each of the second nodes expanding to further multiple third nodes or the single node interconnected to each of the other nodes of a network. Each of the other nodes communicates through the single central node. A ring topology includes a ring connection of all nodes with each node connected only to two adjacent nodes.

A multilayer backhaul connection network provides for communications using each of copper wire, fiber and RF transmissions. RF may use line of sight and non-line of sight transmissions. Copper may comprise vector bundled (VDSL2) and other types of transmissions. Fiber may use GPON or other types of transmissions.

When providing a variety of services over a fronthaul and/or backhaul connection network the backhaul connection network can become overburden causing it to become clogged with traffic and have greatly increased latency. Existing mobile and data networks can provide business-to-client (B2C) services such as commerce, music downloads, video streaming, gaming or social media access. The networks can also provide business-to-business (B2B) services such as IT services, finance, compliance, sales and marketing and customer services. These services are provided over fronthaul and backhaul networks using wired and wireless connections. If a large volume of voice or data services are being used at any particular time, the backhaul connection network can be overburdened and provide unacceptable services to the customers due to increased latency and delay.

Operators of the backhaul connection network face a number of challenges. These include declining margins due to the increased demand for video and cloud services creating an explosion of carried traffic. Average revenue per user does not increase linearly with carried traffic thus resulting in declining margins. Additionally, reductions in core equipment cost do not follow Moore's law. Network heterogeneity requires multiple specialized solutions/teams. Automation for configuration and provisioning of network resources increase the network costs. Additional network problems for network providers arise from the low return on investment due to the fact that networks are built for peak usage times and are over provisioned most of the time. Additionally, the current mode of operation for network providers results in slow service innovations due to the lack of network automation and service integration that results in long provisioning delays. The infrastructure is built using closed proprietary boxes. This results in inefficient utilization of radio resources, the inability to provide customization, a slowing in the creation of innovative services and the inability to support industry specific Internet of things scenarios. Thus, there is a need for an architecture for providing a backhaul network that provides more flexibility and enables better use of new protocols such as 5G.

Figure 2:
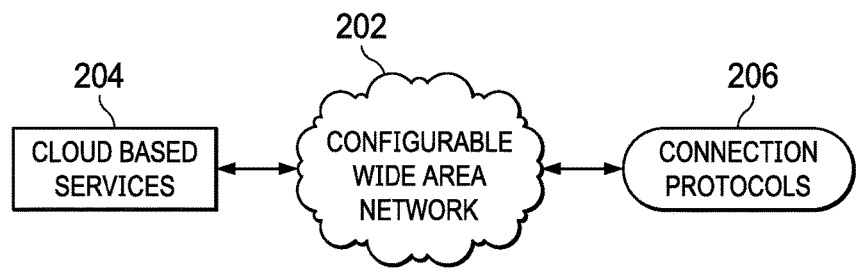
FIG. 2 illustrates a backhaul network set up as a configurable wide area network.

In order to provide a more flexible network, a backhaul connection network may be set up as a configurable wide area network 202 as illustrated in FIG. 2. The configurable wide area network 202 provides a bridge between cloud-based services 204 and various connection protocols 206. The configurable wide area network 202 provides a number of benefits including economies of scale that provides an infrastructure built with a few commodity building blocks using OpenSource SDN/NFV software and white boxes and providing agility through software platforms that enable the rapid creation of new services. This provides a UltraBroadband on demand network on both RF and fiber that uses virtual radio access network (VRAN), mobile edge computing (MEC), caching of content at the edge of the network and APIs. The system would also use CORD since it is cloud native. The system will provide SDR based massive MIMO that is used in combination with SDN based network slicing and SDN based fronthaul and backhaul networks on the network architecture.

Figure 3:
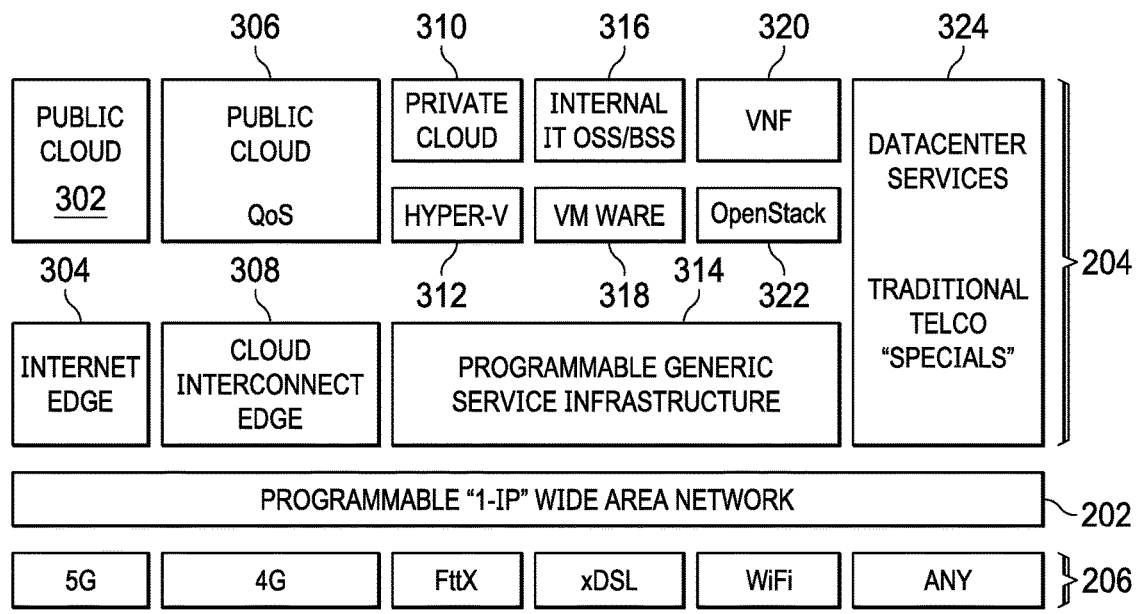
FIG. 3 illustrates a configurable wide area network interconnecting various resources through the cloud.

This is more particularly illustrated in FIG. 3. The configurable/programmable wide area network 202 varies its utilized resources based upon the particular applications or services that are being utilized. The configurable/programmable wide area network 202 may comprise any portion of a network between a user device and a data source/destination. The various cloud-based services 204 include the public cloud 302 which interconnects to the wide area network 202 through an Internet Edge 304. Internet Edge 304 is a data network to cell phones. A public cloud 306 requiring a particular quality of service may utilize the cloud interconnect edge 308. The cloud interconnect edge 308 is an optimized network that ensures accelerated access to applications hosted in public, private and hybrid clouds.

A private cloud 310 may connect to the wide area network 202 through Hyper-V 312 and a programmable generic service infrastructure 314. Hyper-V 312 is a native hypervisor that creates virtual machines on systems running Windows. It acts as a hardware virtualization component for the client editions of Windows NT server computer running Hyper-V 312 can be configured to expose individual virtual machines to one or more networks. The programmable generic service infrastructure 314 comprises a generic hardware component program to provide a particular service infrastructure. An Internet IT OSS/BSS 316 communicates through VM hardware 318 and the programmable generic service infrastructure 314 with the programmable wide area network 202. The VMware 318 comprises virtualization and cloud computing software. Virtual network functions (VNF) 320 interact with the network 202 through OpenStack 322 and the programmable generic service infrastructure 314. OpenStack 322 is a set of software tools for building and managing a cloud computing platform for public and private clouds. Finally, data center services 324 may provide data services through the wide area network 202 using traditional Telco "specials."

Figure 4:
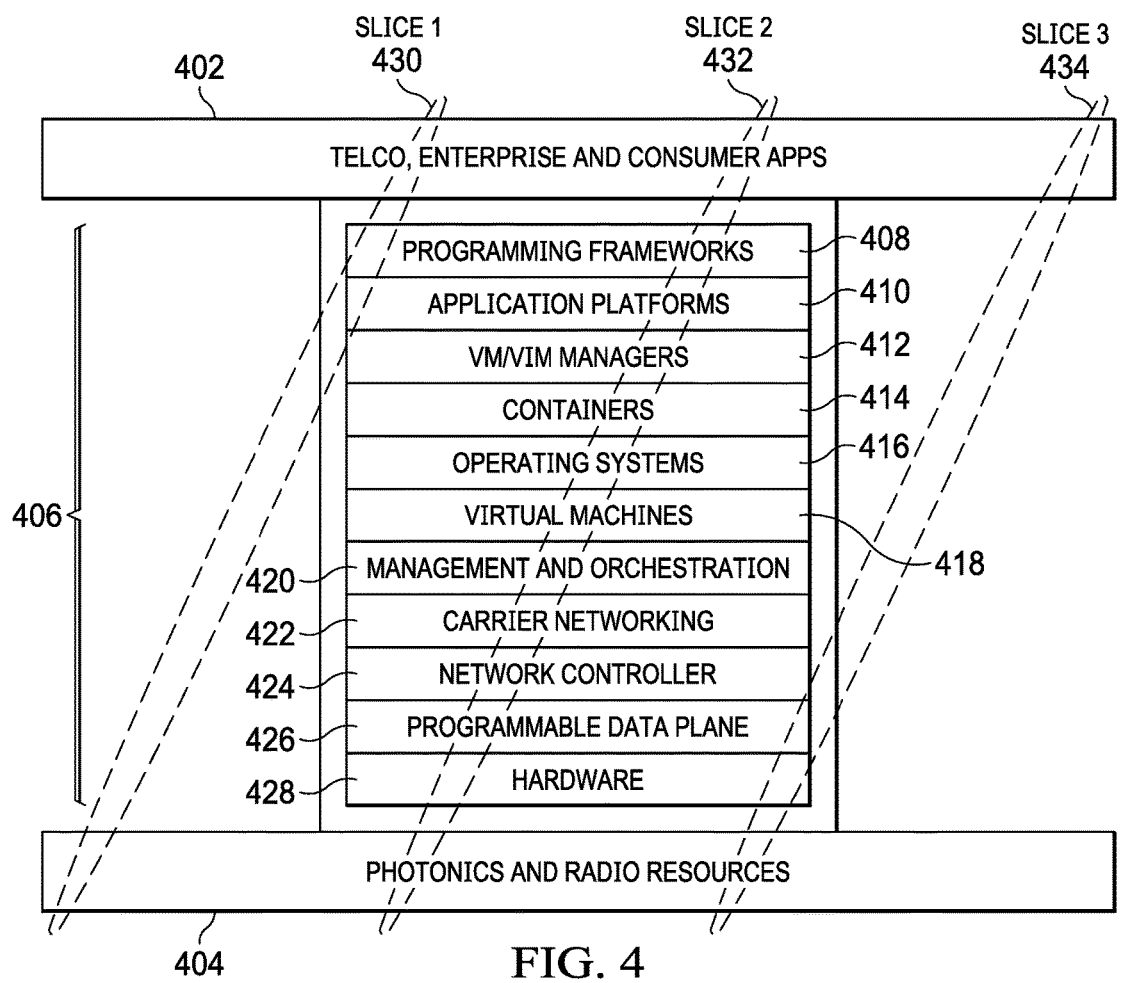
FIG. 4 illustrates one manner for implementation of the configurable network.

Referring now to FIG. 4, there is illustrated one manner in which the configurable wide area network 202 may be implemented in order to provide flexible network resources based upon an application's or service's particular needs. Various telco, enterprise and consumer applications 402 utilize various photonic and radio resources 404 through a number of control layers 406. The control layers 406 include the programming frameworks layer 408; application platforms layer 410; VM/VIM managers layer 412; containers layer 414; operating systems layer 416; virtual machines layer 418; management and orchestration layer 420; carrier network layer 422; network controller layer 724; programmable data plane layer 726 and hardware layer 428. Various portions of each of the layers 406 are needed to provide interconnection between the telco, enterprise and consumer applications 402 and the photonic and radio resources 404.

As described previously, current network topologies configure the layers to support peak periods. This requires the network to be over configured for all but a small percentage of its operating time. Each of the control layers 406 provide differing amounts of control depending upon the applications 402 and network resources 404 that are being utilized by the system. Thus, various slices of the control layers 406 are utilized when providing particular applications 402 using particular resources 404. Thus, slice 430, slice 432 and slice 434 each utilize various, differing and adaptable portions of the control layers 406 in order to operate a particular application using particular resources. These slices 430-434 can be dynamically adjusted within the system applications and resources depending upon changing system needs. Thus, a slice 430, 432, 434 can be uniquely and adaptively configured to utilize only those network control layers 406 and only those portions of the network control layers that are necessary in order to have the application function in a desired fashion. Thus, the availability of the network control layers 406 can vary depending upon the particular slices 430, 432, 434 that are being currently utilized by the network.

Figure 5:
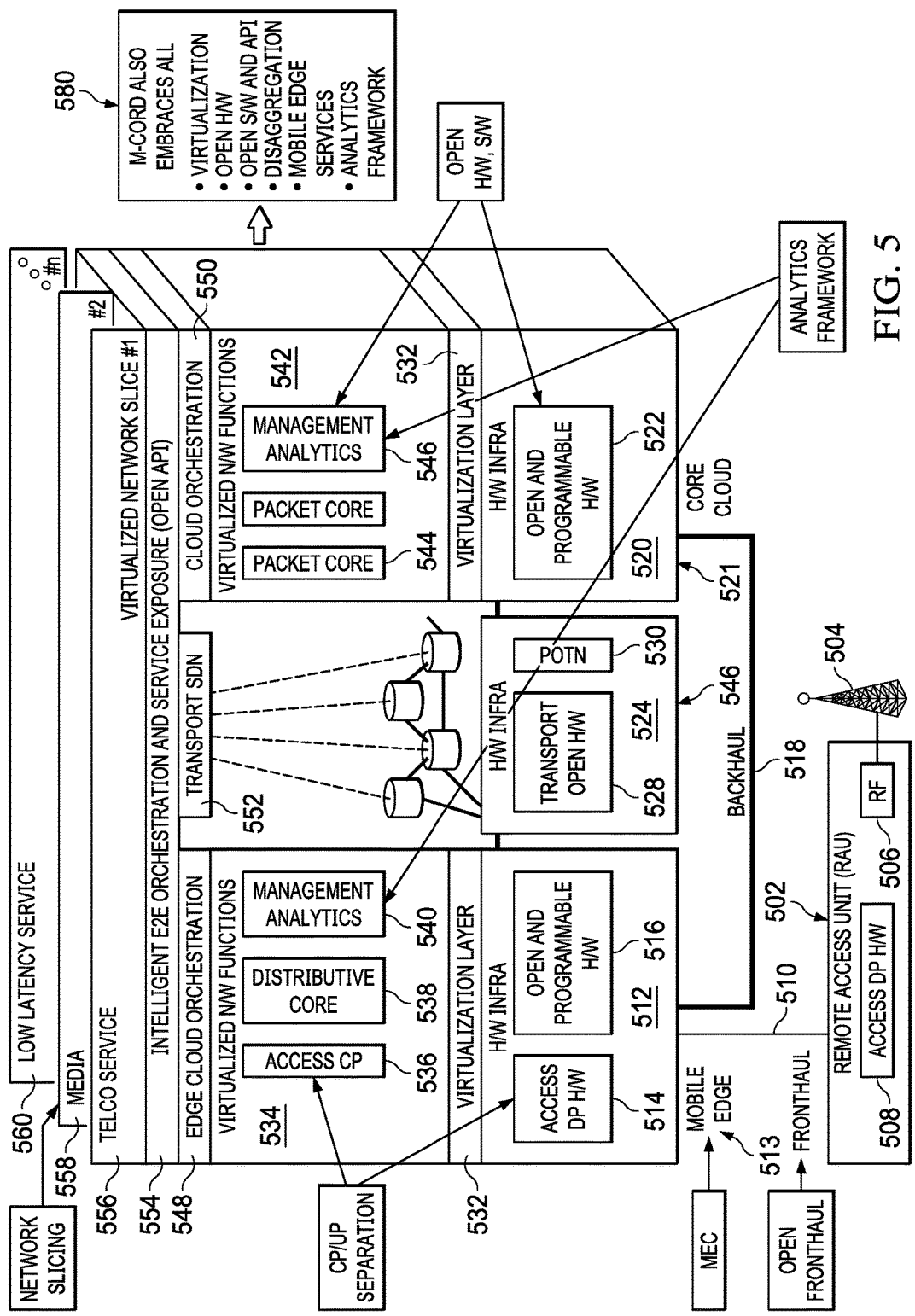
FIG. 5 illustrates a functional block diagram of a system implementing a configurable wide area network.

Referring now to FIG. 5, there is illustrated a functional block diagram of a system implementing the configurable wide area network operating in the manner described hereinabove. A radio access unit (RAU) 502 communicates with a radio antenna 504. The radio access unit 502 includes RF circuitry 506 for communicating with the radio tower and access DP hardware 508 for communicating over the fronthaul 510. A hardware infrastructure 512 associated with the mobile edge 513 includes access DP hardware 514 for communicating with the radio access unit 502. The hardware infrastructure 512 further includes open and programmable hardware 516 for providing a backhaul communications link 518 with additional hardware infrastructure 520 associated with the network core 521. The hardware infrastructure 520 associated with the network core 521 includes open and programmable hardware 522 enabling communications over the backhaul 518. Additional hardware infrastructure 524 is utilize for a transport layer 526. The hardware infrastructure 524 includes transport open hardware 528 and a POTN (packet optical transport network) 530.

Each of the mobile edge network 513 and core cloud network 521 include a virtualization layer 532 on top of the hardware infrastructures 512, 520, respectively. On top of the virtualization layer 532 associated with the mobile edge network 513, a number of virtualized network functions 534 reside. These virtualized network functions 534 include access CP functions 536, distributive core functions 538 and management analytics 540. Another group of virtualized network functions 542 exist upon the virtualization layer 532 within the core cloud network 521. These functions include packet core functions 544 and management analytics 546.

On top of the virtualized network functions 534, edge cloud orchestration functionalities 548 are implemented within the core cloud network 521. Cloud orchestration functionalities 550 are implemented on top of the virtualized network functions 542. Additionally, within the transport layer 526, a transport software defined network 552 enables control of transport between the mobile edge 513 and core cloud 521. The use of software defined networks will be more fully discussed herein below.

On top of each of the orchestration and SDN layers is an intelligent E2E orchestration and service exposure (open API) 554. Through this open API 554, the virtualized network slices 556-560 may be utilized to implement only those network functionalities that are necessary to carry out particular applications using specific hardware resources. Examples of these type of network slices include Telco (telecommunication) services 556; media services 558, such as various types of video streaming; and various types of low latency services 560 that do not require a high latency level in order to perform their functionalities. Each of the slices 556-560 would only utilize as much of the network services within the mobile edge 513, core cloud 521 and transport layer 526 in order to achieve the operations virtualized by each network slice.

Figure 6:
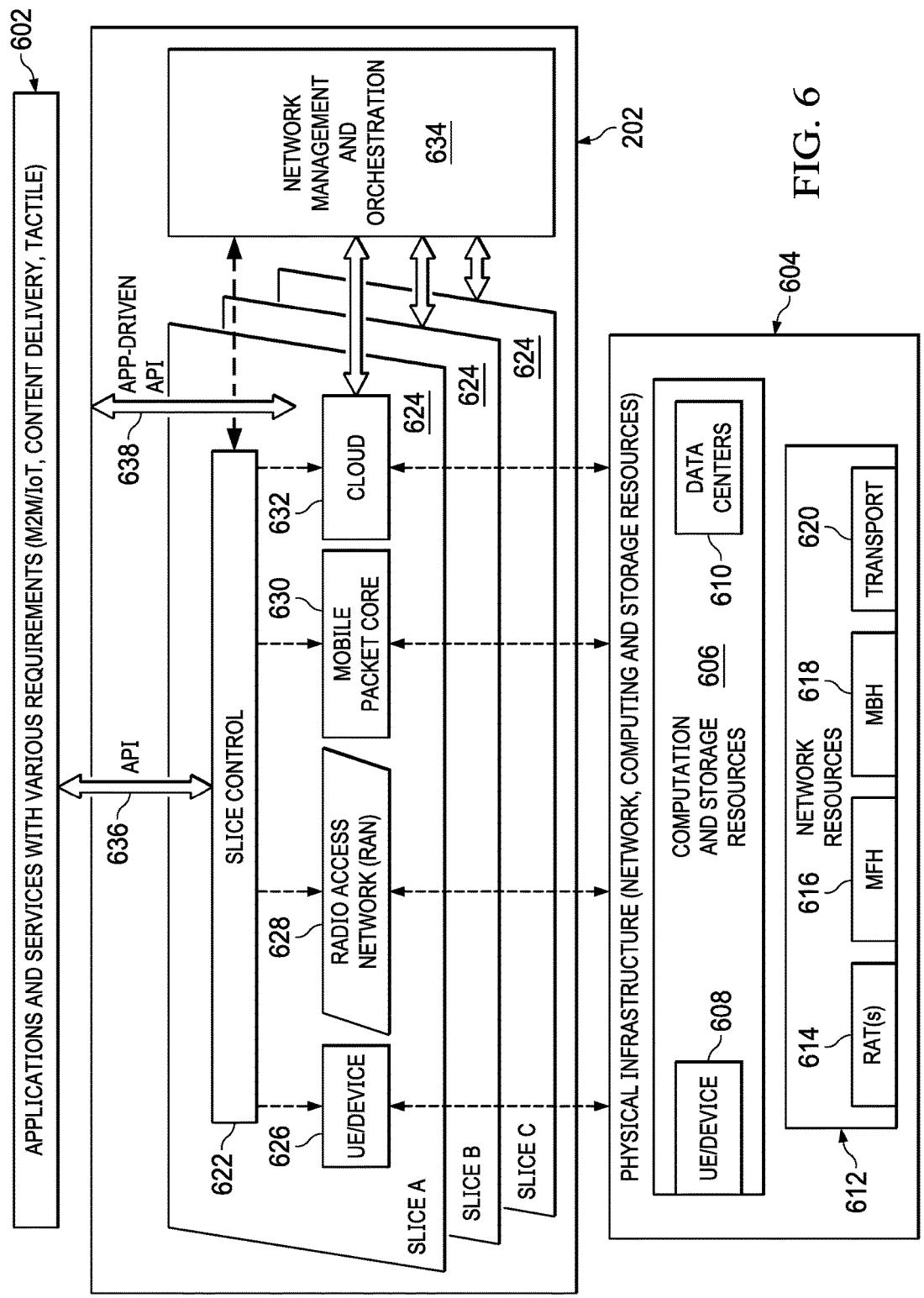
FIG. 6 illustrates a manner in which a configurable wide area network controls interactions between applications and infrastructure.

Referring now to FIG. 6, there is illustrated the manner in which the configurable wide area network 202 controls interactions between applications and services 602 and the physical infrastructure 604. The applications and services 602 are located within an application layer and have various requirements that differ depending upon the bandwidth needs of the application or service. The physical infrastructure 604 is included within the physical layer hardware and comprises computation and storage resources 606 including items such as user equipment and devices 608 and data centers 610 storing information and accessible resources. The user equipment and devices 608 represent handsets, mobile terminals, sensors, actuators, etc. The physical infrastructure 604 further includes network resources 612 such as radio access towers 614, the mobile fronthaul 616, the mobile backhaul 618 and the transport network 620.

The configurable wide area network 202 comprises the network layer where network functions are implemented in software and includes slice control 622 for selecting the network resources that are required in order to implement a particular application or service that is currently being utilized. The slice control 622 utilizes a number of factors and domain specific orchestration controls in order to establish a particular slice 624. These include user equipment/device control 626, radio access network control 628, mobile packet core control 630 and cloud control 632. The domain specific orchestration controls may exist individually and for each network provider. The slice control 622 communicates with the various applications and services through an application program interface 636. The network resource controllers 626-632 communicate with the applications and services through an app driven API. Network management and orchestration 634 works with the slice control 622 and the various network resource controls 626-632 in order to establish the various slices 624. Network management and orchestration 634 consolidates management of inter-slice, slice lifecycle and resource management over multiple network domains in end-to-end connections. Within individual slices 624, virtual network functionalities (VNFs) and virtual transport paths are mapped on the sliced network topologies. The slices 624 encompass capabilities of transport control and network functionalities.

Figure 7:
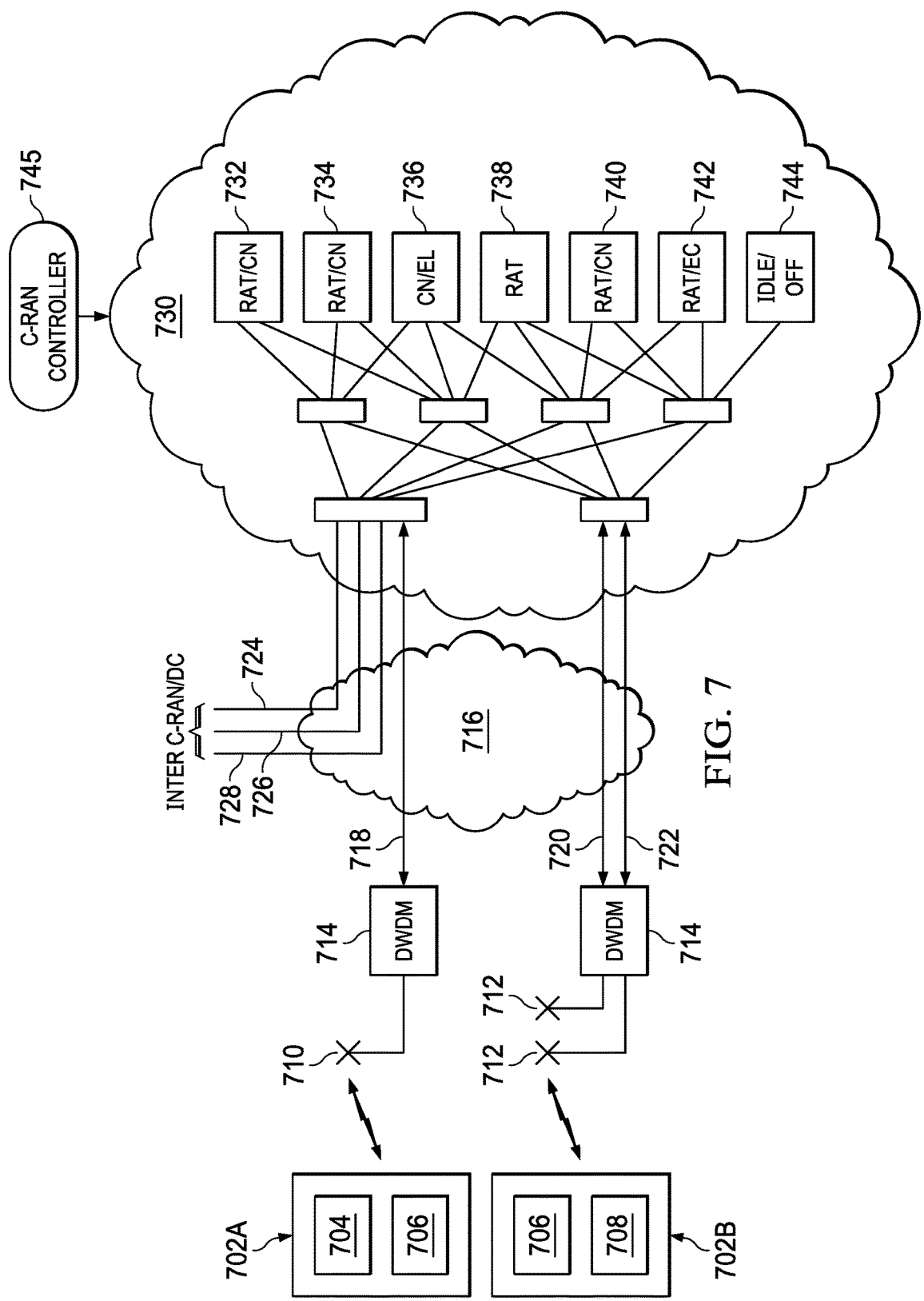
FIG. 7 illustrates a virtualization and slicing process under software control within a cloud radio access network.

Referring now to FIG. 7, there is illustrated a virtualization and slicing process under software control within a cloud radio access network (C-RAN). First and second user devices 702 each implement first and second applications 704, 706 in the case of device 702A and second and third applications 706, 708 in the case of device 702B. The user devices 702 are in wireless communication with antennas 710 and 712. Antenna 710 is associated with the digital radio network while antennas 712 are associated with an analog, digital or packet radio network. Each of the antennas 710, 712 are connected to a dense wavelength division multiplexer 714. The multiplexer 714 implements an optical multiplexing technology that combines and transmits multiple signals simultaneously on different links over the same fiber. The multiplexer 714 establishes a connection through a TSDN hybrid slice fronthaul IDC backhaul 716 link 718 is associated with application 706. Link 720 is associated with application 704, and link 722 is associated with application 708.

A number of GE 400 links 724-728 are provided from an Inter C-RAN/DC network to a CORE/vEPC network through the TSDN hybrid slice fronthaul IDC backhaul 716 to the C-RANs 730. Link 724 is associated with application 706. Link 726 is associated with application 704, and link 728 is associated with application 708.

The cloud radio access network 730 consist of a number of resources including radio access terminals (RATs), CORE network (CN), mobile edge computing (MEC) and other types of server/core functions. In the example of FIG. 7, a number of RAT/CN servers 732, 734 and 740 are used along with CN/EC (edge computing) server 736, RAT server 738, RAT/EC server 742 and an idol/off server 744. The cloud radio access network 730 is controlled through a C-RAN controller 745.

Any resource may be part of any slice. In the example of FIG. 7, a first slice is associated with application 704 and consists of links 720, 726 and resources 738 and 740. The first slice provides ultra-reliable, low bandwidth, long rang and high mobility connection. A second slice is associated with application 706 and consist of links 718, 724 and resources 732, 734 and 736. The second slice provides the highest bandwidth for short range connections. A final slice is associated with application 708 and consist of links 722, 728 and resources 740 and 742. The final slice provides the lowest delay to be used for low signaling connections. Idle resources such as resource 744 may be moved from one slice to another depending upon the needs of the particular slice. Additionally, presently assigned links and resources may be dynamically adjusted depending upon the needs of a particular slice. Resources include virtual machine servers, intra/inter C-RAN B/W, C-RAN to radio configurations of base station and UE devices.

Figure 8:
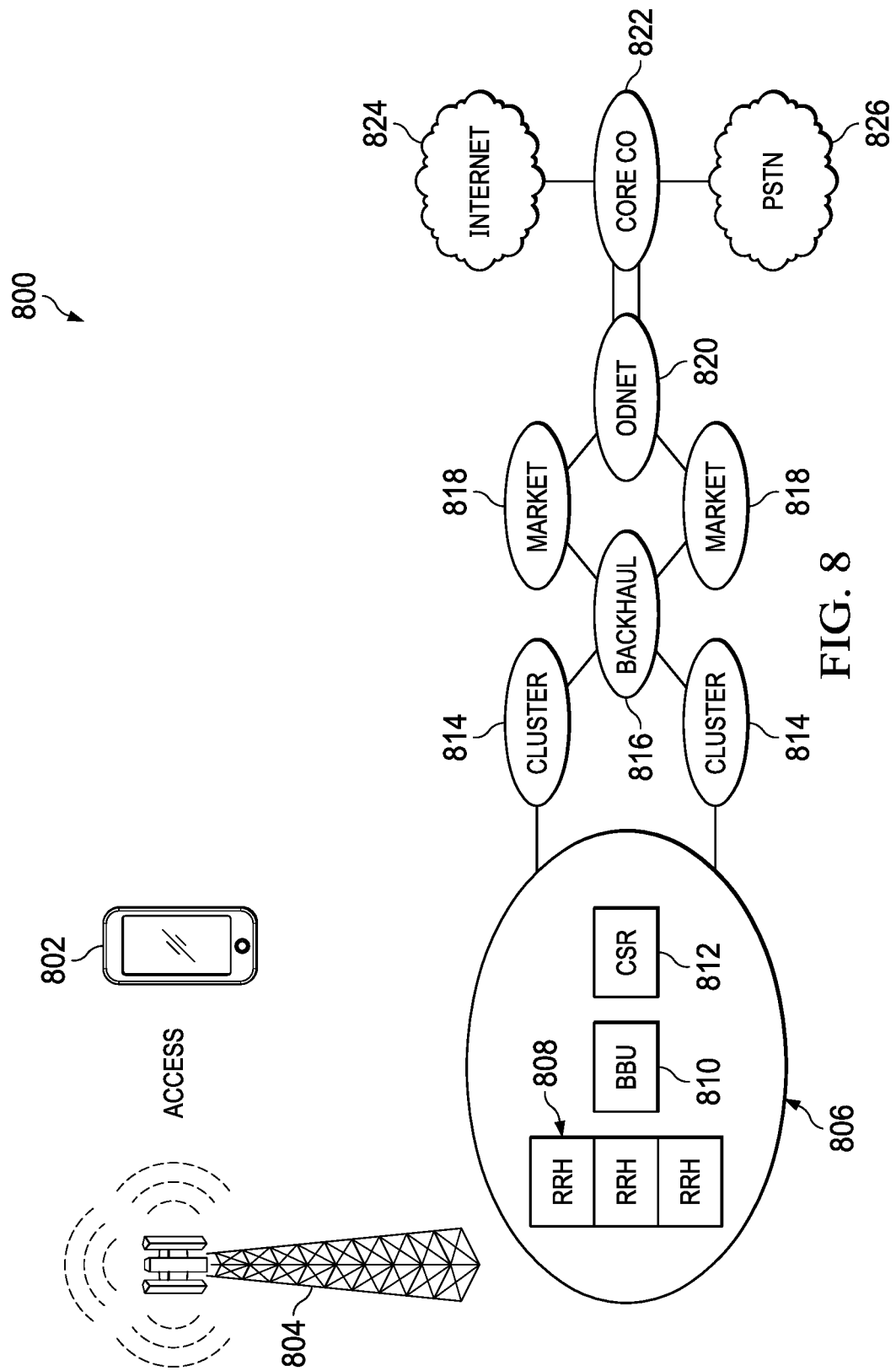
FIG. 8 illustrates a traditional network configuration.

Referring now to FIG. 8, there is illustrated a traditional network configuration. A user device 802 establishes a wire connection with an antenna 804 of the radio access network. Antenna 804 communicates with the base station 806. The base station 806 includes a number of remote radio heads (RRHs) 808. The RRHs 808 contains the base stations RF circuitry plus analog-to-digital/digital-to-analog converters and up/down converters. RRHs 808 have operation and management processing capabilities and a standardize optical interface to connect to the remainder of the base station 806. The baseband unit (BBU) 810 processes baseband within the radio link for signals to/from the RRH 808. The channel state report (CSR) 812 generates channel state information for the communications link. The base station 806 is associated with other base stations within a cluster 814. The cluster 814 comprises a cluster of cells.

The base station 806 communications are transmitted from the various clusters 814 over a backhaul network 816. The backhaul network 816 connects to various markets 818 (particular areas having cell networks) to the optical data network (ODNET) 820. The optical data network 820 connects to the core central office 822. The core central office 822 communicates with the Internet 824 or public switched telephone network (PSTN) 826 in order to download data information or provide voice communications.

Figure 9:
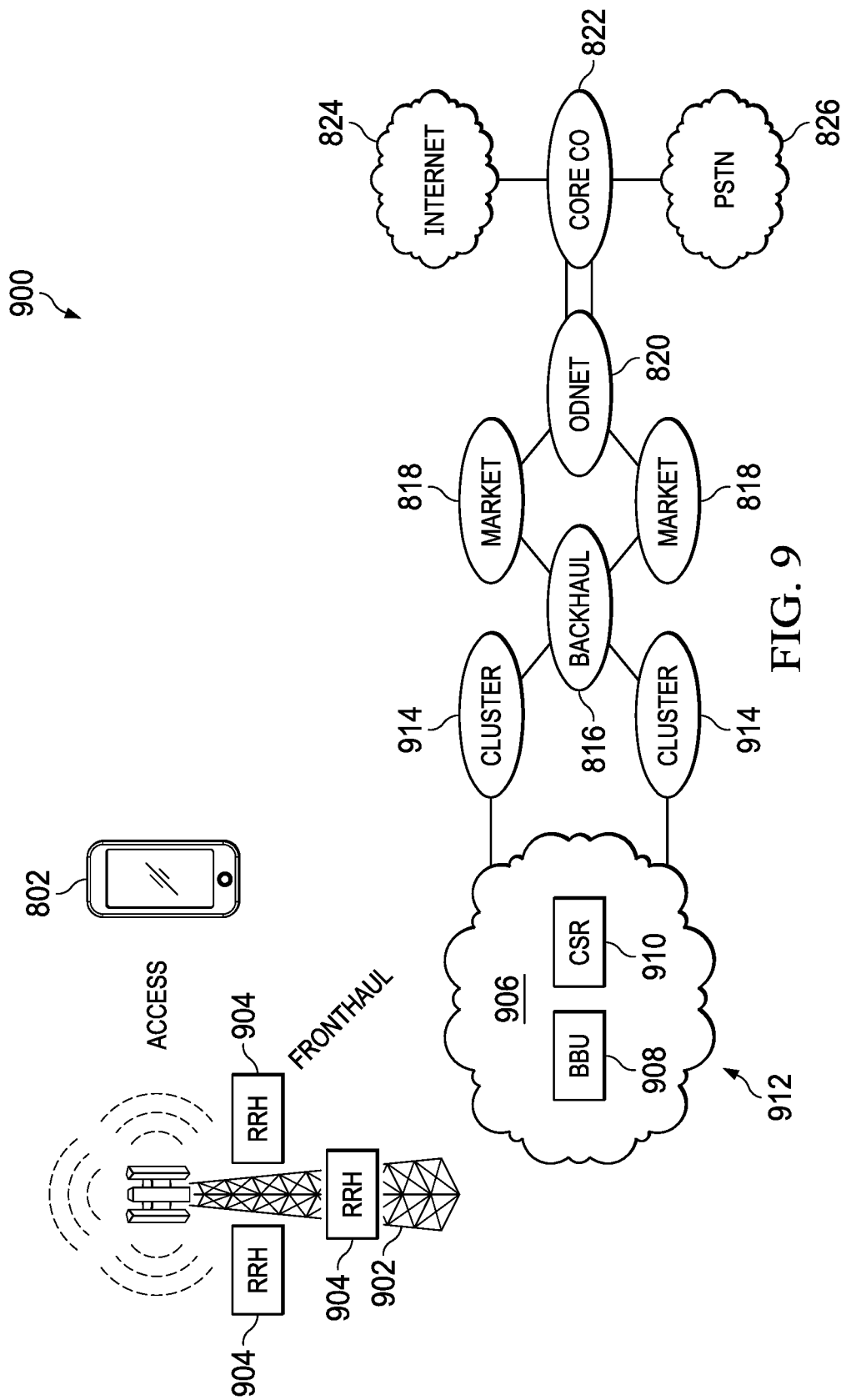
FIG. 9 illustrates a virtual radio access network.

Referring now to FIG. 9, a virtual radio access network 900 is illustrated. Within the virtual radio access network 900, the configuration from the backhaul network 816 to the core central office 822, and the core central offices connections to the Internet 824 and the PSTN 826 are the same as that described with respect to the traditional network 800 of FIG. 8. The user device 802 communicates with an antenna 902 over wireless communication links. The remote radio heads 904 are located at the antenna 902 rather than a base station. The remote radio heads 904 are in communication with a virtual base station 906 virtualized within the cloud that implements a baseband unit 908 and channel state report 910 within the network cloud 912. Virtualized functions are implemented using NFV as will be more fully discussed herein below. Virtualized functions may also use SDN wherein the control functions are taken out of the hardware and implemented within software as will be more fully described. The BBUs communicate with the RRHs over a fronthaul which may be fiber or wireless. The virtual base stations 906 are associated with other clusters 914 that communicate through the backhaul network 816 as described previously.

As systems evolve towards RAN2020, CloudRAN architecture is used to implement RAN real time functions, on-demand deployment of non-real-time resources, component-based functions, flexible coordination, RAN slicing, SDR slicing, and SDN slicing. With Mobile Cloud Engine (MCE), CloudRAN can support orchestration for RAN real time and non-real-time functions based on different service requirements and transmission resource to perform cloudification (and virtualization) of the RAN.

The RAN real time functions include access network scheduling, link adaptation, power control, interference coordination, retransmission, modulation, and coding. These functions require high real-time performance and computing load. The deployment of sites must include dedicated hardware with high accelerator processing and be located in close to services. The RAN non-real-time functions include inter-cell handover, cell selection and reselection, user-plane encryption, and multiple connection convergence. These functions need low real-time performance and latency requirements and fit for centralized deployment. MCE can support management and coordinating multiple processing capabilities based on regional time, frequency bands, and space. This architecture allows CloudRAN to support 4G, 4.5G, 5G (different bands), and Wi-Fi, and coordination of macro, micro, pico and massive MIMO sites. Network functions are deployed on radio, backbone, or core nodes to maximize network efficiency.

Multi-connectivity is fundamental to the future network architecture. Multi-connectivity with carrier aggregation can support the usage of licensed, shared and unlicensed bands to provide bandwidth hungry applications used by power users that leverage small cells or massive MIMO. CloudRAN can be deployed in a unified network architecture. In current fragmented networks, increasing speed and reducing latency can improve user experience. Reliable high-speed data cannot depend on a single frequency band or standard connections. In heterogeneous networks, multi-connectivity helps provide an optimal user experience based on LTE and 5G capabilities, such as high bandwidth and rates of high frequency, network coverage and reliable mobility of low frequency, and accessible Wi-Fi. This could mean a combined coordination of licensed, shared and unlicensed bands to support power users that use high-bandwidth applications. In scenarios that require high bandwidth or continuity, a user requires multiple concurrent connections. For example, data aggregation from multiple subscriptions to 5G, LTE, and Wi-Fi (licensed, shared and unlicensed bands) to aggregate and produce high bandwidth. An LTE network access has to maintain continuity after a user has accessed a 5G high-frequency small cell.

In scenarios that have multiple technologies, CloudRAN can be an anchor for data connection which reduces alternative transmission. In the traditional architecture integrating base stations as an anchor for data connection, LTE, 5G, and Wi-Fi data is aggregated into a non-real time processing module of a specific standard to be forwarded to each access point. In this CloudRAN architecture, non-real time processing functions in access points of different modes are integrated into the MCE, which is as an anchor for data connection. Data flows are transmitted to each access point over the MCE, which prevents alternative transmission and reduces transmission investment.

Figure 10:
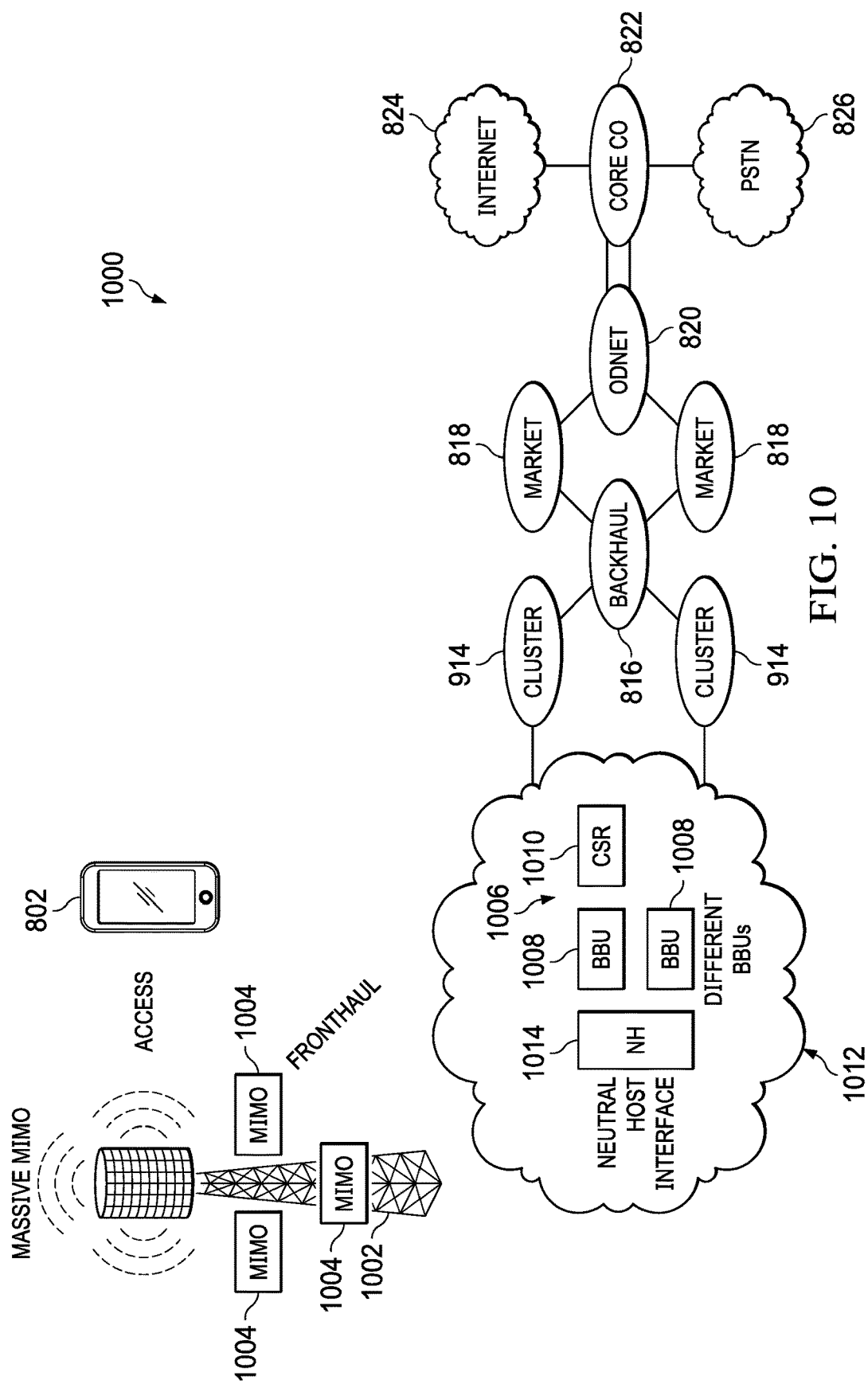
FIG. 10 illustrates a massive MIMO neutral host network.

Referring now to FIG. 10, a virtual radio access network 1000 is illustrated. Within the virtual radio access network 1000, the configuration from the backhaul network 816 to the core central office 822 and the core central offices connections to the Internet 824 and the PSTN 826 are the same as that described with respect to the traditional network 800 of FIG. 8. The user device 802 communicates with and antenna 1002 over wireless communication links. The antenna 1002 includes a number of massive MIMO antenna configurations 1004 providing multiple input multiple output transceiver capabilities such as those disclosed in U.S. patent application Ser. No. 15/216,474, entitled SYSTEM AND METHOD FOR COMBINING MIMO AND MODE-DIVISION MULTIPLEXING, filed on Jul. 21, 2016, which is incorporated herein by reference in its entirety. The MIMO transceivers 1004 are located at the antenna 1002 rather than a base station. The MIMO transceivers 1004 are in communication with a virtual base station 1006 that implements a plurality of baseband units 1008 that are each associated with different MIMO transceivers 1004, different network providers and channel state report 1010 within the network cloud 1012. A neural host interface 1014 controls the interactions between the MIMO transceivers 1004 and the base band units 1008. The virtual base stations 1006 are associated with other clusters 914 that communicate through the backhaul network 816 as described previously.

Figure 11:
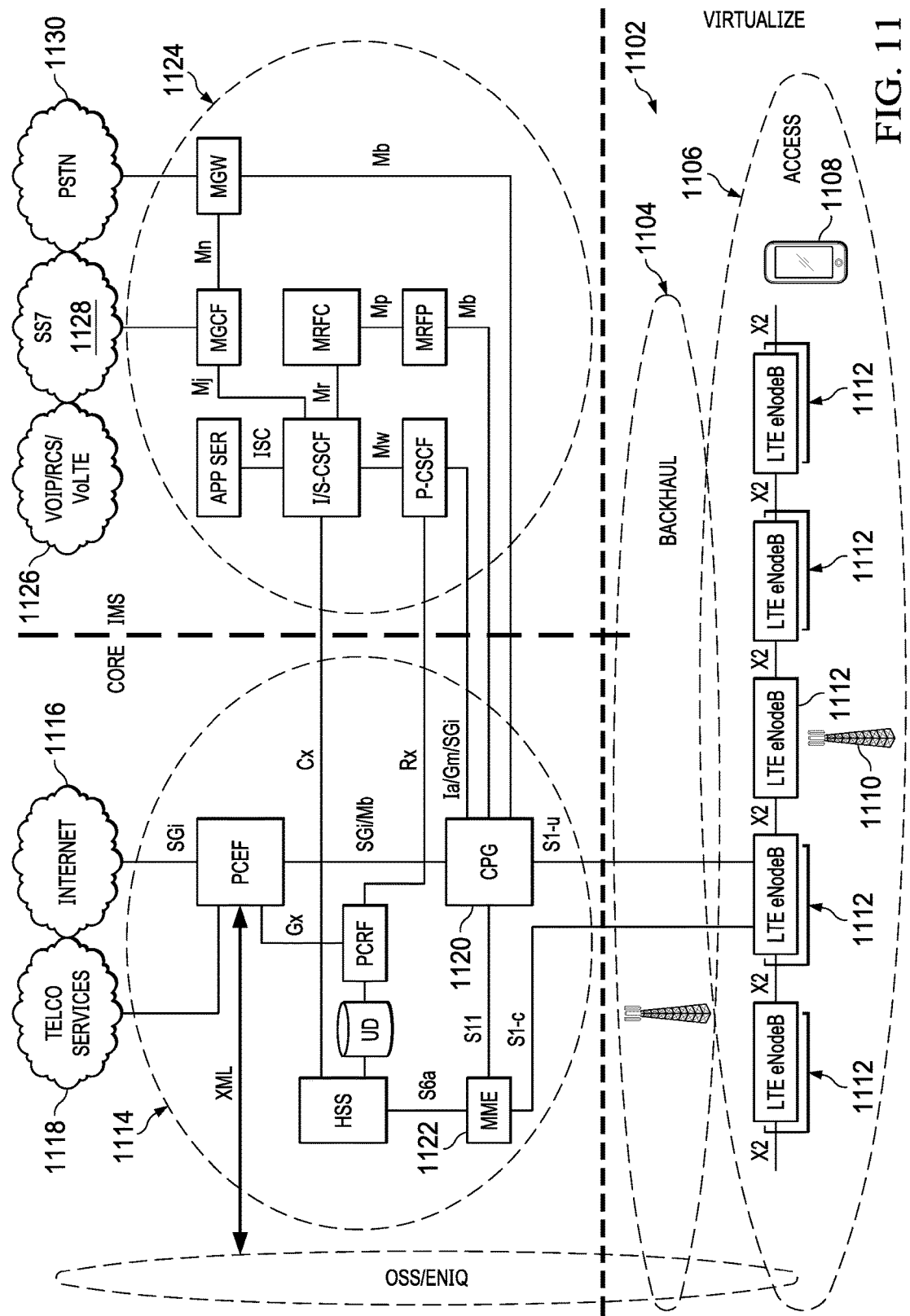
FIG. 11 illustrates a virtualized base station and backhaul network.

Referring now to FIG. 11, there is more particularly illustrated the virtualized base station 1006 and backhaul 816 portions of the networks. The virtualized portion 1102 consists of the backhaul network 1104 and the access network 1106. The access network 1106 enables a user device 1108 to communicate with an antenna 1110 via an RF link. The antennas 1110 communicate with various LTE eNodeBs 1112. The various LTE eNodeBs 1112 and backhaul network 1104 are implemented in software using, for example, software defined networking (SDN) and network function virtualization (NFV) as will be more fully described herein below. The virtualized backhaul network 1104 communicates with the core network 1114 through a converged packet gateway (CPG) 1120 and a mobility management entity (MME) 1122 to provide access to the Internet 1116 and telco services 1118. The core network 1114 provides access to the Internet multimedia subset (IMS) 1124 to provide access to VOIP/RCS/VoLTE 1126, SS7 network 1128 and the public switched telephone network (PSTN) 1130.

Figure 12A:
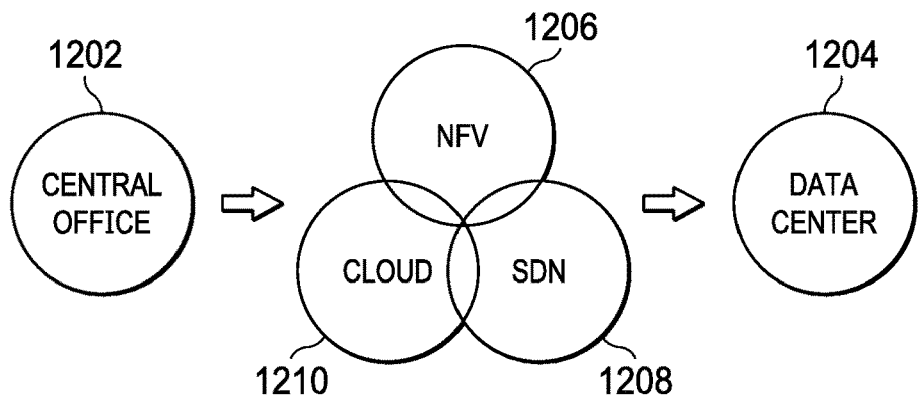
FIG. 12A illustrates the manner in which a central office may be converted to a data center.

Referring now to FIG. 12A, there is illustrated the manner in which a central office 1202 may be converted to a data center 1204 (CORD). The conversion from central office functionalities 1202 to data center functionalities 1204 are carried out using a combination of network function virtualization (NFV) 1206, software defined networks (SDN) 1208 and the cloud 1210. The operation of NFV 1206 and SDN 1208 will be discussed more fully herein below. This reconfiguration of the central office 1202 to a data center 1204 provides for rapid innovation, re-personalizable hardware, agile dev-op models, low cost operating expenses, application network awareness, service programmability, customer control and quick deployment options.

The cloud adaptation of networks, operation systems, and servicesis the core for an "all cloud" approach to the network (hardware resources, distributed software architecture, and automatic deployment). Operators transform networks using a network architecture based on data center (DC) 1204 in which all functions and applications are running on the cloud data center (cloud-native architecture).

Figure 12B:
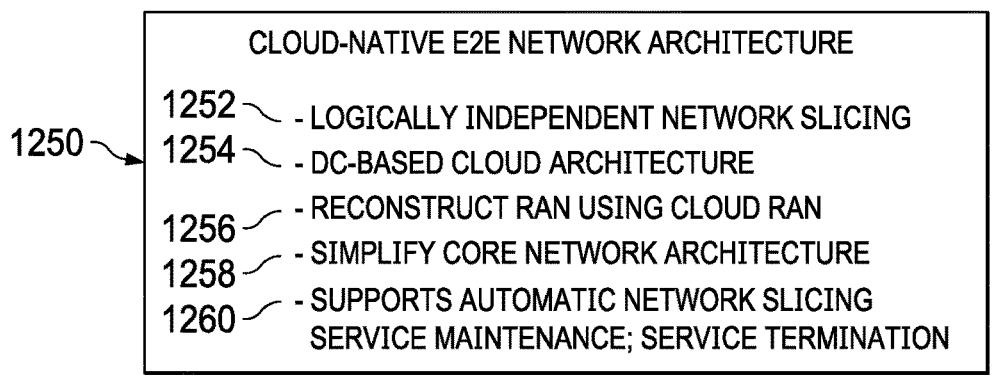
FIG. 12B illustrates a single network infrastructure supporting different services and applications.

As shown in FIG. 12B, in this architecture, a single network infrastructure can support different services and applications. This Cloud-Native E2E network architecture 1250 has the following attributes. The architecture 1250 provides logically independent network slicing 1252 on a single network infrastructure for different service requirements and provides DC-based cloud architecture 1254 to support various application scenarios. The architecture 1250 further uses Cloud RAN and RAN Slicing 1256 to reconstruct radio access networks (RAN) to support massive connections of multiple standards and implement on-demand deployment of RAN functions. The architecture 1250 also simplifies core network architecture 1258 to support on-demand network functions through control and user plane separation and unified database management. Finally, the architecture 1250 supports automatic network slicing service generation, maintenance, and termination for different services 1260 to reduce operating expenses.

New communication requirements for different services are difficult on existing networks in terms of technologies and business models. The next-generation mobile network must support different demands from different applications in different industries on a single network. The international telecommunications union (ITU) has classified 5G mobile network services into three categories: Enhanced Mobile Broadband (eMBB), Ultra-reliable and Low-Latency Communications (uRLLC), and Massive Machine Type Communications (mMTC). The eMBB service targets people's demand for a digital lifestyle and focuses on services that have high requirements for bandwidth, such as high definition (HD) videos, virtual reality (VR), and augmented reality (AR). The high bandwidth requirements are supported by using SDR-based massive MIMO. The uRLLC service focuses on latency-sensitive services, such as assisted and automated driving, and remote management. The mMTC service focuses on services that include high requirements for connection density, such as smart city and smart agriculture. However, a network is needed where all of these different types of networks are possible on one infrastructure and allow network slicing E2E. The described system enables enhanced mobile broadband (eMBB), ultra-reliable low latency communications (URLLC) and massive machine type communication (mMTC) to each be provided on a single infrastructure using end-to-end network slicing.

A number of traditional industries, such as automotive, healthcare, energy, and municipal systems participate in the construction of this ecosystem. 5G allows digitalization process from personal entertainment to society interconnection. The driving forces behind the network architecture transformation include the following aspects. A first factor involves complex networks incorporating multiple services, standards and sites. 5G networks must be able to provide diversified services of different KPIs, support co-existent accesses of multiple standards (5G, LTE, and Wi-Fi), and coordinate different site types (macro, micro, pico base stations as well as massive MIMO). The design challenge to create a network architecture capable of supporting such flexibility while meeting differentiated access demands is very complex to optimize. Another factor involves coordination of multi-connectivity techonologies. 5G is expected to co-exist with LTE and Wi-Fi for a long time incorporating multi-connectivity technologies and the new 5G air interface. Multi-connectivity technologies must be coordinated based on traffic and mobility requirements of user equipment to provide sufficient transmission throughput and mobile continuity.

The network must also provide on-demand deployment of services on the site or on the access cloud side. 5G network architecture will be designed based on access sites and three-layer DCs. According to different service requirements, fiber/optic cable availability and network resource allocations, RAN real time and non-realtime resources can be deployed on the site or on the access cloud side. This requires that the service gateway location may also be deployed on the access cloud or on the core network side. The network must also provide for flexible orchestration of network functions. Service requirements vary with different network functions. A eMBB service requires a large throughput for scheduling. A uRLLC service requires ultra-low latency and high reliability. Networks must flexibly orchestrate network capabilities considering service characteristics, which significantly simplify network functions and increase network efficiency. Finally, a network must provide a shorter period of service deployment. Different services have expanded the mobile network ecosystem and increased network deployment complexity. Rapidly deploying new services requires better lifecycle management processes involving network design, service deployment, and O&M to rapidly deploy new services.

The service-driven 5G network architecture has to be flexible and efficiently support diversified mobile service requirements. This is achieved using a combination of SDN 1208 and NFV 1206. With software-defined networking (SDN) 1208 and Network Functions Virtualization (NFV) 1206 supporting the underlying physical infrastructure, 5G comprehensively cloudifies and can further virtualize access, transport, and core networks. Cloud solutions 1210 can better support diversified 5G services, and enables the key technologies of E2E network slicing, on-demand deployment of services, and component-based network functions.

CloudRAN 1256 would include sites and mobile cloud engines. This architecture 1250 coordinates multiple services, operating on different standards, in various site types for RAN real time resources that require many computing resources. Networks implement policy control using dynamic policy in the unified database on the core network side. Component-based control planes and programmable user planes allow for network function orchestration to ensure that networks can select control-plane or user-plane functions according to different service requirements. The transport network consists of SDN controllers and underlying forwarding nodes. SDN controllers generate a series of specific data forwarding paths based on network topology and service requirements to implement network optimization or open network capabilities in the API. The top layer of the network architecture implements E2E automatic slicing and network resource management 1260.

Figure 12C:
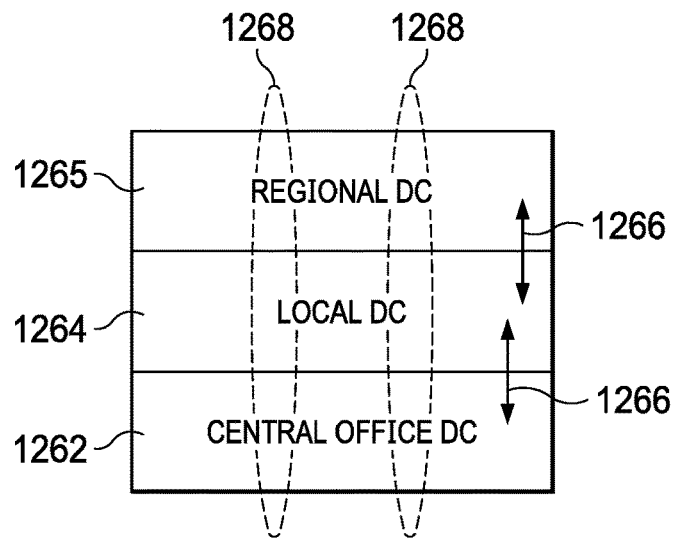
FIG. 12C illustrates a three layer cloud data center.

E2E network slicing 1252, 1260 is a foundation to support diversified 5G services and is key to 5G network architecture evolution. Based on NFV 1206 and SDN 1210, physical infrastructure of the future network architecture would include sites and three-layer DCs. Sites support multiple modes (such as 5G, LTE, and Wi-Fi) in the form of macro, micro, and pico base stations and corresponding massive MIMO at different bands to implement the RAN real time function. These functions have high requirements for computing and real-time performance and require dedicated hardware. As shown in FIG. 12C, three-layer cloud DC includes computing and storage resources. The bottom layer 1262 is the central office DC, which is closest in relative proximity to the base station side. The second layer 1264 is the local DC, and the third layer 1265 is the regional DC, with each layer of arranged DCs connected through transport networks 1266.

As discussed previously based on this architecture to diversify services, networks have topologies and a series of network function (network slices 1268) for each corresponding service type using NFV 1206 on a unified physical infrastructure. Each network slice 1268 is derived from one unified physical network infrastructure, which reduces operators' network costs. Network slices 1268 feature a logical arrangement and are separated as individual structures, which support customizable service functions and independent O&M.

As indicated, eMBB, uRLLC, and mMTC are independently supported on a single physical infrastructure. The eMBB slicing has high bandwidth requirements and has to cache in the mobile cloud engine of a local DC 1264, which supports high-speed services located close to users, reducing bandwidth requirements of the backbone network. The uRLLC slicing has strict latency needs in application of self-driving, assistant driving, and remote management and must be deployed in the mobile cloud engine of the central office DC 1262 (closer to the end user). V2X Server and service gateways must be deployed in the mobile cloud engine of the central office DC 1262, with only control-plane functions deployed in the local 1264 and regional DCs 1265. The mMTC slicing has low network data interaction and a low frequency of signaling interaction in most mMTC applications and the mobile cloud engine can be located in the local DC, with other functions. Therefore, mobile cloud engine can be in the local DC 1264, and other functions and application servers can be deployed in the regional DC 1265, which releases central office 1262 resources and reduces operating expenses.

Figure 13:
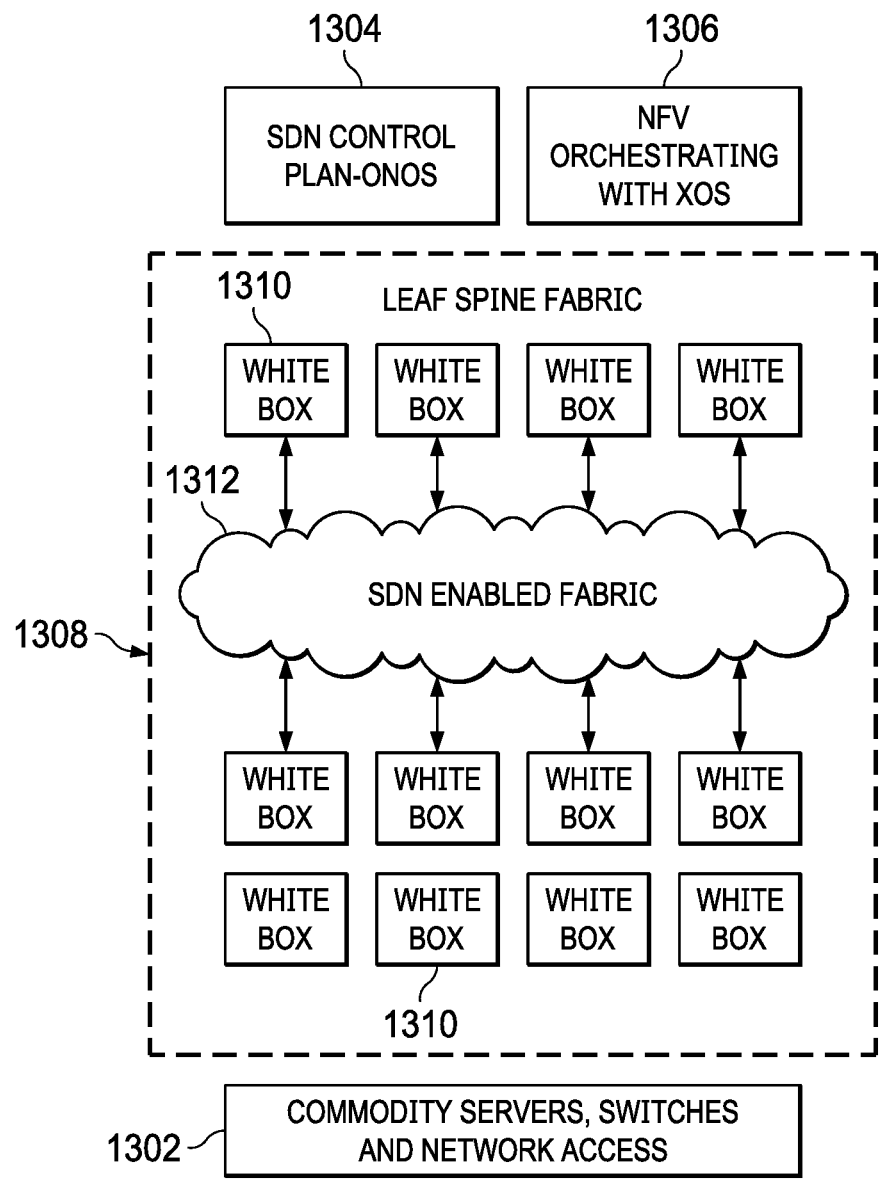
FIG. 13 illustrates the virtualization of the central office to the data center.

FIG. 13 more particularly illustrates the virtualization of the central office 1202 to the data center 1204 using the combination of NSV 1206, SDN 1208 and the cloud 1210. The process uses a number of commodity servers, switches and network access devices 1302 that may be used in combination with SDN control 1304 and NFV orchestration 1306. An inter connection of services and processes are implemented within a leaf spine fabric 1308 using a network of white boxes 1310 that comprise various types of generic network components that are interconnected via an SDN enabled fabric 1312. In SDN and FNV, the defined control structure enables the white boxes 1310 to be utilized in a desired manner or even repurposed in order to provide the virtualized network.

Figure 14:
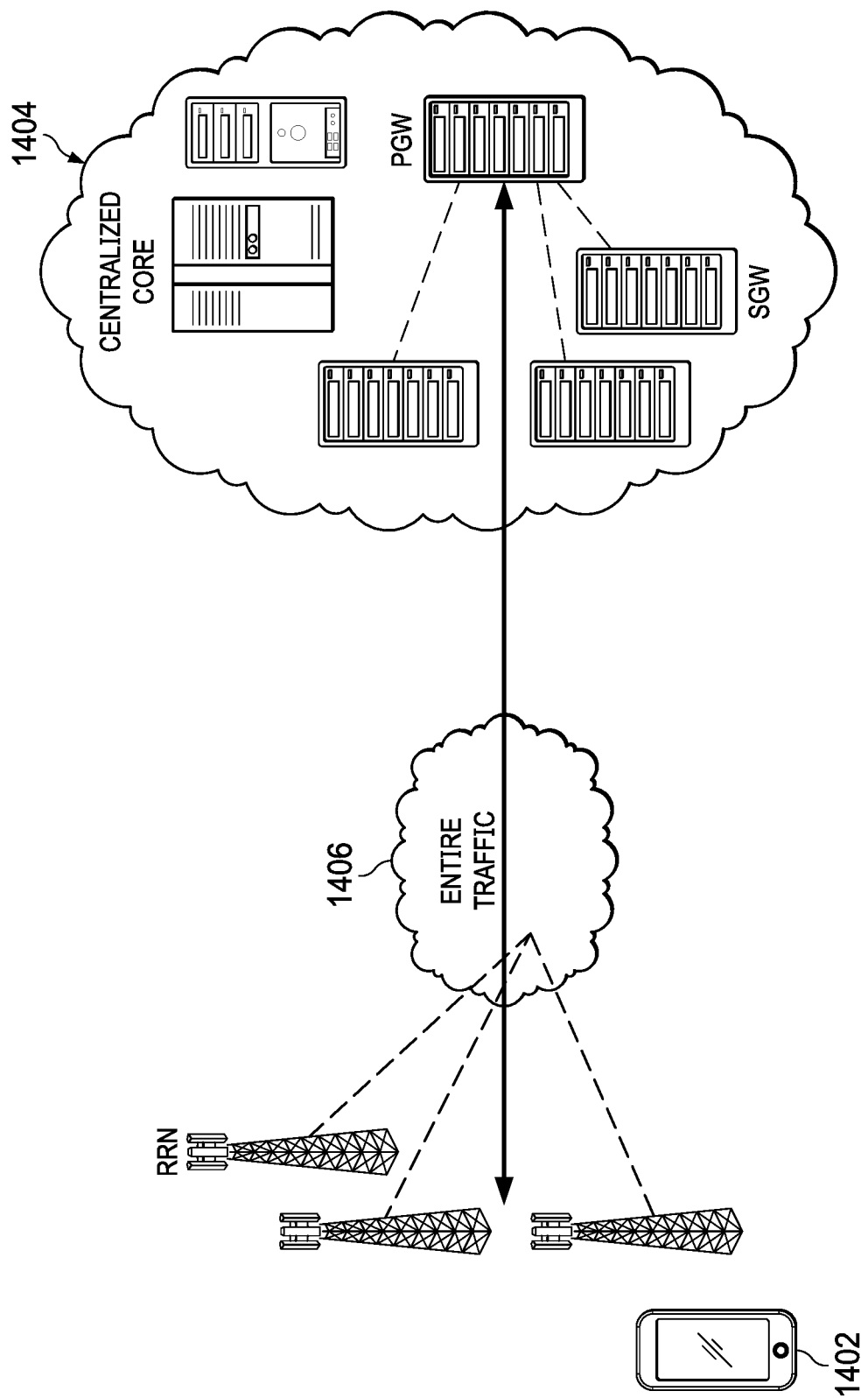
FIG. 14 illustrates the manner in which traditional mobile services are provided to a user device.

Virtualization of the central office enables the use of mobile edge services. Referring now to FIG. 14, there is illustrated the manner in which traditional mobile services are provided to a user device 1402. In this case, a centralized core 1404 transmits all traffic over a network 1406 connecting the centralized core 1404 to the user device 1402. Within traditional mobile service architecture all services are processed at the central core 1404. This requires overloading of the backhaul transport and core EPC. This provides for an inefficient use of network resources and causes a deterioration of the quality of experience of users. This type of implementation can also lead to over provisioning in order to handle peak traffic hours.

Figure 15:
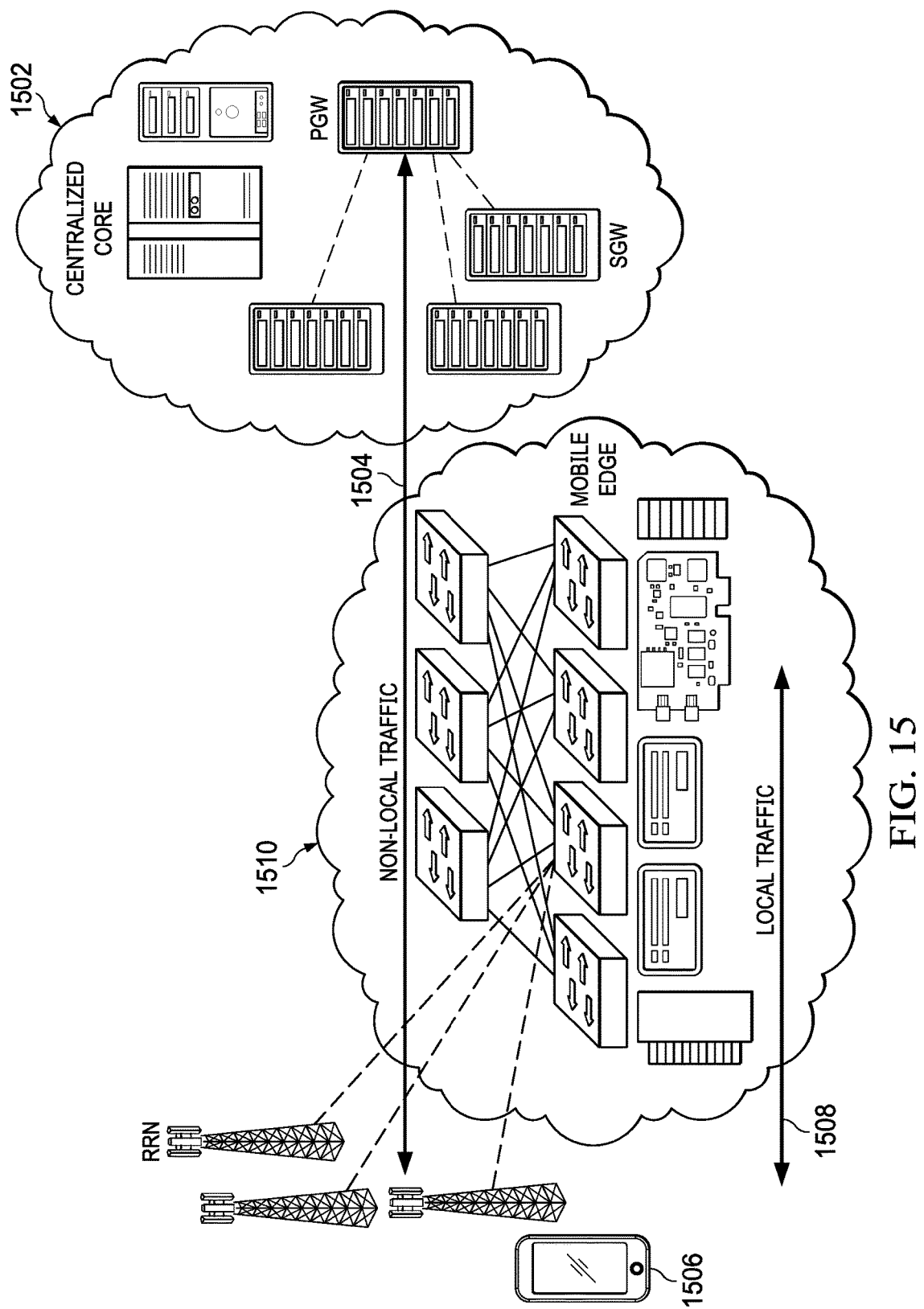
FIG. 15 illustrates a mobile edge computing services system.

FIG. 15 illustrates a mobile edge computing services system wherein the centralized core 1502 communicates only nonlocal traffic 1504 with the user device 1506. With respect to local traffic 1508, a mobile edge network 1510 is used for calculations and determinations in order to locate the processing and communications locally and more closely to the user device 1506. Services that can be processed at the edge network 1510 use M-CORD (mobile central office to data center) systems. Mobile edge services provide the advantage of being proximately located to end users. Mobile edge services provides for innovative and customized services that target customers (Internet of things, smart cities, education, industrial M2M, etc.) mobile edge services provide better efficiencies and new revenue opportunities for system operators.

Thus, CORD has emerged as an important service provider solution platform that brings the economy of the data center and the agility of a cloud. M-CORD integrates disaggregated/virtualized RIN and EPC with mobile edge services into CORD. M-CORD includes the integration of disaggregated eNB and provides connectionless service for Internet of things use cases.

MPEG-DASH is an ISO open standard for the adaptive delivery of segmented control (dynamic adaptive streaming over HTTP). MPE6 Dash based compression in the mobile edge provides for bit rate trimming, bandwidth minimization, low latency options, HTTP delivery and improved throughput. The key differentiator of DASH, as opposed to any of the other HTTP streaming formats, is its open standard configuration.

Figure 16:
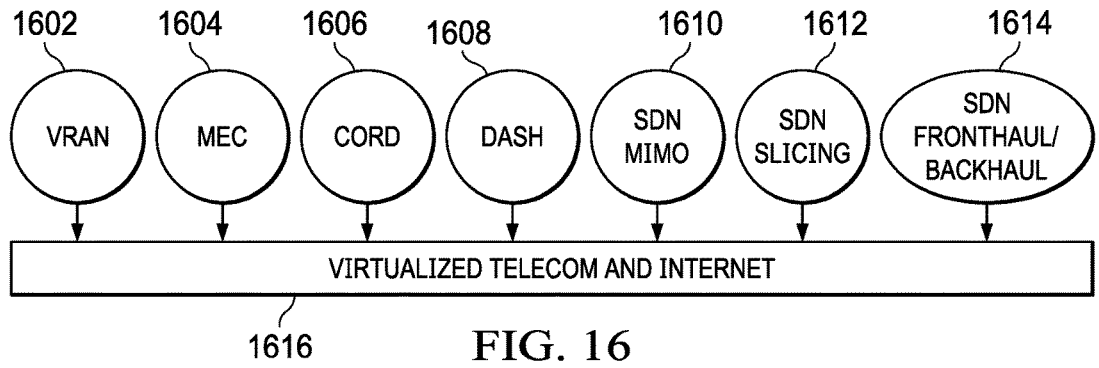
FIG. 16 illustrates the manner for creating a virtualized cloud architecture for telecom and Internet.

Thus, referring now to FIG. 16, by using a cloud native architecture (for example 5G architecture) various combinations of one or more of virtual radio access networks (VRAN) 1602, mobile edge computing (MEC) services 1604, CORD 1606, Dash-based compression 1608, SDN-based massive MIMO 1610, SDN-based end-to-end network slicing with massive MIMO 1612 to optimize the quality of experience for a given application on a same infrastructure, and SDN-based backhaul/fronthaul 1614 ultrabroadband virtualized telecom and internet services 1616 may be provided.

Software-Defined Networks and Network Function Virtualization

Figure 17:
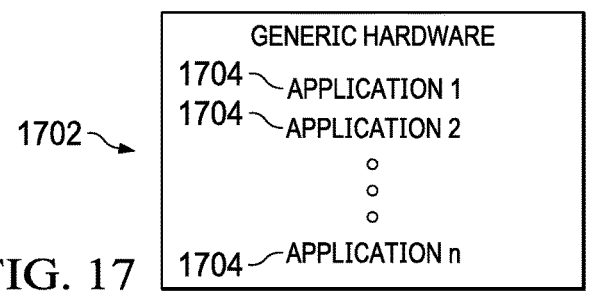
FIG. 17 illustrates a network function virtualization.

Diverse proprietary network hardware boxes increase both the capital and operational expense of service providers while causing problems of network management. Network function virtualization (NFV) addresses these issues by implementing network functions as pure software on commodity and generic hardware. Thus, as shown in FIG. 17, a generic off-the-shelf hardware 1702 may be used to generate a variety of system applications 1704 that are programmed into the hardware. NFV allows flexible provisioning, deployment, and centralized management of virtual network functions. Integrated with Software Defined Networks (SDN), the software-defined NFV architecture further offers agile traffic steering and joint optimization of network functions and resources. This architecture benefits a wide range of applications (e.g., service chaining) and is becoming the dominant form of NFV. Herein below, we introduce development of NFV under the software-defined NFV architecture, with an emphasis on service chaining as its application to Backhaul, Fronthaul and last mile wireless Internet Access. The software-defined NFV architecture is introduced as the state of the art of NFV and presents relationships between NFV and SDN. Finally, significant challenges and relevant solutions of NFV are described and its application domains (i.e. BH/FH/Access) are discussed.

Current network services rely on proprietary boxes and different network devices that are diverse and purpose-built. This situation induces network management problem, which prevents the operation of service additions and network upgrades (ossification). To address this issue and reduce capital expenditures (CapEx) and operating expenditures (OpEx), virtualization has emerged as an approach to decouple the software from the supported hardware and allow network services to be implemented as software. ETSI proposed Network Functions Virtualization (NFV) to virtualize the network functions that were previously carried out by some proprietary dedicated hardware. By decoupling the network functions from the proprietary hardware boxes, NFV provides flexible provisioning of software-based network functionalities on top of an optimally shared physical infrastructure. It addresses the problems of operational costs of managing and controlling these closed and proprietary boxes by leveraging low cost commodity servers.

On the other hand, with the development of Software Defined Networking (SDN), the trend is to integrate SDN with NFV to achieve various network control and management goals (i.e. dynamic resource management and intelligent service orchestration). Through NFV, SDN is able to create a virtual service environment dynamically for a specific type of service chain, consequently the dedicated hardware and complex labor work to provide a new coming service request is avoided. In conjunction with the use of SDN, NFV further enables real-time and dynamic function provisioning along with flexible traffic forwarding.

Software-defined NFV leverages network virtualization and logically centralized intelligence to minimize the service providing cost and maximize the utilization of network resources. In this case, the obtained higher resource utilization will introduce less investigation on the hardware equipment, which on the other hand simplifies networking operations. Moreover, by automating current manually intensive network configuration, provisioning, and management, the time and operational complexity are significantly reduced and manual errors are dramatically decreased, which offers better scalability. On the other hand, especially in large scale networks, deploying and providing a new kind of service usually results in a long and repeated process that requires long cycles of validation and testing. By automating the control, management and orchestration, the deployment time and operation cost will be significantly reduced.

Service chaining is the main area of software-defined NFV. In current networks, a service chain includes a set of hardware dedicated network boxes offering services such as load balancers, firewall, Deep Packet Inspection (DPI), Intrusion Detection System (ID S), etc., to support a dedicated application. When a new service requirement is added, new hardware devices must be deployed, installed and connected, which is extremely time-consuming, complex, high-cost and error-prone. This kind of networking service requires a dedicate plan of networking changes and outages, which requires high OpEx. On the other hand, the architecture of software-defined NFV is able to simplify the service chain deployment and provisioning. It enables easier and cheaper service provisioning in the local area networks, enterprise networks, data center and Internet service provider networks, wireless operator networks and their backhaul, fronthaul and last mile access networks.

The following introduces the state-of-the-art of NFV and its main challenges within the software-defined NFV architecture. Service chaining is highlighted and discussed as a core application of NFV in different contexts. Guidelines are provided for developments of NFV in various applications to backhaul, fronthaul and last mile access.

Software-Defined Network Function Virtualization

To reduce CapEx and OpEx introduced by diverse proprietary hardware boxes, NFV exploits and takes advantage of the virtualization technology. NFV allows network operators and service providers to implement network functions in software, leveraging standard servers and virtualization technologies, instead of purpose-built hardware. Recent trends of increased user information demands, explosion of traffic and diverse service requirements further drive NFV to be integrated with SDN, forming the software-defined NFV architecture. This architecture offers great flexibility, programmability and automation to the operators in service provisioning and service modeling.

Diverse and fixed proprietary boxes make the service, deployment and testing of new systems increasingly difficult. NFV is a key technology to benefit IT virtualization evolution by separating the hardware network functions from the underlying hardware boxes by transferring network functions from dedicated hardware to general software running on commercial off-the-shelf (COTS) equipment, i.e., virtual machines (VMS). These software applications are running on standard IT platforms like high-performance switches, service, and storage. Using NFV, the different network functions can be deployed in different locations of the networks such as data centers, network nodes, and end-nodes of a network edge as required. Currently, the market of NFV includes switching elements, network elements, network services and applications. A summary of these include:

Network switching elements, i.e., Broadband Network Gateway (BNG), carrier grade NAT, Broadband remote access server (BRAS), and routers.

Mobile network devices, i.e., Home Location Register/Home Subscriber Server (HLR/HSS), Serving GPRS Support NodeMobility Management Entity (SGSNMME), Gateway support node/Packet Data Network Gateway (GGSN/PDN-GW), RNC, NodeB and Evolved Node B (eNodeB) such as that disclosed in T. Wu, L. Rui, A. Xiong, and S. Guo, "An automation PCI allocation method for eNodeB and home eNodeB cell," in *Proc. IEEE 6th Int. Conf. Wireless Commun. Netw. Mobile Comput.* (*WiCOM*), Sep. 2010, pp. 1-4, which is incorporated herein by reference in its entirety.

Virtualized home environments as described in A. Berl, H. de Meer, H. Hlavacs, and T. Treutner, "Virtualization in energy-efficient future home environments," *IEEE Commun. Mag.*, vol. 47, no. 12, pp. 62-67, Dec. 2009 and R. Mortier et al., "Control and understanding: Owning your home net-work," in *Proc. IEEE 4th Int. Conf. Commun. Syst. Netw.* (*COMSNETS*), Jan. 2012, pp. 1-10, each of which are incorporated herein by reference in its entirety.

Tunneling gateway devices, i.e., IPSec/SSL virtual private network gateways.

Traffic analysis elements, i.e., Deep Packet Inspection (DPI), Quality of Experience (QoE) measurement.

Service Assurance, Service Level Agreement (SLA) monitoring, Test and Diagnostics such as that described in H. Ludwig et al., "Web service level agreement (WSLA) language specification," IBM Corp., New York, N.Y., USA, Tech. Rep., 2003, pp. 815-824, which is incorporated herein by reference.

Next-Generation Networks (NGN) signaling such as Session Border Controller (SBCs), IP Multimedia Subsystem (IMS).

Application-level optimization devices, i.e., Content Delivery Network (CDNs), load balancers, cache nodes, and application accelerators such as that described in F. T. Leighton and D. M. Lewin, "Content delivery network using edge-of-network servers for providing content delivery to a set of participating content providers," U.S. Pat. No. 6,553,413, Apr. 22, 2003, which is incorporated herein by reference in its entirety.

Network security devices, i.e., Firewalls, intrusion detection systems, DOS attack detector, virus scanners, spam protection, etc. such as that described in E. D. Zwicky, S. Cooper, and D. B. Chapman, *Building Internet Firewalls*, Sebastopol, Calif., USA: O'Reilly Media, 2000, which is incorporated herein by reference in its entirety.

The major advantage of using NFV is to reduce middle dedicated hardware boxes deployed in the traditional networks to take the advantages of cost savings and bring flexibility. On the other side, NFV technology also supports the co-existence of multi-tenancy of network and service functions, through allowing the usage of one physical platform for different services, applications and tenants.

NFV Framework

Figure 18:
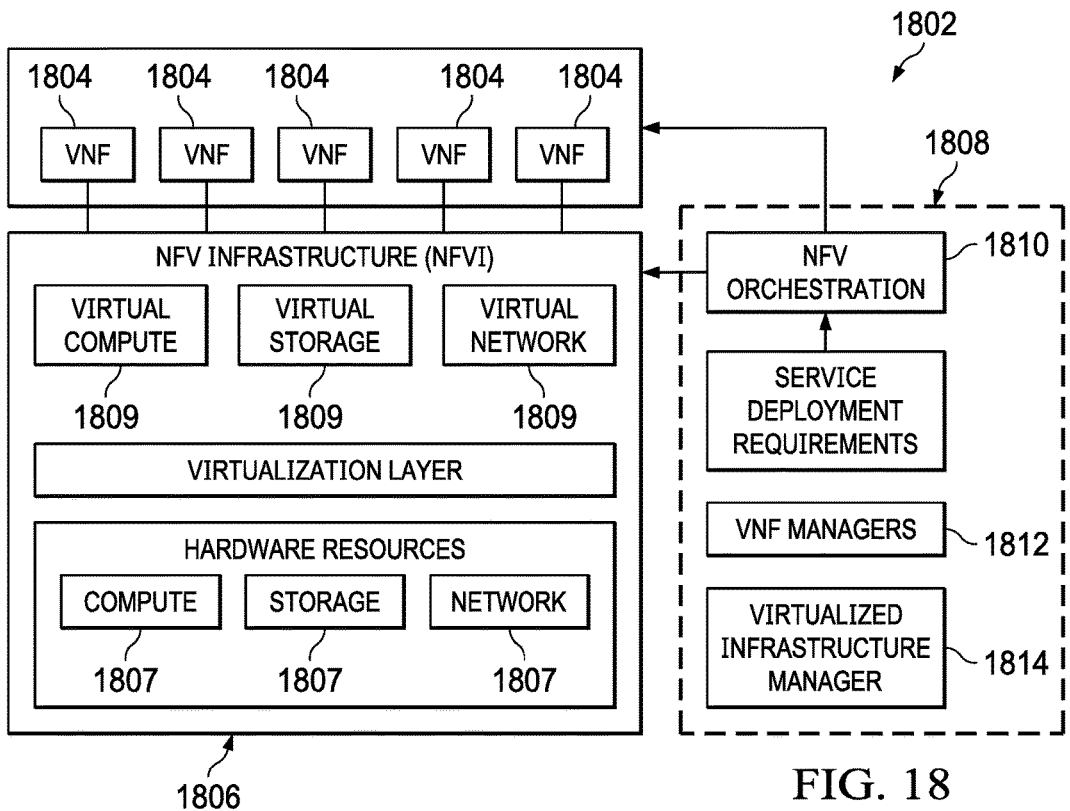
FIG. 18 illustrates a network function virtualization architectural framework.

ETSI defines the NFV architectural framework 1802 as illustrated in FIG. 18 enabling virtualized network functions (VNF) 1804 to be deployed and executed on a Network Functions Virtualization Infrastructure (NFVI) 1806, which consists of commodity servers 1807 to provide computing, storage and network functionalities wrapped with a software layer that logically partitions them. Above the hypervisor layer, a VNF 1804 is typically mapped to one VM (virtual machine) 1809 in the NFVI. The deployment, execution and operation of VNFs 1804 on the NFVI 1806 are steered by a Management and Orchestration (M&O) system 1808, whose behavior is driven by a set of metadata describing the characteristics of the network services and their constituent VNFs. The M&O system includes an NFV Orchestrator 1810 in charge of the lifecycle of network services, a set of VNF managers 1812 in charge of the life cycle of the VNFs and a virtualized infrastructure manager 1814, which can be viewed as an extended cloud management system responsible for controlling and managing NFVI resources.

Software-Defined Networks

A Software-Defined Network (SDN) is an important and recently emerging network architecture to decouple the network control from the data forwarding. With its inherent decoupling of the control plane from the data plane, SDN offers a greater control of a network through programming. This combined feature would bring potential benefits of enhanced configuration, improved performance, and encourages innovation in network architecture and operations. Especially, SDN offers a promising alternative for traffic steering by programmatically configuring forwarding rules as described in N. Handigol, S. Seetharaman, M. Flajslik, N. McKeown, and R. Johari, "Plug-n-serve: Load-balancing Web traffic using OpenFlow," in Proc. ACM SIGCOMM Demo, 2009, pp. 1-2, which is incorporated herein by reference in its entirety.

Figure 19:
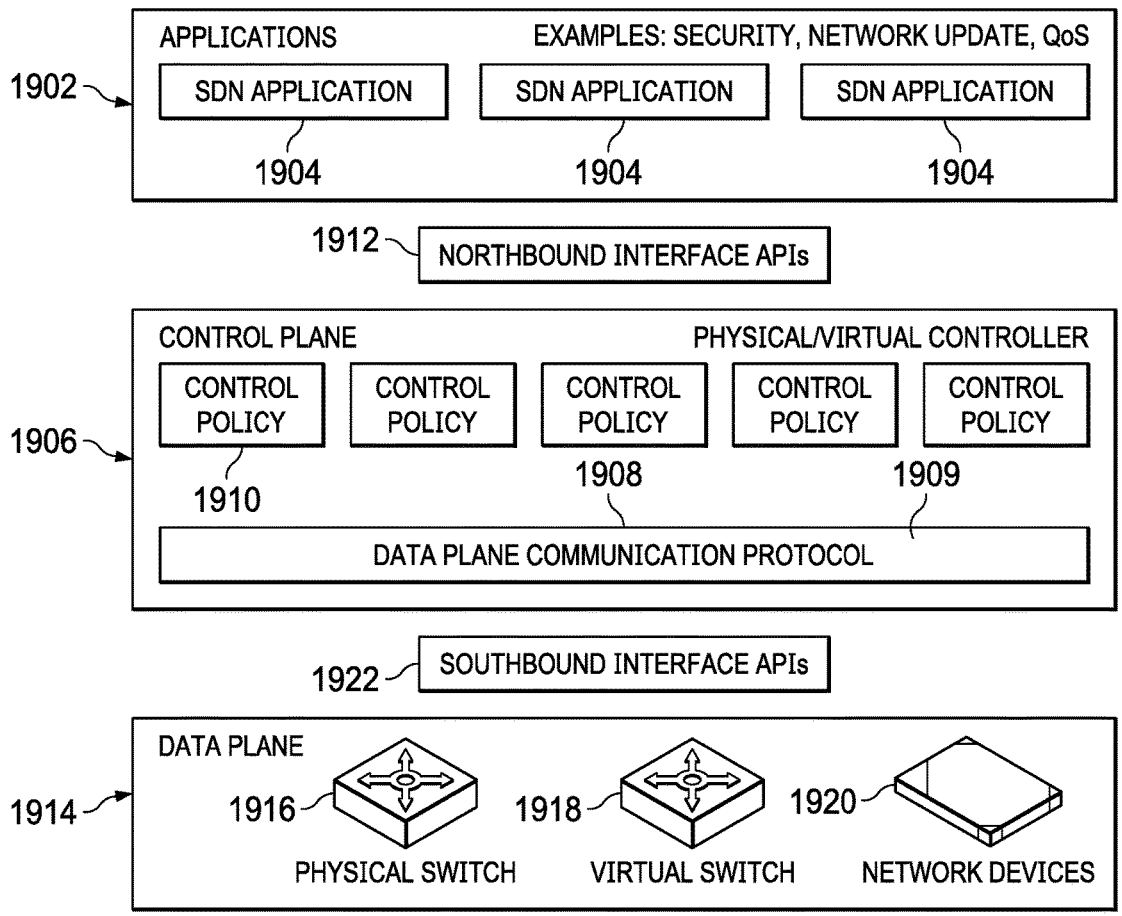
FIG. 19 illustrates software defined network architecture.

FIG. 19 depicts the SDN architecture. There are three different layers. The application layer 1902 covers an array of applications 1904 focusing on network services, and they are mainly software applications communicating with the control layer 1906. As the core of SDN, the control layer

1906 consists of a centralized controller 1908, which logically maintains a global and dynamic network view, takes requests from the application layer 1902, and manages the network devices via standard protocols 1909 using control policies 1910. Communications between the applications layer 1902 and the control layer 1906 occur through application program interfaces 1912. The data-plane layer 1914 provides infrastructure including switches, routers and network appliances through physical switches 1916, virtual switches 1918 and network devices 1920. In an SDN context, these devices are programmable and support standard interfaces. Communications between the control layer 1906 and the data plane layer 1914 occur via application program interfaces 1922.

The application layer 1902 utilizes the northbound APIs 1912 to communicate with the SDN controller 1906 (Control Plane Layer), which enable different control mechanisms for the networks. The southbound APIs 1922 define the communication interface between the controller layer 1906 and data plane devices within the data plane layer 1914, which enable the application to control the forwarding device is a flexible and programmable manner.

NFV Versus SDN

NFV and SDN are closely related and highly complementary to each other. NFV can serve SDN by virtualizing the SDN controller 1906 (which can be regarded as a network function) to run on the cloud, thus allows dynamic migration of the controllers to the optimal locations. In turn, SDN serves NFV by providing programmable network connectivity between virtual network functions (VNFs) to achieve optimized traffic engineering and steering. However, NFV and SDN are completely different from the concepts to the system architecture and functions, which are summarized by the following aspects.

Figure 20:
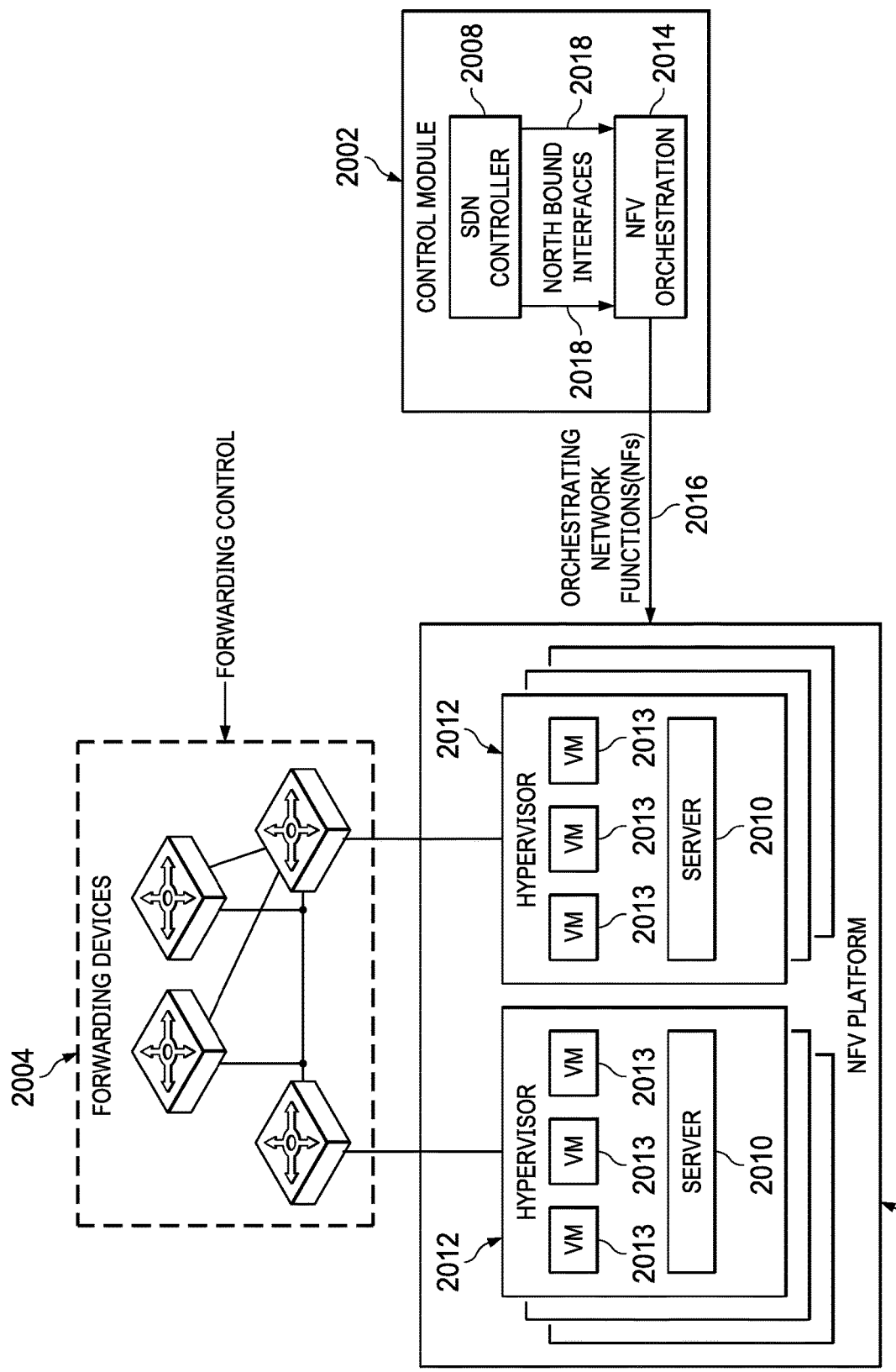
FIG. 20 illustrates a software defined network function virtualization system.

NFV is a concept of implementing network functions in software manner, while SDN is concept of achieving centrally controlled and programmable network architecture to provide better connectivity. NFV aims at reducing CapEx, OpEx, and space and power consumption, while SDN aims at providing network abstractions to enable flexible network control, configuration and fast innovation. NFV decouples the network functions from the proprietary hardware to achieve agile provisioning and deployment, while SDN decouples the network control plane from the data Software-Defined NFV Architecture The software-defined NFV system is illustrated in FIG. 20. The system consists of a control module 2002, forwarding devices 2004 and NFV platform 2006 at the edge of the network. The logic of packet forwarding is determined by the SDN controller 2008 and is implemented in the forwarding devices 2004 through forwarding tables. Efficient protocols, e.g., OpenFlow, can be utilized as standardized interfaces in communicating between the centralized controller 2002 and distributed forwarding devices 2004. The NFV platform 2006 leverages commodity servers 2010 to implement high bandwidth NFs (network functions) at low cost. Hypervisors 2012 run on the servers 2010 to support the VMs 2013 that implement the NFs. This platform 2006 allows customizable and programmable data plane processing functions such as middle box of firewalls, IDSs, proxies, which are running as software within virtual machines, where NFs are delivered to the network operator as pieces of pure software.

Figure 21:
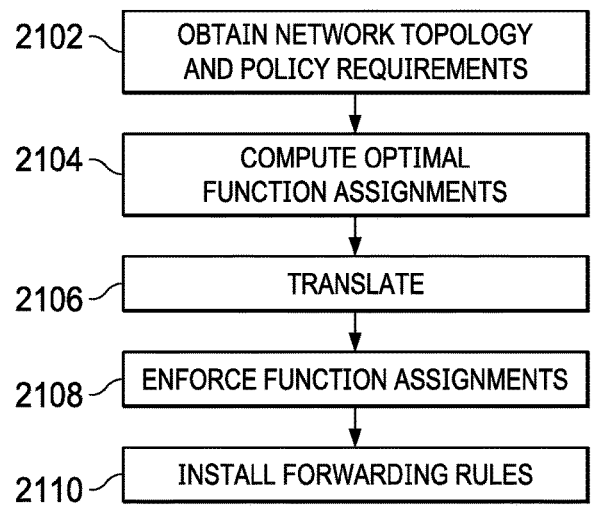
FIG. 21 illustrates a flow diagram describing a process for provisioning functions.

The SDN controller 2008 and the NFV orchestration system 2014 compose the logical control module 2002. The NFV orchestration system 2014 is in charge of provisioning for virtualized network functions 2016, and is controlled by the SDN controller 2008 through standard interfaces 2018. Referring now to FIG. 21, there is illustrated a process for provisioning functions. After obtaining the network topology and policy requirements at step 2102, the control module 2008 computes the optimal function assignments (assigning network functions to certain VMs) at step 2104 and translates at step 2106 the logic policy specifications into optimized routing paths. The function assignments are enforced at step 2108 by the NFV orchestration system 2014, and the controller 2008 steers the traffic traveling through the required and appropriate sequence of VMs 2013 and forwarding devices 2004 by installing forwarding rules into them at step 2110.

From Middle Box to NFV

Though NFV is not limited to virtualizing middle boxes, the concept of NFV was initiated in the context of middle box. The present disclosure introduces the evolution from a traditional purpose-built middle box to NFV, during which consolidated middle box and software-defined middle box act as transitional paradigms.

Middlebox Overview

A middle box is a networking forwarding or processing device that transmits, transforms, filters, inspects or controls network traffic for purposes of network control and management. A middle box service or function is a method or operation performed by a network device that needs specific intelligence about the applications. Typical examples of middle boxes include network address translators (NATs) that modify packet's destination and source addresses, and firewalls that filter unwanted or malicious traffic. The following are commonly deployed middle boxes:

1) Network Address Translator (NAT)
2) Firewall (FW)
3) Intrusion Detection System (IDS)
4) Load Balancer (LB)
5) WAN Optimizer
6) Flow Monitor (FM)

Consolidated Middlebox

Here, an overview for the efforts on consolidating middle boxes is provided, which are precursors to the current NFV paradigm.

1) CoMb
2) APLOMB
3) Integrate Middle Boxes into Network

Software-Defined Middlebox

As SDN evolves, the principles of abstracting the architecture layer of network from the control plane 1906 and data plane 1914 have been investigated in various contexts. This idea introduces some unique opportunities for the development of middle boxes. Inspired by the idea of SDN, some researchers proposed a software-defined middle box and corresponding networking architecture, with the aim of providing fine-grained and programmable control over the middle box state and network forwarding.

Service Chaining

Service chaining is an important model for network service providers, in which NFV plays an important role. It is utilized to organize the service function deployment, where the ability of specifying an ordered list of service processing for the service's traffic flows is provided. A service chain defines the required processing or functions and the corresponding order that should be applied to the data flow. These chains require the integration of service policy and the above applications to achieve optimal resource utilization.

Traditional service chaining mainly relies on manual configuration which is tedious, error-prone and clumsy.

SDN provides new capabilities to steer traffic dynamically based on user requirements. However, hardware-based middle boxes limit the benefit of SDN due to their fixed functionalities and deployment. NFV is a good enabler for SDN. With the ability of dynamic function provisioning offered by NFV and the centralized control of SDN, new opportunities emerged in service chaining. Better performance and resource utilization can be achieved with the software-defined NFV architecture.

SDN & Middle Box Based Service Chaining

SDN offers the flexible control approach and enables dynamic traffic forwarding, and this style of traffic control for middle box-specific flow can realize flexible and efficient service chaining with no need to generate any placement or introduce some constraints on middle boxes, which are on the other hand easily supported by current SDN standards. The following are some of the important functions:
1) Symple
2) Steering
3) Flowtag Service Chaining in the Software-Defined NFV Architecture SDN and NFV together have the potential to benefit service operators, satisfy user service level agreements and accurately monitor and control network traffic, which further reduces and minimizes the operating cost. On one hand, NFV moves network functions out of dedicated hardware boxes to the software based on general hardware platform. SDN moves control functions out of the hardware and places it in the software controller. Therefore, the service deployment and service chains can be provided and reconfigured in the controller. In this way, not only flexible and dynamic operations are allowed, the chance for operation error and events will be much smaller because the network controller has an overall view, which reduces the probability of inconsistent configurations.

Moving the required network functions into software means that deploying the service chain no longer requires acquiring a dedicated middle box. In this case, the network functions execute as the software running on virtual machines with the control of a hypervisor 2012, which enable flexible computational and networking resource provisioning. Thus, since the computational capacity can be increased when required, there's no need to over-provision. On the other hand, software-defined NFV service chaining also helps the network upgrade process. For geographically distributed networks, upgrading network devices is costly. Moreover, the errors in the network updates and re-configuration can bring down the entire network. However, with the software-defined NFV, service providers are able to create new chains without radically changing hardware. Finally, service operator can utilize these service chaining techniques by themselves, instead of using third party providers. With intelligent service chaining, complexity of resource provisioning is significantly reduced. Thus, service providers can deliver services on demand without the help of third parties.

Figure 22:
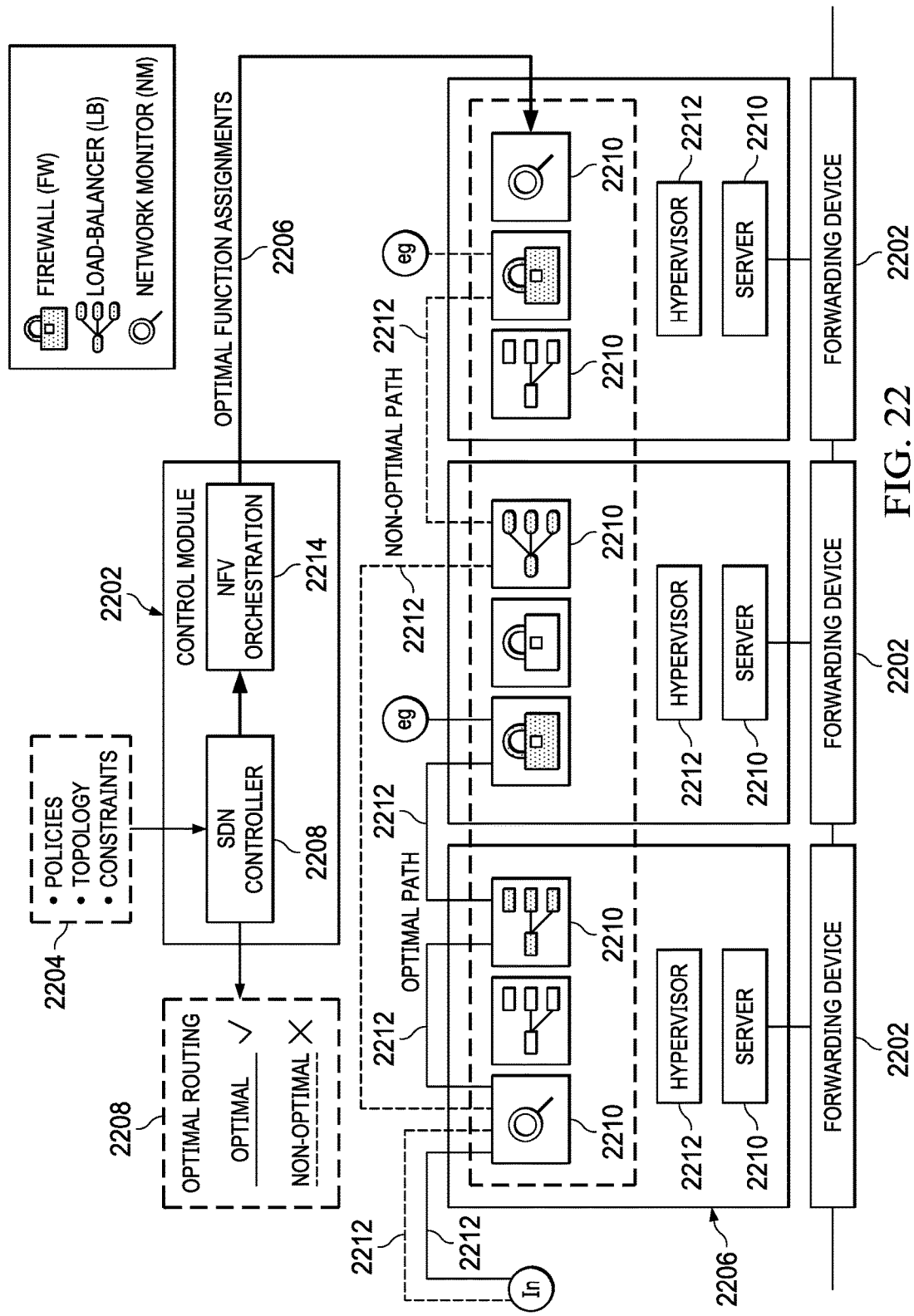
FIG. 22 illustrates an example of a service chaining process.

FIG. 22 illustrates an example of the service chaining process. Within a software-defined NFV architecture, a unified control and orchestration framework 2002 is required to integrate the SDN controller 2008, forwarding elements 2202 and virtual network functions 2073. Moreover, due to the existence of dynamic function and resource provisioning, this framework should also provide coordinated control of both network forwarding state and network functions states. Taking user policies 2204 as inputs, the control module 2002 assigns the NFs 2206 fulfilling these services in an optimal way and meanwhile the optimal routing paths 2208 of all policies are selected taking account of the resource constraints. The service functions 2210 are then chained by the centralized controller and the traffic flows 2212 are steered according to the service chains.

Challenges and Problems of Network Function Virtualization

NFV is an important innovation and a promising approach for the service operators and providers. However, it also faces several challenges. Here the corresponding challenges, open problems, and related solutions are summarized with the classifications organized in Table 1.

Function Virtualization

The virtualized functions should meet performance requirements to support packet processing at line-rate for multiple tenants. First, since neither the hypervisors 2012 nor the virtual machines 2073 have been optimized for the processing of the middle box, obtaining high performance, i.e., high I/O speed, fast packet processing, short transmission delays, etc. from standard servers is the main challenge for function virtualization. Further, as a server may implement a large amount of functionality, their platforms should host a wide range of virtual machine 2013 and software packages. Finally, NFV hardware and software platforms should support multi-tenancy, because they are concurrently run by software belonging to the different operators. These co-located VNFs 1804 should be isolated not only from a security but also a performance point of view. Here is a summary of some important related works on function virtualization.

1) DPDK is a set of libraries and drivers for fast packet processing for the network functions. DPDK can be run on a wide range of processors. However, the DPDK system has some limitation to support virtualization as it cannot support flexible, high performance functionality in the NFV environment.

2) NetVM is a software platform for running diversity network functionality at line-speed based on the general commodity hardware. It takes advantage of DPDK's high throughput packet processing capabilities, and further enables flexible traffic steering and overcomes the performance limitations of hardware switching. Thus, NetVM provides the capability to support network function chains by flexible, high-performance network elements.

3) ClickOS is a high-performance, virtualized software network function platform. It provides small, quickly booting, and little delay virtual machines, and over one hundred of them can be concurrently run while guaranteeing performance on a general commodity server. To achieve high performance, ClickOS relies an extensive overhaul of Xen's I/O subsystem to speed up the networking process in middle boxes. ClickOS is proof that software solutions alone are enough to significantly speed up virtual machine processing, to the point where the remaining overheads are dwarfed by the ability to safely consolidate heterogeneous middle box processing onto the same hardware.

Portability

The NFV framework is expected to support the loading, executing and moving of VNFs 1804 across different but standard servers in multi-vendor environments. This capability is known as portability. These virtualized network functions 1804 defeat the portability goal and key benefits of NFV, namely the capability of multi-tenancy and resource isolation. The portability challenge is how to achieve high performance leveraging hardware accelerators and at the same time have hardware independent NFs. This approach ensures that the VNFs 1804 are OS-independent and resource isolation is also guaranteed since the VNFs 1804 are executed on independent VMs and are decoupled from the underlying OS by the hypervisor layer.

Standard Interfaces

NFV relies on existing infrastructure to touch the customer. In this case, it is also highly unlikely that an upgrade of the physical network or entire operational support systems will be feasible. This is a management software integration challenge with the interfaces between NFV and underlying infrastructure. On the other hand, the interfaces between the centralized controller and VNFs 1804 should also be standardized. To smoothly bridge NFV with upper and lower layers, the VNFs 1804 and the underlying computing platform should be described by standard templates that enable flexible control and management. Thus, north- and south-bound interface APIs 1912, 1922 need to be developed. North-bound interface 1912 interactions are used to control and manage functions to different types of instances, e.g., physical servers, VM 2013 and VNFs 1804. Since network functions need service-oriented APIs to be controlled directly or indirectly, each network service has a specific operation policy and SLA. Moreover, VNFs 1804 could use the north-bound API 1912 for the requests. On the other hand, the south-bound APIs 1922 are utilized to communicate with the NFVI 1806 and request information from other framework entities. Thus, how to design a flexible and efficient API for both the north-bound and south-bound communications are important problems in the research and development of NFV technologies.

Function Deployment

Fine-grained deployment, control and management of network functions are needed in the context of NFV-enabled network nodes, for various optimization purposes. Thus, many challenges are related to algorithm and system design of function deployment.

One of these challenges is to automatically provide network and function process resources according to the usage of the resources involved. A similar and probably even more important challenge is to achieve automatic placement and allocation of the VNFs 1804, since the placement and assignment of the VNFs 1804 significantly impact the performance of service chaining. Both automated provisioning and placement require a global view of the resources and a unified control and optimization system with various optimization engines running in it. Another issue is to translate higher-level policies, which are generated from the resource allocation and optimization mechanisms, into lower level configurations. Templates and standards should be developed to guarantee automated and consistent translation. For example, when there is a need to achieve a high-level goal of reducing the networking transmission delay, the optimization engine may require an algorithm to provision and place virtual functions ensuring that the least overall transmission delay is achieved. Conversely, when it is required to achieve the minimum or maximum link utilization, it would need a different optimization engine with a different algorithm. For more effective operation and control, the optimization approach should support real-time swap to make provisioning and placements that dynamically match the high-level policies from the operator and application.

Traffic Steering

SDN offers the new agility of traffic steering by allowing the network operators and service providers to specify a logical control policy, and then automatically translates this into data plane 1914 forwarding rules. Prior to this, the routing paths are carefully selected by the optimization framework taking into account the physical topology, link capacities, and network resource constraints. Solid work has been done on traffic steering in hardware based middle box systems. However, in the software-defined NFV architecture, traffic steering is jointly optimized with NFV deployment that can achieve better composition. However, the unified optimization paradigm also makes the optimization problem difficult to solve since more variables are introduced. To achieve online computing of traffic steering, heuristic algorithms should be designed to reduce the computing complexity.

TABLE 1

| Challenges | Description | Solution |
|---|---|---|
| Function Virtualization | Virtualized functions should meet certain requirements to support packet processing at line-rate:<br>(1) High performance (high I/O speed, fast packet processing, short transmission delays, etc.)<br>(2) Support multi-tenancy<br>(3) OS-independent | Important related works:<br>(1) DPDK, a set of libraries for fast packet processing.<br>(2) NetVM, a system for running network functionality and middlebox at line-speed in general commodity hardware.<br>(3) ClickOS, a small, quick-boot, low-delay, virtualized software middlebox platform. |
| Portability | The NFV framework is expected to load, execute and move VNFs across different but standard servers in multi-vendor environments. This capability is known as portability. | Deploying network functions via a virtual software environment enhances the portability. This approach ensures that the VNFs are OS-independent and resource isolation is also guaranteed. |
| Standard Interfaces | Standardized API should be developed to enable NFV to reach the customers via underlying infrastructure and to be centrally controlled and managed. | Both VNFs and computing resources are described via standard templates. Normalized north- and south-bound should be developed between these layers. |
| Function Deployment | Fine-grained deployment, control and management of network functions, are needed in the context of NFV-enabled network nodes, for various optimization purposes. | A monitoring system collecting and reporting on the behavior of the resources, and a unified control and optimization system with various optimization engines should be developed. |
| Traffic Steering | In the software-defind NFV architecture, traffic steering should be jointly optimized with function deployment, making the optimization problem difficult to solve. | To achieve online computing of traffic steering, heuristic algorithms should be designed to reduce the computing complexity. |

Applications

Software-defined NFV technology is used for delivering significant benefits in niche applications today, while its full scale use and benefits have yet to be achieved. The following describes the major domains of the software-defined NFV scenario.

Cloud-Computing

Cloud computing enables globally distributed services and enterprises to quickly deploy, manage and optimize their computing infrastructure dynamically. Partitioning or replicating a service across multiple globally distributed instances allow these services to move closer to the users thus providing richer user experiences, avoid infrastructure bottlenecks, and implement fault tolerance.

NFV is an enabler of such dynamic service provisioning. By replacing service elements with virtual network functions, new functions can be added or improved by updating a software image, rather than waiting for a vendor to develop and manufacture a dedicated box. Furthermore, while integrated with SDN, service providers can express and enforce application traffic management policies and application delivery constraints at the required level of granularity.

NFV allows service providers to provide better services to the users by dynamically changing their deployment topologies or traffic allocations based on user access patterns, user consumption and mobility, infrastructure load characteristics, infrastructure failures and many such situations that may cause service degradation, disruption or churn. Similarly, replicated service instances might need to be moved/instantiated/released to mask infrastructure failures, load conditions, or optimize the deployment based on consumption patterns and social interaction graphs. NFV can also provide intelligent infrastructure support for such dynamic service deployment scenarios. Moreover, since NFV offers good support for multi-tenant usage, it is available for wide area dynamic multi-cloud environments that can be shared by multiple providers to implement their specific distributed service delivery contexts.

Below are summarized some important works trying to implement NFV in clouds:
1) CloudNFV
2) THE REALTIME CLOUD
3) CLOUDBAND Mobile Network NFV considers all network functions for virtualization through well-defined standards, i.e., in mobile network, NFV targets at virtualizing mobile core network and the mobile-network base station. NFV also benefits data centers owned by mobile service providers, including mobile core network, access networks and mobile cloud networks.

For the core networks, which are the most important part of mobile networks, NFV allows the cellular providers to adopt a network more akin to the data centers, which consist of simple forwarding devices 2004, with most functionality executed in commodity servers that are close to the base stations. Some network functions can even be fulfilled by packet-processing rules installed directly in the switches. In the system, a logically centralized controller is able to steer the network traffic through the required network functions to realize service chaining.

For the access networks, the base stations are being virtualized as well. Thus, SDN and NFV are applied to the wireless access networks to sharing their remote basestation infrastructure along with optimization with constraints to achieve better coverage and services with the minimum investment of CapEx and OpEx.

Enterprise Network

NFV is also being utilized in the enterprise network. Network managers would like to consume as much or as little of the network as they need, but there is a gap between what enterprise customers want and what service providers can offer today, which can be address by NFV. It enables the dynamic provisioning of virtual network services on commodity servers within minutes instead of months.

NFV for the enterprise will require their platform to become more comfortable embracing software L4-7 services, as well as changes in their operation models. An understanding of how to optimize performance with DPDKs, and potentially even looking at programmable hardware is critical. Another challenge is the time and process it takes to re-architect monolithic services that were predominantly deployed for north-south traffic.

A comprehensive overview of NFV within the software-defined NFV architecture is provided. NFV and its relationship with SDN has been introduced. The evolution of NFV has been reviewed and the discussion has covered how middle boxes evolved to virtual network functions. In particular, service chaining as a typical application of NFV has been described. Furthermore, software defined NFV challenges and possible solutions were covered. Next, a discussion of how to take the SDN and NFV concepts and leverage them in planning, designing and implementing a wireless backhaul, fronthaul and last mile access networks using standard based protocols as well as open source protocols will be provided.

Figure 23:
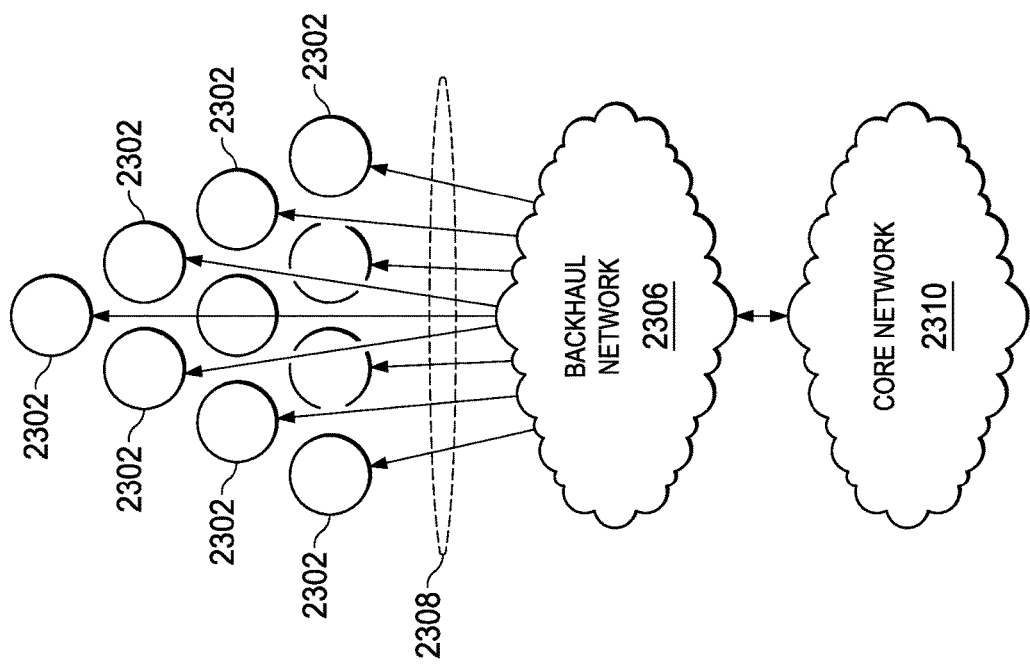
FIG. 23 illustrates a wired backhaul network.

Access and backhaul networks need to carry significantly more data in order to support ever growing data use within networks which calls for network densification. However, as illustrated in FIG. 23, when many small cells 2302 are densely deployed within a small cell network 2304, the backhaul network 2306 may become a bottleneck due to the issues with providing a wireline link 2308 between each cell 2302 in the backhaul network 2306 due to the large number of wireline connections within a network. The backhaul network 2306 then further provides interconnection to the core network 2310 for passing messages to and from the small cell network 2304.

Figure 24:
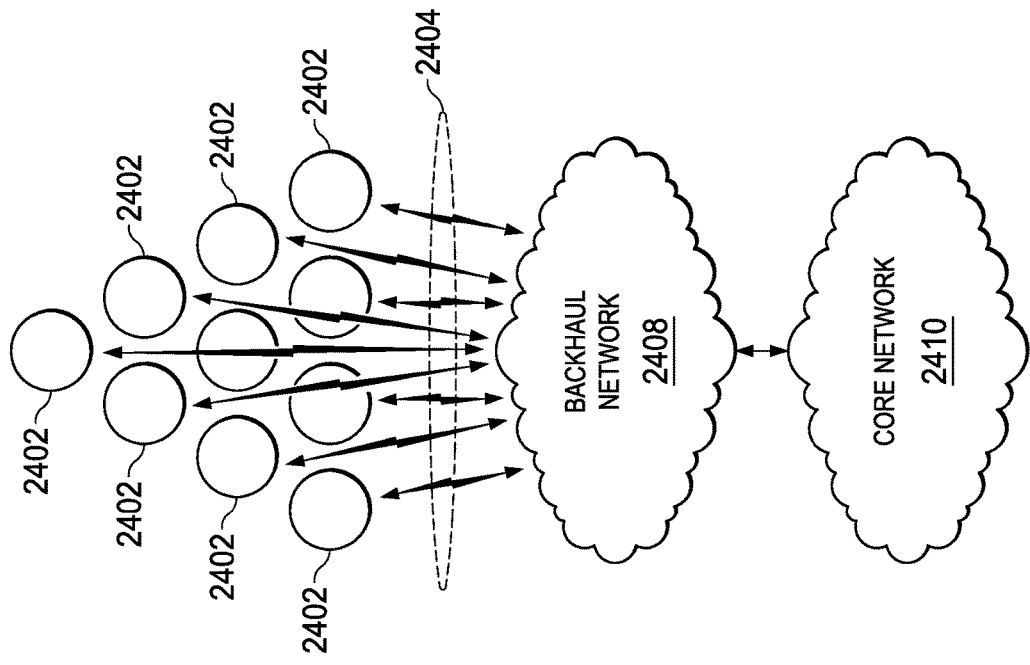
FIG. 24 illustrates a wireless backhaul network.

Referring now to FIG. 24, there is illustrated an implementation of a wireless small cell network 2402. The small cell wireless backhaul network 2402 is needed due to its multi-hop operation and ability to operate in multiple bands (mmWave bands, Sub 6 GHz bands and free space optical (FSO) bands. The small cell network 2402 provides a plurality of wireless connections 2404 between the cells 2406 and the backhaul network 2408. The backhaul network 2408 then forwards messages received on the wireless communications links 2404 to/from the core network 2410.

Figure 25:
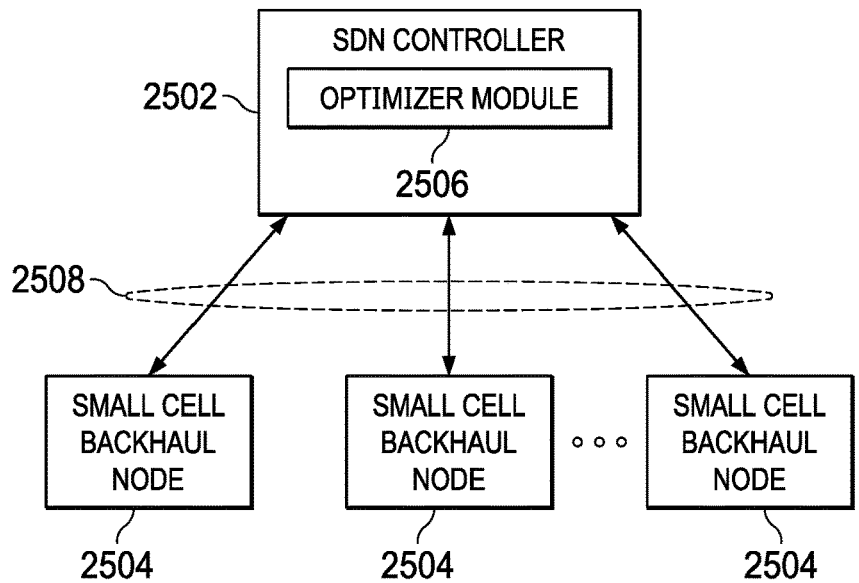
FIG. 25 illustrates a manner for using an SDN-based system for creating connections with the small cell network.

Referring now also to FIG. 25, there is illustrated the manner to utilize an SDN-based system for creating the connections with the small cell network 2402. An SDN controller 2502 enables connections to a number of different small cell backhaul nodes 2504. The SDN controller 2402 is based on OpenDaylight and controls adaptively powering on/off small cells 2504 and reconfigures the backhaul forwarding topology according to traffic demands. OpenDaylight is a collaborative open source project hosted by the Linux foundation. OpenDaylight promotes software defined networking (SDN) and network function virtualization (NFV). OpenDaylight software is written in the Java programming language. OpenDaylight supports technologies such as OpenFlow. OpenDaylight is a modular open platform for customizing and automating networks of any size and scale. OpenDaylight is driven by a global, collaborative community of vendor and user organizations.

The core of the OpenDaylight platform is the Model-Driven Service Abstraction Layer (MD-SAL). In OpenDaylight, underlying network devices and network applications are all represented as objects, or models, whose interactions are processed within the SAL. The SAL is a data exchange and adaptation mechanism between data models representing network devices and applications. The data models provide generalized descriptions of a device or application's capabilities without requiring either to know the specific implementation details of the other. Within the SAL, models are simply defined by their respective roles in a given interaction.

The OpenDaylight platform is designed to allow downstream users and solution providers maximum flexibility in building a controller to fit their needs. The modular design of the OpenDaylight platform allows anyone in the OpenDaylight ecosystem to leverage services created by others; to write and incorporate their own; and to share their work with others. OpenDaylight includes support for the broadest set of protocols in any SDN platform—OpenFlow, OVSDB, NETCONF, BGP and many more—that improve programmability of modern networks and solve a range of user needs.

The SDN controller 2402 uses an optimizer module 2506 that is configured with different policies as more fully described herein below in order to minimize the power and latency and maximize system capacity. The optimizer module 2506 uses SDN for the operation and management of small cell wireless networks to extend the OpenFlow protocol in order to gather wireless and power consumption statistics, which are exchange between the controller 2502 and small cell backhaul nodes 2504 using and an LTE out of band control channel 2508. OpenFlow is a communication protocol that provides access to the forwarding plane of the network switch or router over the network. OpenFlow enables network controllers to determine the path of network packets across a network of switches. The controllers are distinct from the switches. The separation of the controller from the forwarding allows for more sophisticated traffic management than is feasible using access control lists and routing protocols. Also, OpenFlow allow switches from different vendors to be managed remotely using a single, open protocol. OpenFlow is an enabler of software defined networking.

OpenFlow allows for the remote administration of a layer 3 switch's packet forwarding tables, by adding, modifying and removing packet matching roles in action. Routing decisions can be made periodically or ad hoc by the controller and translated into rules and actions with a configurable lifespan, which are deployed to a switch's flow table, leaving the actual forwarding of matched packets to the switch at wire speed for the duration of those rules. Packets which are unmatched by the switch can be forwarded to the controller. The controller decides to modify existing flow table rules on one or more switches or to deploy new rules, to prevent a structural flow of traffic between switch and controller. It could even be decided to forward the traffic itself, provided that it is told the switch to forward entire packets instead of just the header. The OpenFlow protocol is layered on top of the transmission control protocol and proscribes the use of transport layer security.

Figure 26:
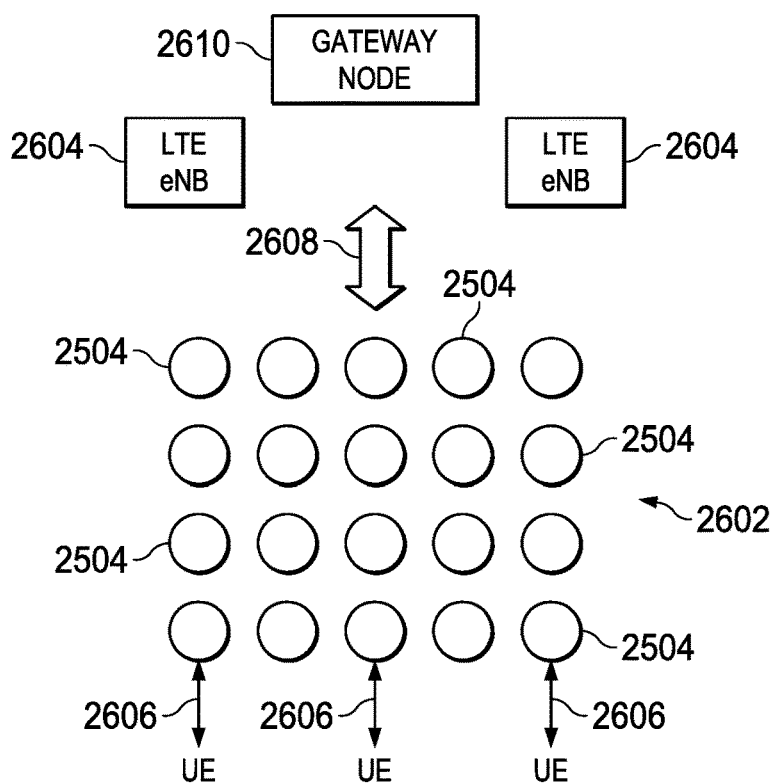
FIG. 26 illustrates a heterogeneous network.

Referring now to FIG. 26, there is illustrated a heterogeneous network (HetNet) 2602. In HetNet, a dense small cell network 2602 is comprised of a number of small cell nodes 1004 that coexist with an overlay of LTE eNBs 2604 providing the basic coverage. In such a deployment, traffic from user equipments (UE) 2606 is forwarded from the small cell node 2604 over multiple wireless backhaul links 2608 to a gateway node 2610, which is typically co-located at the eNBs 2604. Thus, in a multi-hop deployment, routing and forwarding are crucial aspects to consider, since they have to dynamically power on and off nodes 1004, according to traffic demand changes creating a liquid wireless backhaul were network resources are used where they are needed. Multi-hop deployment is used for routing and forwarding of the data plan over a multiband (mmWave, sub 6 GHz and FSO) network.

With software defined networking (SDN), packet forwarding can be handled by a centralized controller 2502 (FIG. 25), in a flexible and effective way. Adding device configuration capabilities for this kind of architecture allows small cell wireless networks to be fully managed. In a typical SDN-based architecture, the SDN controller 2502 sends OpenFlow messages that must be routed over the wireless links 2508 towards the 2504. This can lead to potentially long latency.

Figure 27:
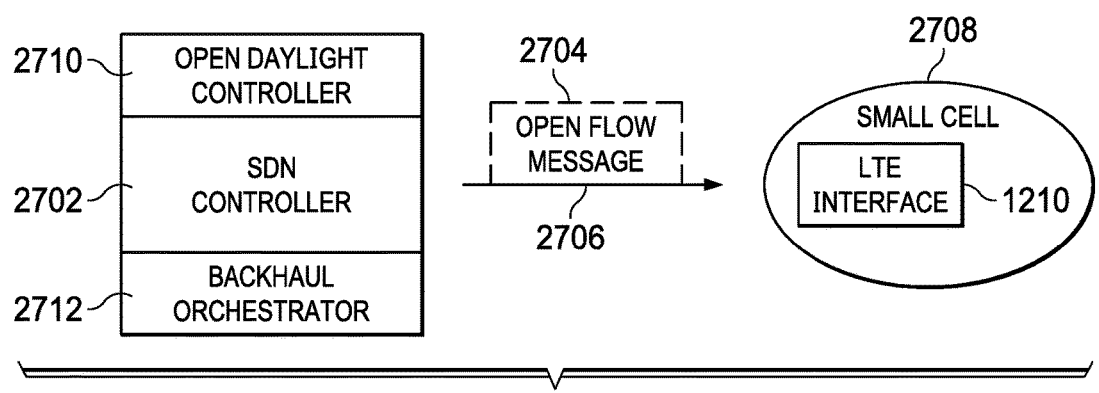
FIG. 27 illustrates communications between an SDN controller and a small cell using OpenFlow messages.

An SDN-based network architecture for small cell backhaul operation and management is proposed for dealing with these latency issues. Referring now to FIG. 27, based on the HetNets concept, the proposed SDN controller 2702 transmits an OpenFlow messages 2704 via LTE control channels 2706 directly to small cell nodes 2708. Extensions to the OpenDaylight (ODL) controller 2710 provide the necessary resilient routing infrastructure for a small cell backhaul operation. A backhaul orchestrator 2712 dynamically optimizes the small cell backhaul by minimizing power and latency while maximizing the capacity of the backhaul network.

Referring now also to FIG. 13, there is illustrated a more detailed description of a backhaul network KPI (key performance indicator) 1302. The backhaul network KPI 1302 is implemented within the SDN controller 2702 to enable communications between the SDN controller and small cells within the small cell backhaul network. As mentioned previously, the OpenDaylight controller 2710 provides routing infrastructure for the small cell backhaul operation. The OpenDaylight controller 2710 utilizes an application program interface 1304 for enabling communications between the controller 2710 and a backhaul orchestrator 2712. The backhaul orchestrator 2712 dynamically optimizes the small cell backhaul by minimizing power and latency while maximizing the capacity of the backhaul network. The backhaul network KPI 1302 must maintain a communication channel 2706 with the SDN controller 1304 in order to be able to exchange control plane messages with the small cell nodes 2708. This communication channel 2706 can be established in the same network interface as the one used for the data plane (in-band connectivity) or in a different interface (out-of-band). With in-band connectivity, the infrastructure costs are reduced, but if link failure occurs, the node loses the connection with the controller 2710. Out-of-band control plane connectivity requires an additional NIC (network interface controller) in the managed devices. An LTE interface 2710 is used on each SDN enabled small cell backhaul node 1310 for SDN control plane connectivity, in order to provide a robust channel and reduce SDN control latency while the data plane is using the multi-hop backhaul connectivity over a multiband (mmWave, sub 6 GHz and FSO) network.

Figure 28:
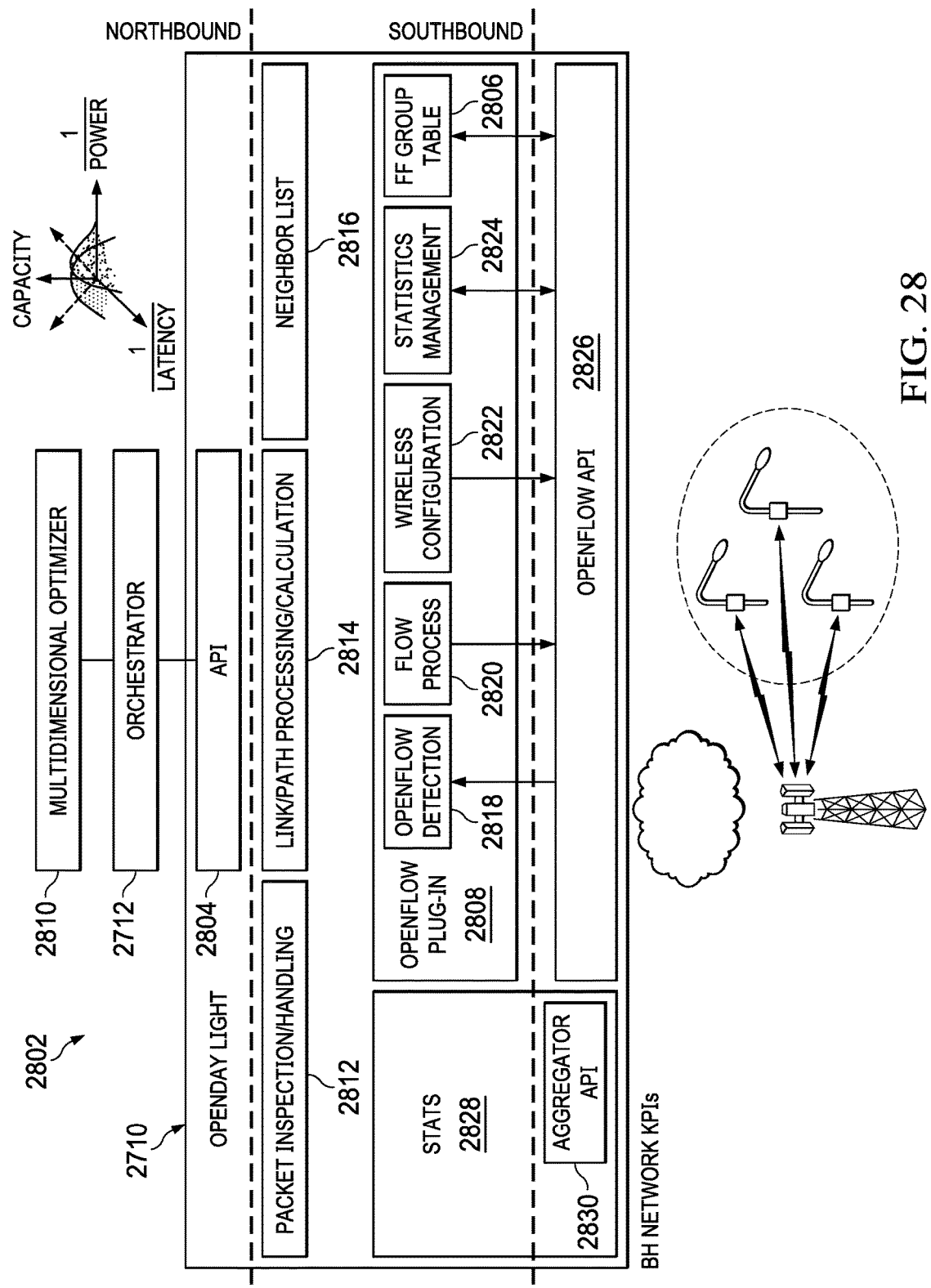

Small cell wireless backhaul links may have dynamic link outages, especially when operating at mmWave band. A link can temporarily go from non-line of sight to outage (e.g. due to blockage), leading to changes in the backhaul topology and consequently, in the available capacity. When such events happen, the SDN controller 2702 can perform path recalculation between the backhaul small cell nodes 2708 but the process may take a significant amount of time. The backhaul network KPI 2802 as illustrated in FIG. 28 uses fast failover (FF) group tables 2806 from the OpenFlow plug-in 2808 to rapidly repair link failures locally.

The backhaul orchestrator 2712 communicates with the multidimensional optimizer 2810. The Orchestrator Interface 2804 is used to communicate with the backhaul orchestrator 2712 in order to perform the reconfiguration of the small cell backhaul network. Also, this configuration can be triggered by the backhaul orchestrator 2712 through this REST API. The new configurations are pushed to the wireless communications services (WCS) and new paths are requested to the Path Calculator. The multidimensional optimizer 2810 finds a maximum value based upon latency, capacity and 1/power using Euler-Lagrange multipliers. The backhaul network KPI 2802 further includes a packet inspection/handling module 2812. The packet inspection/handling module 2812 inspects and controls the data packets that are transmitted over the communications channels 2703 to the small cell nodes 2708. The packet inspection/handling module 2812 parses packets sent to the SDN controller 2702 (e.g. for new flows when no rules are installed at the small cell backhaul nodes 2708). The extracted information is sent to the path calculator 2814, which replies with a primary path from the source to the destination node according to a given path calculation strategy. The original packet is then sent back to the destination node.

The path calculator 2814 is responsible for calculating alternate paths to the small cell nodes 2708 when existing links fail. The path calculator 2814 computes paths between the powered on small cell backhaul nodes 2708 and instructs the installation of new forwarding rules. The path calculator 2814 uses a network graph that contains only the active nodes. If the fast failover (FF) strategy is active, a maximum disjoint path is also calculated from each intermediate node, and the required forwarding rules are installed in combination with the usage of the FF group table 2806 feature from OpenFlow. The link/path processing calculation module 2814 uses information from the neighbor list 2816 to make the new path calculations. The neighborhood mapper 2816 is a database list of small cell nodes and their associated neighboring nodes. The neighborhood mapper 2816 infers the neighborhood and interference graph for each node/link from the existing topology. Small cell backhaul nodes 2708 send out periodic beacons to neighbors. The collected information statistics are sent to the SDN controller 2702 and used to augment existing data from the backhaul links The OpenFlow plug-in 2808 includes an OpenFlow detection module 2818 for detecting OpenFlow messages. The flow process module 2820 calculates the message routing. The wireless configuration service 2822 sends wireless specific configuration requests to the managed small cell backhaul nodes 2708 through an OpenFlow protocol extension. The Wireless Statistics Manager 2828 collects wireless related statistics from the managed small cell backhaul nodes 2708 over an aggregator API 2830 through an extension of the statistics manager component 2824 from the OpenFlow Plugin 2808. The statistical information is fed to the statistics module 2824 from the small cell nodes 2708. The requests and statistics can have different types, which are specified by a bit mask field in the request body. Each of the modules within the OpenFlow plugin 2808 communicates with the small cell nodes 2708 through an OpenFlow API 2826. A metrics collector 2828 is responsible for obtaining network performance metrics that cannot be directly retrieved through OpenFlow plug-in 2808. The metrics are obtained through the aggregator API 2830. The calculated data is merged into the available statistics and can be used by every other SDN controller 2702 component.

Figure 29:
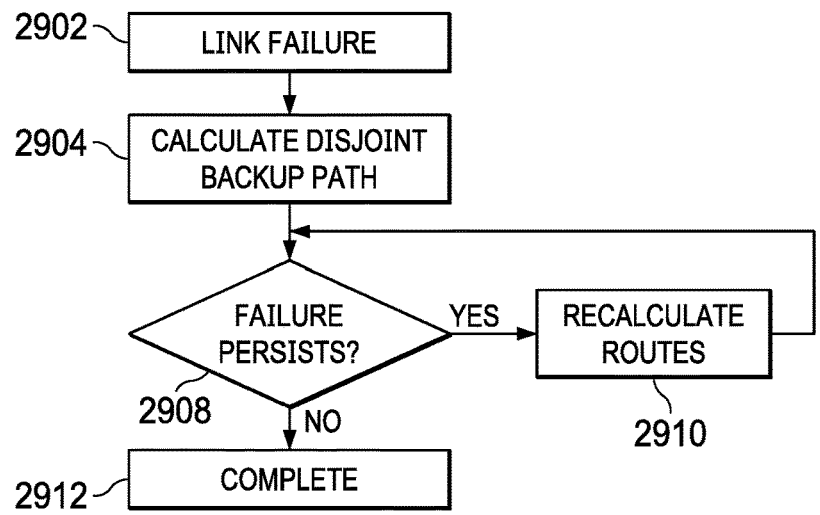
FIG. 29 is a flow diagram illustrating the process for link repair.

Referring now to FIG. 29, there is illustrated a flow diagram of the process for link repair. Upon occurrence of a link failure at step 2902 a disjoint backup path toward the gateway node 2610 at each small cell backhaul node 2504 is calculated at step 2904 using the fast failover group tables 2806. If the failure that triggered the usage of a different network path persists, as determined at inquiry step 2908, the controller 2802 week calculates new routes at step 2910 based upon the current topology and previously calculated energy optimization strategies. Control then passes back to inquiry step 2908 to determine if the failure persists. When the failures do not persist, the process is completed at step 2902.

With SDN it is possible to have flexible path calculation strategies act on detailed forwarding decisions. For multi-hop small cell backhaul networks, it will be essential to control the existing paths latency. This requires an estimation of the delay for each link and path at the SDN controller 2702 which can also depend on existing queuing strategies to implement control of existing paths' latency. Therefore, some flows might be routed along low latency paths, while others are routed to higher latency paths with higher capacity. New routing algorithms might be needed, allowing fast path calculation while supporting multiple constraints (bandwidth, latency, capacity and power). Therefore, the SDN-based network would manage flow rules, wireless link and our management parameters. The SDN based network interacts with a backhaul orchestrator 2712, responsible for optimizing the backhaul network operation.

Figure 30:
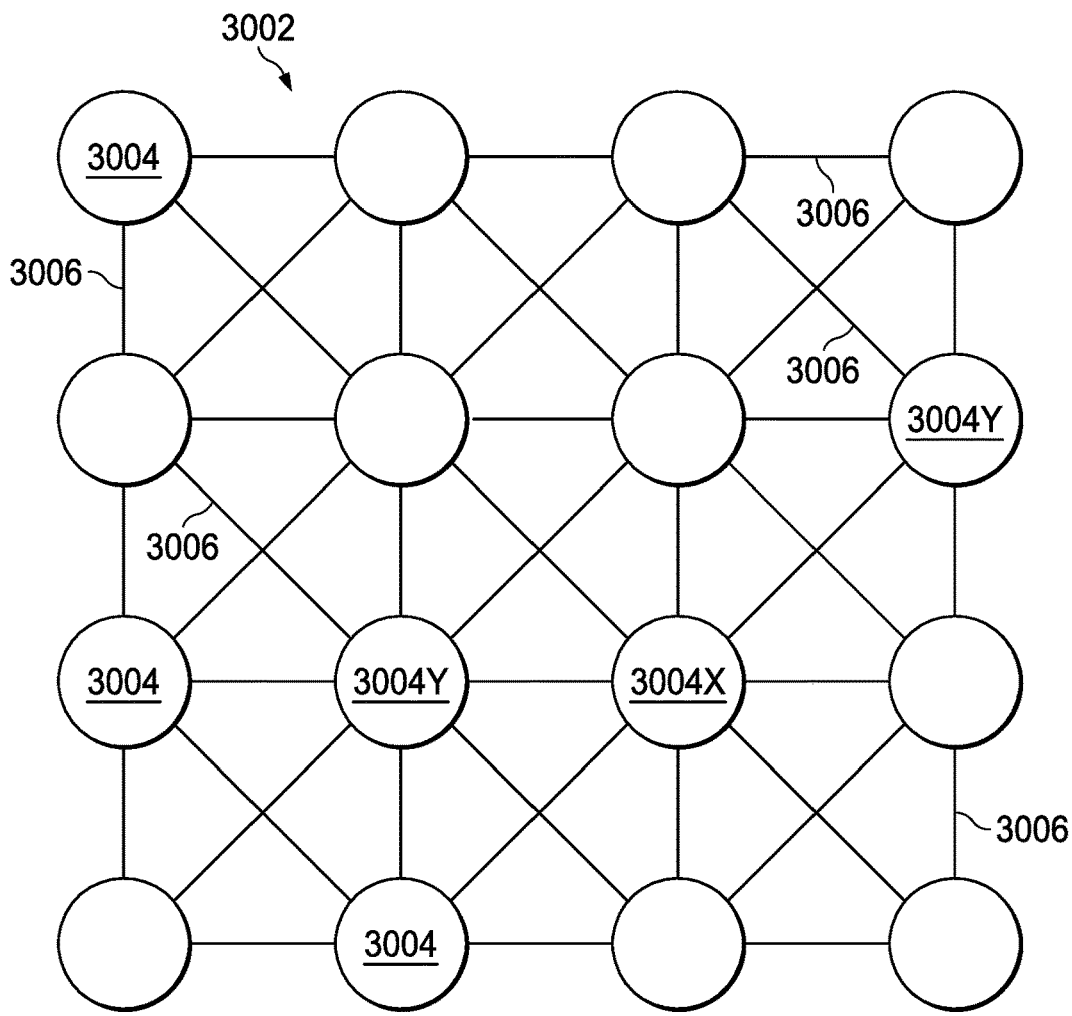
FIG. 30 illustrates a small cell backhaul network.

Due to the increasing traffic demand, existing mobile access and backhaul networks face a capacity problem. In order to increase the capacity, it is customary to deploy many small cells which may be dynamically controlled based upon traffic demand as illustrated in FIG. 30. The small cell backhaul network 3002, as described previously, consist of a plurality of individual small cell nodes 3004 that are interconnected via communication links 3006. Each of the small cell nodes 3004 are interconnected with each of the small cell nodes within its vicinity via one of the communication links. Thus, for example, as illustrated in FIG. 30, node 3004x is interconnected with each of the surrounding nodes 3004y (in this case eight nodes) through an associated communication link 3006. Thus, node 3004x can communicate over the small cell backhaul network 3002 through any of the adjacent small cell network nodes 3004y.

As a consequence, the backhaul fabric for small cell networks 3002 needs to cope with the massive increase in user demands since the laying of fiber to each small cell node 3004 is not economically feasible. It is possible to have mmWave based mobile backhaul networks due to the large chunk of spectrum that is available both in unlicensed bands (the 60 GHz and 70/80 GHz bands) as well as licensed bands of 24, 28 and 39 GHz. However, due to the specific propagation characteristics of the mmWave spectrum, communications links 3006 between small cell nodes 3004 may face challenging network outages. Additionally, a more flexible design of the backhaul network 3002 is desired in order to cope with the diversification of service requirements.

Figure 31:
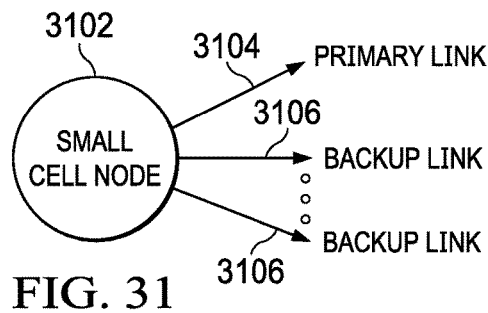
FIG. 31 illustrates a small cell node having a primary link and one or more backup links.

A small cell backhaul network architecture based on the concept of software defined networking will be able to address these issues and provide a mmWave based mobile backhaul network. Referring now to FIG. 31, in order to cope with the dynamics of mmWave, the SDN control plane calculates for each small cell node 3102 a backhaul primary link 3104 and a set of backup links 3106. The set of backup links 3106 include at least one backup link which may be utilized if the primary link 3104 goes out. Using OpenFlow Fast Failover groups such as those described herein above, a fast local repair of a mmWave backhaul link 3006 can be achieved leading to a resilient backhaul mesh architecture. The proposed architecture leads to a lower packet loss and consequently higher throughput data rate and better network reliability.

Figure 32:
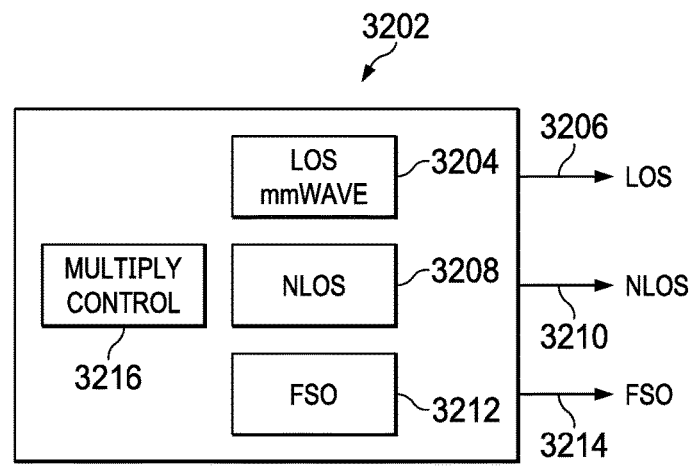
FIG. 32 illustrates a small cell node including means for multiplexing between multiple transceiver types.

Referring now to FIG. 32, network reliability may also be improved utilizing an architecture wherein each node 3202 uses SDN-based channel estimation to multiplex between line of sight (LOS) mmWaves, non-line of sight (NLOS) sub-6 GHz and free space optics (FSO) transmissions. This is achieved using a LOS mmWave transceiver 3204 for transmitting line of sight millimeter waves 3206, an NLOS transceiver 3208 for transmitting non-line of sight sub-6 GHz signals 3210 and a FSO transceiver 3212 for transmitting FSO signals 3214. Multiplexing control circuitry 3216 multiplexes between the LOS mmWave transceiver 3204, an NLOS transceiver 3208 and an FSO transceiver 3212 based upon the environmental and system operating conditions. When the atmospheric conditions are good, the network relies upon the FSO transceiver 3212. When atmospheric conditions become foggy or rainy, the system adaptively switches to RF LOS transceiver 3208 or the LOS transceiver 3204 using the multiplexer control 3216. If the operating environment has many physical obstacles between the transmitter and the receiver, the system would select the NLOS transceiver 3208.

Despite introducing new technologies at lower layers of the protocol such as better modulation and coding schemes or coordinating multipoint transmissions, the predicted demand is much higher than what can be supported with new physical layer only technologies in the short term. A common assumption to provide increased capacity at scale is to use a higher frequency band were more spectrum is available and to reduce the cell size in order to increase spatial reuse. Backhaul operation is often dominated by proprietary solutions which hinder innovation. An important challenge to solve for small cell backhaul links is an efficient but flexible forwarding architecture which relays user data over a multi-hop wireless backhaul between a plurality of small cell nodes.

Figure 33:
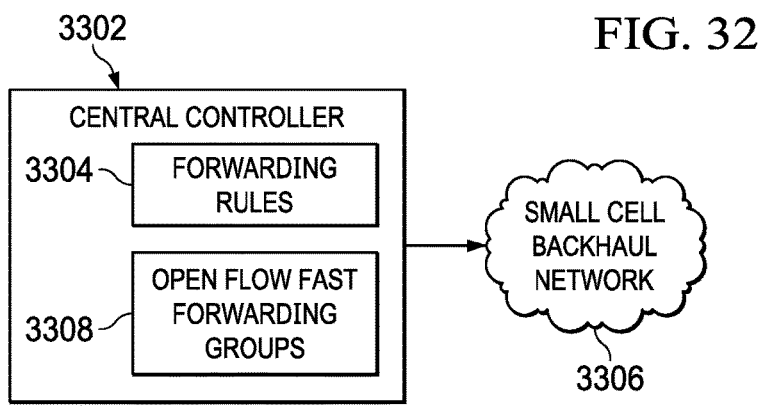
FIG. 33 illustrates an SDN-based architecture for link generation.

Referring now to FIG. 33, in a typical SDN-based architecture, a centralized controller 3302 installs within small cell nodes flexible rules 3304 that determine the forwarding behavior within the data plane. However, a forwarding configuration addressing the inherent resiliency challenges to cope with unstable backhaul links using a combined RF LOS, NLOS and FSO has not been previously addressed. A resilient forwarding configuration of an SDN-based small cell wireless backhaul network 3306 that focuses on SDN-based resiliency mechanisms and uses the concept of OpenFlow fast failover groups 3308 as described hereinabove. The controller 3302 calculates each link 3006 for each small cell node 3004 backup links toward the Gateway. The main link and the backup link are both placed into a fast failover group 3308. The small cell node 3004 uses rapid link monitoring to locally detect if a link is in the outage stage, in which case, the OpenFlow-based fast failover locally switches from a main link to a backup link.

The traditional SDN concept relies on a centralized control plane, which exercises control on forwarding decisions in the data plane. Consequently, the control and data planes are decoupled which allows a very flexible forwarding control. However, using SDN for small cell backhaul links present several challenges. This is because the performance and reliability of mesh-based backhaul networks such as that illustrated in FIG. 30 depends on fast local reactions to topology changes where a centralized control plane is typically too slow to react. Therefore, there been attempts to use proprietary routing and forwarding decisions based on distributed protocols were SDN is used to steer traffic.

Figure 34:
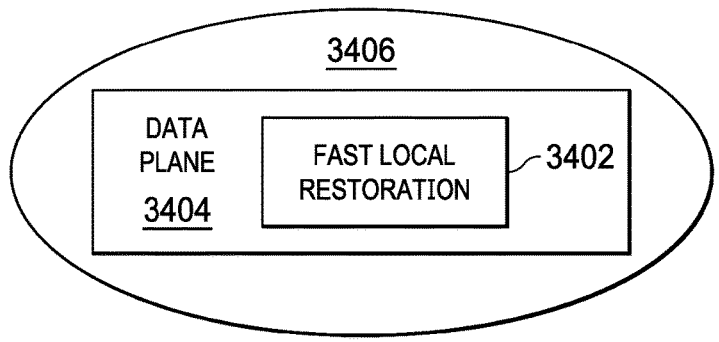
FIG. 34 illustrates a small cell node implementing fast local restoration within its data plane layer.

In an alternative approach as illustrated in FIG. 34, the forwarding decisions inside the backhaul may be configured by the SDN control plane. SDN-based resiliency using fast local restorations 3402 (e.g. implemented inside the data plane 3404 of the cell small backhaul nodes 3406) may be used whenever local problems such as link outage transitions of the millimeter wave backhaul links are detected. This local repair mechanism, which can be preinstalled, avoids the need to ask the controller how to react in a case when a neighbor node cannot be reached anymore and leads to a more robust data plane behavior.

Figure 35:
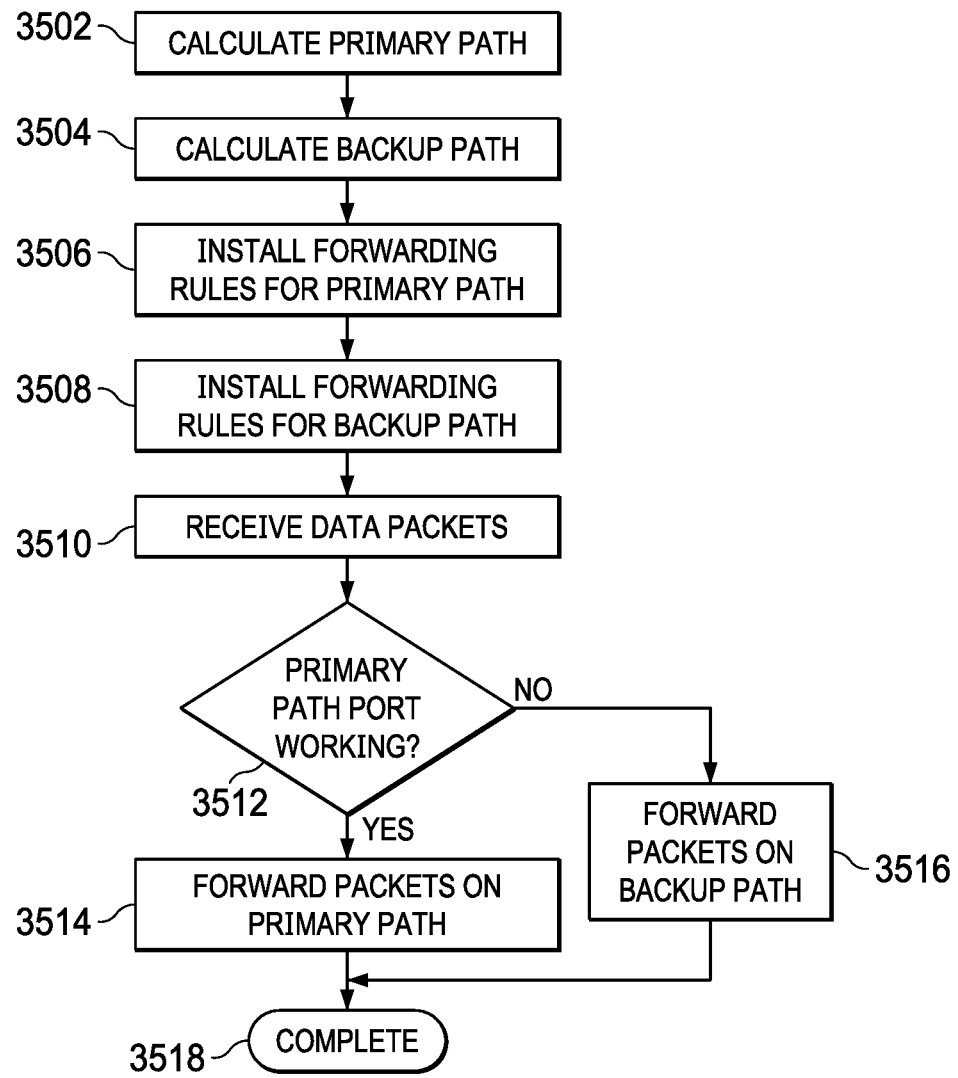
FIG. 35 illustrates a flow diagram describing the process for implementing SDN-based local repair.

Referring now to FIG. 35 there is illustrated the process for implementing SDN-based local repair. The process uses SDN to calculate a primary and a secondary path for small cell backhauling. SDN-based local repair is implemented using fast failover groups 3308 (FIG. 33). A primary and a secondary action are put into the same group. Consequently, the SDN controller calculates for each small cell a primary path at step 3502 towards the gateway. Additionally, the SDN controller calculates a backup path towards the gateway at step 3504. Based upon the path calculations, the SDN controller installs forwarding rules for the primary path at step 3506 into the fast failover group 3308 and will additionally install forwarding rules at step 3508 for the backup path into the fast failover group.

Once data packets arrive at a small cell node at step 3510 which should be forwarded to a neighboring small cell node using mmWave links, the data packets will be forwarded according to the first port in the fast failover group table whose port state is active. This requires an OpenFlow data path implementation which uses for each neighbor a dedicated OpenFlow port. Once the primary port is detected to be down, the data packets are automatically forwarded using the next active port, i.e. towards a different neighbor where there is an active backup link. Thus, a determination is made at inquiry step 3502 if the primary path is working. If so, control passes on to step 3514, and the packet is forwarded on the primary path. If inquiry step 3512 determines that the primary path is not working, the packet is forwarded on the backup path at step 3516. The process is then completed at step 3518. This process allows the small cell node to perform a local failover instead of the SDN controller performing a centralized failover. This significantly reduces the reaction time to failures in the mesh forwarding structure.

Figure 36:
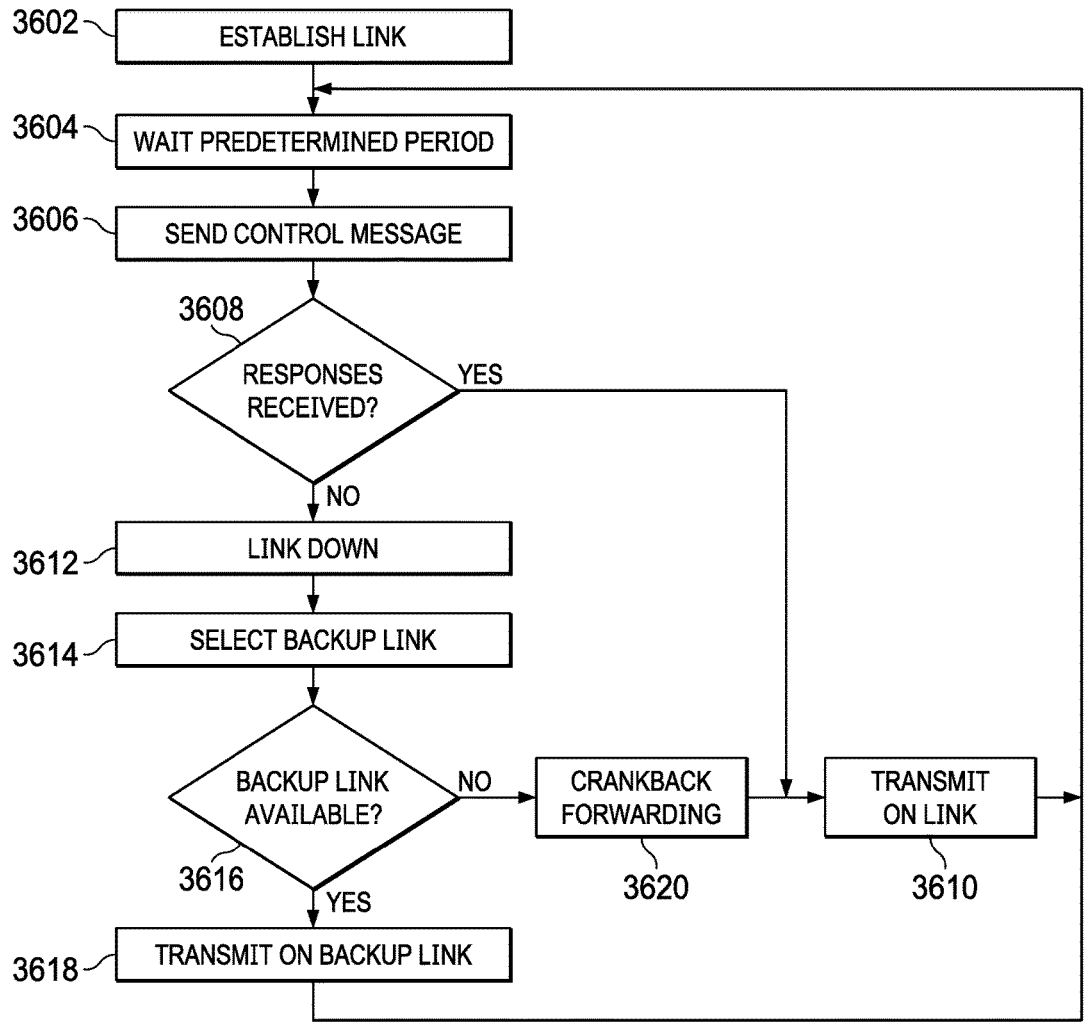
FIG. 36 illustrates a flow diagram describing the process for detecting link state and for the transmission on primary and backup links.

Referring now to FIG. 36, there is illustrated the process for detecting link state and transmitting on primary and backup links. In order to detect the link state, bidirectional forwarding detection (BFD) is a commonly used technology. BFD determines the state of the port by establishing a connection at step 3602 using a three-way handshake routine. BFD next waits a predetermined period of time at step 3604 and then transmits a periodic control message at step 3606. Inquiry step 3608 determines if a response to the control message has been received. The timeout period is determined by the control messages between the BFD messages. If a response to the control message is received, transmissions are carried out on the link at step 3610 and control passes back to step 3604 to await an additional predetermined period. If no response to the control message is received within a specified time interval, the link is considered down at step 3612. In this manner, link failures may be rapidly detected and reacted to. Consequently, small cell backhaul nodes would send periodic BFD messages to each neighboring backhaul node over the mmWave links to detect link states. Once BFD detects a link down event at inquiry step 3608, the link state is set to down at step 3612. This triggers the OpenFlow datapath to start transmitting to a different neighbor small cell. This is achieved by selecting a backup link at step 3614.

Alternatively, MAC layer protocol messages can be used in order to infer the state of the mmWave backhaul links, which could be integrated into the OpenFlow data path. The media access control (MAC) layer is a lower sublayer of the data link layer of the seven-layer OSI model. The Open Systems Interconnection model (OSI model) is a conceptual model that characterizes and standardizes the communication functions of a telecommunication or computing system without regard to their underlying internal structure and technology. Its goal is the interoperability of diverse communication systems with standard protocols. The model partitions a communication system into abstraction layers. The original version of the model defined seven layers.

A layer serves the layer above it and is served by the layer below it. For example, a layer that provides error-free communications across a network provides the path needed by applications above it, while it calls the next lower layer to send and receive packets that comprise the contents of that path. Two instances at the same layer are visualized as connected by a horizontal connection in that layer.

The MAC sublayer provides adderessing in channel access control mechanisms that make it possible for several terminals or network nodes to communicate with a multiple access network and incorporates a shared medium, e.g. an ethernet network. The hardware that implements the MAC is referred to as the media access controller. The MAC sublayer acts as the logical link controller (LLC) sublayer and the networks physical layer. The MAC layer emulates a full-duplex logical communication channel in a multipoint network. The channel may provide unicast, multicast or broadcast communication service.

A weakness with fast failover is that it can only perform local failover. If no alternative local path is available, e.g. all neighbors are not reachable anymore, then crankback routing must be performed. This requires that the packet be sent backwards toward the source to a small cell node which has an alternative active path towards the destination. Thus, crankback forwarding can potentially have large impacts on the latency. Such latency can be reduced significantly by introducing stateful forwarding in the data plane using OpenState. OpenState is a research effort focused in the development of a stateful data plane API for Software-Defined Networking. OpenState is more particularly described in the OpenState v1.0 specification. If packets arrive at a small cell forwarding node which does not have a next hop towards the destination node because the link is down, the node tags the packet and the packet is sent back towards the source. When the message reaches the small cell node having a backup path, the state of the forwarding rules change in such a way that the coming packet traverse the backup path already at the node. Therefore, once a backup link is selected at step 3614, inquiry step 3616 determines if the backup link is operating and available. If so, transmissions are carried out on the backup link at step 3618 and control passes back to step 3604. If the backup link is not available as determined at inquiry step 3616, the crankback forwarding process is carried out at step 3620 and transmissions carried out on allocated available link.

Figure 37:
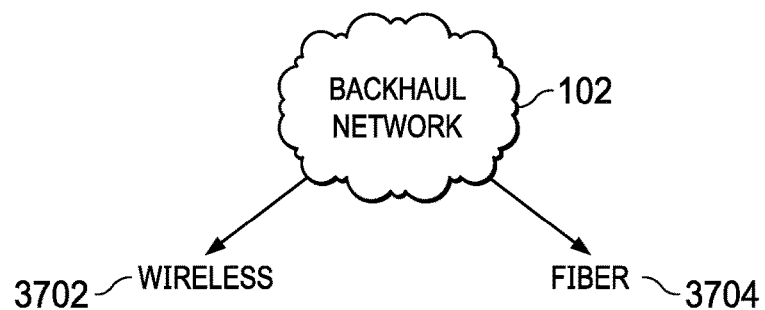
FIG. 37 illustrates the various portions making up a backhaul network.

As previously discussed with respect to FIG. 1, a network comprises an edge network 104 and core network 106 that are interconnected via a backhaul network 102. These networks comprise a variety of components of varying types that may be selected to configure these networks as will be more fully described hereinbelow. As illustrated in FIG. 37, the backhaul network 102 may comprise both a wireless portion 3702 and a fiber portion 3704.

Figure 38:
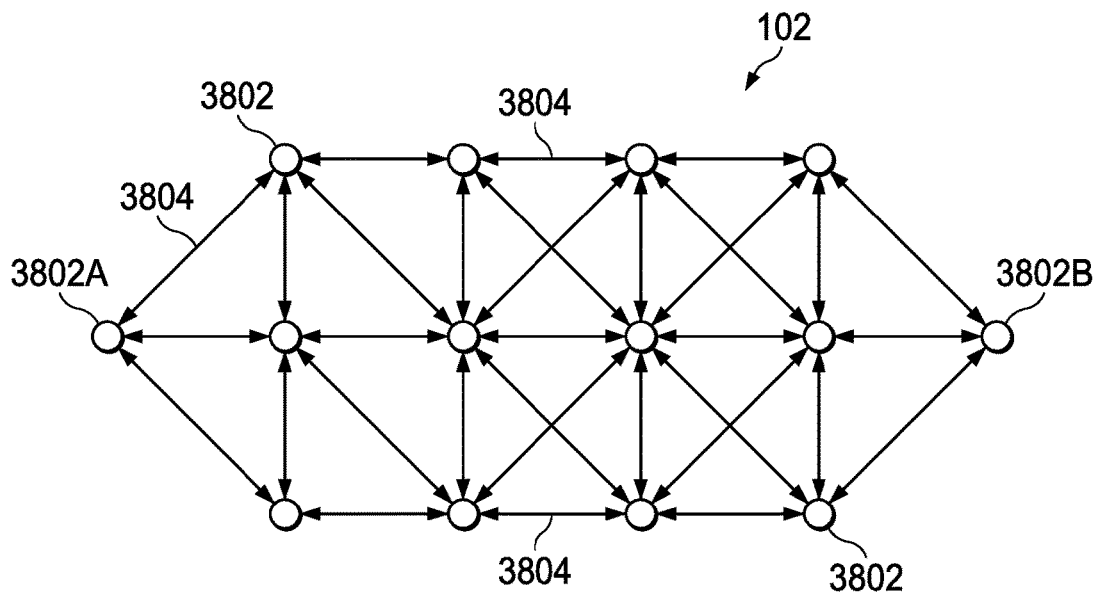
FIG. 38 illustrates a mesh backhaul network.

As shown in FIG. 38, the backhaul network 102 may comprise a mesh network consisting of a plurality of nodes 3802. Each of the nodes 3802 are interconnected via communications links 3804 to multiple other nodes 3804. In this manner, the communications from one node 3802 to another may be rerouted over a different communications link 3804 if a current communications link fails. This may occur in the manner similar to that discussed hereinabove. Thus, a signal could enter into the backhaul network 102 through node 3802A connect did to an edge network and transport the signal between various nodes to node 3802B connected to a core network 106.

Figure 39:
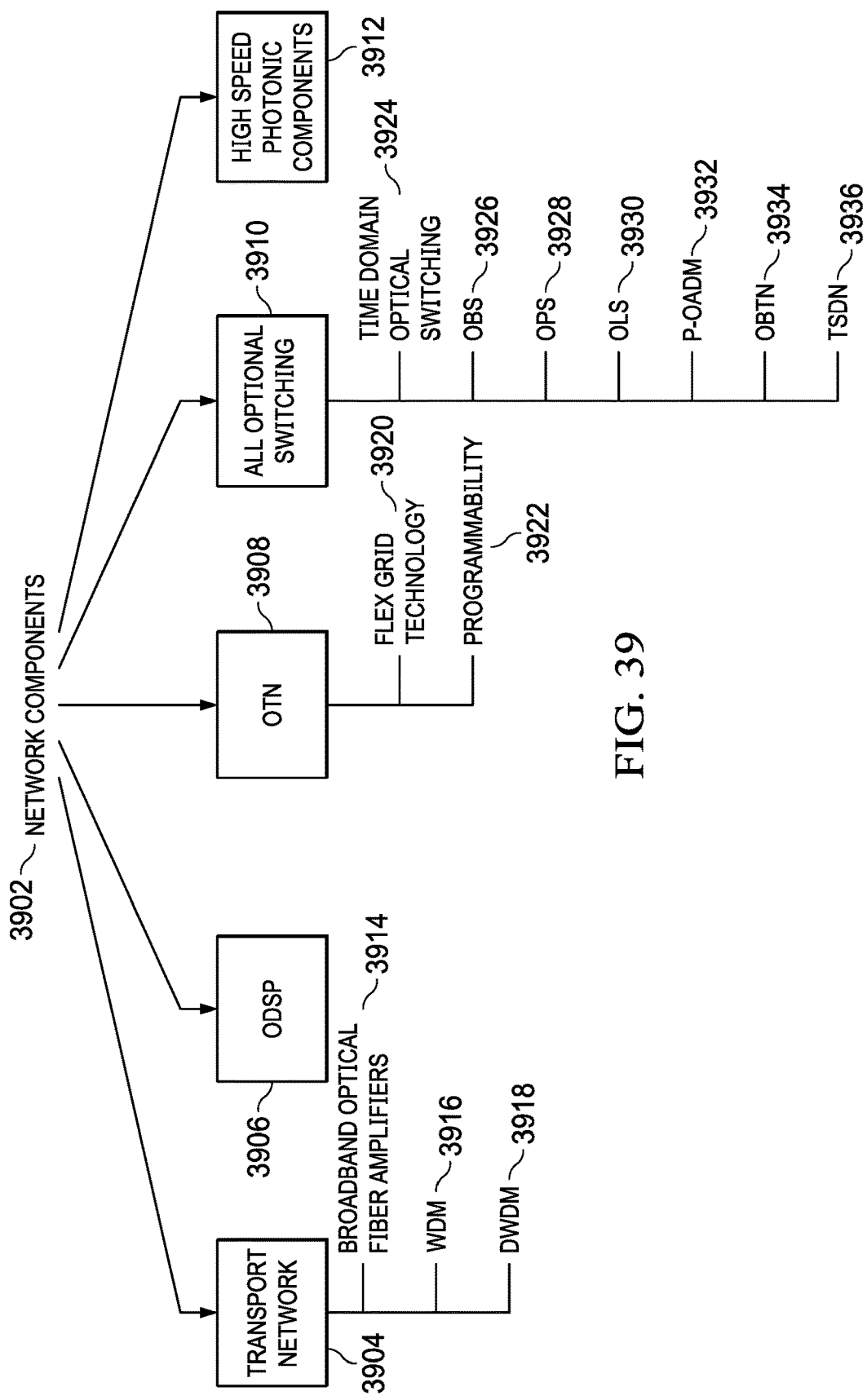
FIG. 39 illustrates various optical network components and functionalities.

The network components making up the nodes 3802 of the backhaul network 102 or the nodes making up the edge, core networks or other networks comprise a variety of components that must be selected and located within their respective networks. Referring now to FIG. 39, there is provided a general illustration of network components 3902. Network components include transport network 3904, coherent optical detection with DSP (ODSP) 3906, optical transport network (OTM) 3908, all optical switching 3910 and high-speed photonic components 3912. These provide examples of only some of the components available within an optical network providing backhaul, edge network services, core network or other network services and other types of components may of course be utilized.

Optical fiber transmission data rates within a single wavelength channel have increased from 2.5 Gb/s in 1985 to 400 Gb/s in 2015. This comprises a 160× increase over 30 years. The main technologies involved in this data rate increase include: high-speed electrical-optical modulation, high-speed optical detection, hard-decision forward error correction (HD-FEC), differential phase shift keying (DPSK), differential quadrature phase-shift keying (DQPSK), coherent detection based on optical digital signal processing (ODSP), soft-decision forward error correction (SD-FEC), polarization-division multiplexing (PDM), quadrature amplitude modulation (QAM), and faster-than-Nyquist (FTN) modulation and demodulation. With the development of superchannel technology, the channel data rate can increase to beyond 1 Tb/s.

The various network components 3902 of FIG. 39 include the transport system level and transport network 3904. The transport network 3904 includes a variety of implementations including broadband optical fiber amplifiers 3914. Broadband optical fiber amplifiers 3914 may include erbium-do fiber amplifiers (EDFA) Ramen amplifiers and Ramen amplifiers. The transport network 3904 may also include components for providing wavelength division multiplexing (WDM) 3916. Also included may be DWDM (dense wavelength division multiplexing) 3918. DWDM 3918 puts data from different sources together on an optical fiber, with each signal being carried at the same time on its own separate wavelength. With DWDM 3918 and other techniques, the single fiber transmission capacity of optical fiber communications have been increased from 2.5 Gb/s to 20 TB/s. This is provided an increase of 8000× over the last 30 years.

Another optical network technology implemented within the network components 3902 is coherent optical detection with DSP (ODSP) 3906. DPSK/DQPSK technology enabled 40 Gb/s data throughput. Today, in the 100 Gb/s transmission era, coherent optical technology is becoming the mainstream high-speed optical communication system. Currently, 100 Gb/s coherent detection transceivers are in large-scale deployment and 400 Gb/s coherent detection transceivers are commercially available. As the industry gradually advances toward 1 Tb/s and beyond, new technologies such as superchannel transmission, large-scale photonic integration, high-level QAM, and FTN are being introduced.

ODSP 3906 is a transport technology that marks the beginning of the digital era for the optical communication systems. ODSP 3906 is capable of compensating for chromatic dispersion, polarization rotation, polarization-mode dispersion, certain fiber nonlinear impairments and mitigating signal degradation due to bandwidth limitations of the transmitter and the receiver. Future ODSP promises even more with sub-10-nm or even sub-5-nm CMOS technologies, resource-intensive algorithms such as SD-FEC and new fiber nonlinearity compensation.

ODSP 3906 technology improves utilization of high-capacity optical transmission systems via adaptive modulation with variable modulation bandwidth and adjustable modulation formats. In flexible-grid WDM, channel spacing can be reduced from the typical 50 GHz to 37.5 GHz and 33.3 GHz, respectively increasing the number of C-band wavelength channels by 1.33 and 1.5 times to 128 and 144. For ODSP 3906 with 16-nm CMOS, which generally supports 100-Gb/s PDM-QPSK, 150-Gb/s PDM-8QAM, 200-Gb/s PDM-16QAM, and 400-Gb/s PDM-64QAM, the same hardware supports different transport distances and different modulation formats at different spectral efficiencies. When the transmitter and receiver both use ODSP 3906, the transceiver can be software-defined, and the flexible-grid WDM can be supported.

Another optical network technology 3902 comprises electrical layer optical transport network (OTN) scheduling 3908. The architectures of optical transport networks 3908 become more complex as optical technologies evolve. Optical transport network 3908 architectures include multiple RAN, mesh network topologies, optical switching between multiple fibers, etc. With the development of large-scale integrated circuits, electrical layer switching technology is ahead of optical switching, therefore making OTN 3908 possible with an optical network system based on electrical-layer switching. Since 2013, standards on "packet enhanced OTN" have uniformly incorporated SDH cross-connect, packet switching, and ODU switching into a packet enhanced OTN device. In the next few years, DC cloud services, 4K/8K video, and 5G services will become popular and traffic will grow exponentially over networks. Super-high granularity and arbitrary diversity will become a major feature of these services provided over the networks. Next-generation Ethernet services are driving the evolution towards beyond 100G OTN 3908. Currently, IEEE is leading standardization for 25GE, 50GE, 200GE, and 400GE Ethernet technologies, indicating the importance of high speed Ethernet interfaces for the future. Therefore future OTN 3908 has to have the capability of transporting high granularity services.

The types and speed of future services are diversified, which will require flexible OTN 3908. Future OTNs 3908 will be required to carry services greater than 100G. Changes in the optical layer Flex Grid technology 3920 are also driving the evolution of OTN 3908. The current light spectrum allocation of Flex Grid technology 3920 together with the fixed-line transmission rate of OTN 3908 is unable to take full advantage of the limited bandwidth of the optical spectrum. As Flex Grid technology 3920 matures, using technologies such as higher-order and multi-carrier modulation to achieve higher spectral efficiency can improve light spectrum resource utilization.

The future optical transport networks 3908 should be able to flexibly select the optical modulation mode, the size of the light spectrum, the number of carriers, and other parameters all based on the transmitted service traffic and the transmission distance to achieve the most optimized and efficient network configuration. OTNs 3908 need to provide flexible transmission rates and adapt to the evolution of the Flex Grid technology 3920 optical layer to meet the carrier's need for fine operation of optical spectrum bandwidth to maximize the bandwidth utilization of the network operators.

Another trend in OTN technology 3908 is programmability 3922. Operators want to provide ultra-wide pipelines and fast wavelength modulation capabilities to adapt and finely process services with better flexibility, provide more signal mapping control, and serve different operator, enterprise, and OTT customers using the same hardware platform. With increased programmability 3922, new services can be deployed as soon as possible and be gradually upgraded, without needing to wait for long cycles. Programmable OTN 3922 provides carriers with better control of the data plane, programmable client signal mapping, programmable multiplexing, and framing and overhead processing. Carriers can by themselves using programmable OTN to achieve new custom mapping methods and map existing or new client signals to ODUflex pipelines, and under the control of Openflow, achieve L1 and L2 to L7 layer traffic grooming. Programmable OTN 3922 can also select OTN functions based on customer needs more quickly thus simplifying the usage and maintenance of OTN 3908 without much cost. When the next generation of general-purpose processor becomes available, IT technology will expand into all OTN electrical layer processing and even ODSP 3906 processing will be softened. The processing unit of each electrical layer function will standardize and become universal, with the standardized interface of ROADM (reconfigurable optical add-drop multiplexer) devices and optical transmission equipment working together to enable multi-service hosting, grooming, and transmission capabilities on optical networks. With SDN/NFV, IT-based OTN will be possible.

Another network technology 3902 that may be implemented within optical networks comprises all optical switching 3910. Although OTN 3908 is evolving to support new networks, OTN has technological bottlenecks that are difficult to overcome. With the increase of OTN optical cross-connect (OXC) capacities, ODSP power consumption has increased proportionally. The only way to decrease power consumption is by reducing the manufacturing process of chips, for example by reducing from 16-nm technology to 10-nm technology. However, the increased level of integration for integrated circuits will reach its limits. A chip's cooling ability will become the ultimate restriction and the continued reduction of power consumption will become more difficult. The power consumption of future high capacity electrical cross-connects will become a big issue on the equipment room operations for carriers. Electrical switching requires O/E and E/O, which comes with high latency. Therefore, the industry has to transform from electrical switching to optical switching, or all-optical switching 3910.

The original plan for achieving all-optical cross-connect switching was by extending optical add-drop multiplexing (OADM) to reconfigurable OADM (ROADM). The wavelength switching industry's architecture evolved to a multi-dimensional ROADM (MD-ROADM) based on multiple 1×N wavelength selective switching (WSS) units. Each WSS unit connects with the local add-drop switching unit and engages in reconfigurable wavelength adding and dropping. Based on the different implementation methods of local add-drops, there can be colorless, directionless, and contentionless (CDC) characteristics. CDC-ROADMs have all three of these characteristics. Optical switching systems based on multiple 1×N WSS units are currently deployed. However, there are also serious problems with this solution. It requires multiple 1×N WSS modules, leading to high cost and high space usage (wasting sub-rack slots), and complex fiber optic interconnect between ports.

To address these issues, vendors have recently introduced a new technology, which takes N units of 1×N WSS units and integrates them into one N×N wavelength cross-connect unit (WXC). Also, the current CDC MD-ROADM architecture's add-drop side requires a large number of optical amplifiers and multicast switches (MCS), resulting in high costs and low performance of the optical signals. Some vendors are trying to replace all the optical amplifiers and the MCS structure with compact MxK WSS units, improving the cost-effectiveness, energy-efficiency, and affordability of CDC ROADM.

With better efficiency of the optical signal spectrum and use of optical switches 3910 in metro networks, there is a need for wavelength optical switching with finer granularity (to achieve ultra-dense wavelength switching network (UD-WSN). Multiple sub-channels within a 50-GHz channel slot can use a DSP-based single optical transceiver to transmit and receive. Denser and larger quantities of wavelength provisioning and switching will allow the amount of service access and direct optical layer switching of optical networks to increase due to upcoming 4K/8K video, 5G, virtual reality (VR) and augmented reality (AR), and other high-bandwidth and low-latency applications. 12.5-GHz granularity compares UDWSN with a common current wavelength-switching technique. Currently, major infrastructure vendors are focusing on CDC-ROADM development. There have been breakthroughs in a number of core technologies, which will become commercial. After the CDC-ROADM, all-optical cross-connects may continue to evolve towards an all-optical network. One trend is fine-grained and flexible bandwidth allocation. Currently, flexible and fine-grained optical switching 3910 has already been achieved in super-channel-based transmissions with a wavelength channel granularity of more than 50 GHz. Superchannel based electrical and optical layer scheduling can be used to further improve system spectrum utilization and system transmission capacity.

With better efficiency of the optical signal spectrum and use of optical switches 3910 in metro networks, there is a need for wavelength optical switching with finer granularity (to achieve ultra-dense wavelength switching network (UD-WSN). After the CDC ROADM, a time-domain optical switching technology 3924 is another potential evolutionary path, but there are many challenges. All-optical switching 3910 may implement a number of well-studied technologies including optical burst switching (OBS) 3926, optical packet switching (OPS) 3928, optical label switching (OLS) 2930 and others. Some of these technologies were introduced in the 1990s, but they have not been commercialized, mainly due to the lack of optical buffers and practical fast optical switching arrays. Therefore, in the interim, a simplified time-domain sub-channel granular optical switching technology will serve as a transitional technology from CDC ROADM, that includes packet OADM (P-OADM) 3932, optical burst transmission network (OBTN) 3934, time-shared optical network (TSON) 3936 and others. A simplified sub-channel time-domain optical switching technology will be implemented on all wavelengths with equally timed optical bursts that are time-aligned. This avoids the optical-domain alignment and scheduling for optical burst block, and easily achieves burst adding and dropping.

Another network technology 3902 comprises high-speed photonic components 3912. Optical component performance, design, and manufacturing are necessary for implementing high-performance optical communications systems, and are also the foundation of the optical communications industry. Optical components provide various functions and the implementation of these functions requires different materials. Traditional optical components, however, are composed of discrete parts. The manufacturing process of these parts is redundant and needs a lot of manual commissioning and verification, which is inefficient and costly, restricting the development of optical components.

Photonic integration technology, especially the silicon photonics technology that uses the large-scale semi-conductor manufacturing process (such as CMOS), requires low-cost materials (Si), but provides high production efficiency and high integration. The power consumption and volumes of the components using such technology account for less than 20% of traditional optical components. In recent years, the technology has been put into commercial use. Photonic integration technology was introduced in mid-1990s using silicon dioxide which increased the integration of original discrete parts. However, manufacturing of the integrated optical components was complex and costly. The industry needed a unified platform with higher integration and lower manufacturing costs to implement single slice integration and photonics integration. Fabless manufacturing (separation of design and manufacturing) of photonic components 3912 was implemented following the existing CMOS process, rather than the costly photonic component manufacturing process.

Also, silicon and silicon dioxide have a large refractive index difference, and silicon waveguides can implement submicron optical waveguides, reducing device scales and processing costs. Intel and Cornell have demonstrated GHz high-speed silicon photonic modulators based on the Mach-Zehnder interferometer structure and microring resonant cavity structure. Currently, silicon photonics technology has matured and been put into commercial use in optical communication systems. Silicon photonic 100 Gbit/s coherent optical modules represent the highest-level commercial application of silicon photonics technology available today. Silicon photonics technology is transforming the optical network industry from the discrete-component into an integrated-chip that supports automation and large-scale production. The influence of the technology is similar to the impact on the electronic circuit industry by the transformation from the electron tube to the transistor integrated circuit.

Silicon materials, however, are not the best choice. Graphene, a type of two-dimensional material, is currently used on photonic components. Compared with silicon, graphene can theoretically bring higher bandwidth, low drive voltage, and smaller dimensions. Also, the manufacturing of graphene components is compatible with the silicon-based CMOS process. Therefore, the current silicon photonics technology and process can be used for manufacturing graphene components. Using graphene materials in photonic components 3912 means combining the advantages of the two types of materials, implementing next-generation beyond-silicon photonics technology.

Additionally, silicon and silicon dioxide have a large refractive index difference, and silicon waveguides can implement submicron optical waveguides, reducing device scales and processing costs. In the future, silicon photonics technology working with graphene materials can achieve a number of components including: sophisticated optical switching, optical routing, optical logic, optical storage, optical signal processing and next-generation all-optical networks. When the manufacturing technology of photonic components makes progress like the microelectronic manufacturing technology, a new type of photonic component using photonic crystals and artificial materials will come into application in the near future. These components are much better in implementing a new optical mechanism and have the potential to change the component types and structures of existing optical networks and simplifying optical networks.

Various optimization techniques may be utilized. An effective hybrid technique may be used for optimizing multimodal functions in large scale global optimization (LSGO) that will pair the first search space exploration performed initially by standard techniques with more efficient local search techniques. Large scale global optimization (LSGO) is as important technique in large scale traffic networks. As dimensionality increases, the performance of most optimization algorithms quickly goes down. There are two major reasons for this decrease in performance. These are an increase of the complexity and an exponential increase of the search space volume. Due to the increase in complexity, unimodal functions may become multimodal in large dimensions. Due to the exponential increase of the search space volume, optimization algorithms need to increase their efficiency when exploring large search spaces. The efficiency can be measure by the number of function evaluations required to converge to a given optimum. In practice, many large-scale problems are multimodal.

In addition to the exponential increase in the number of candidate solutions, the cost of converging to any local optimum also increases. In high dimensional search spaces, we must focus almost exclusively on gradient exploitation in order to guarantee convergence to any local optima. However, disregarding exploration may lead to poor results in multimodal problems. In multimodal problems, it is critical to explore the search space to find the most promising regions before converging toward a local optima. Even in LSGO some exploration is necessary to achieve good performance on multimodal problems. There is a need to focus on minimum Population Search. The key idea behind the approach is to focus on multi-modal functions and to consider from the beginning the issues when scaling to large scale global optimization. This is done via an efficient use of function evaluations and an unbiased exploration.

In the current approach, search techniques focus more and more on gradient exploitation as dimensionality increases. So the primary focus is on hybrid techniques which will pair the full search space exploration performed initially by standard techniques with more efficient local search techniques. Therefore, an effective hybrid technique is used for optimizing multimodal functions in LSGO.

Minimum Population Search focuses on multi-modal functions. Originally the ideas were developed for two dimensional problems, later generalized for standard dimensions and scaled towards large scale problems. Standard techniques perform a methodical and unbiased exploration based on the Thresheld Convergence (TC) technique. Threshold Convergence is designed to avoid a biased exploration by preventing global and local search steps from happening at the same time. This is achieved by fixing a minimum search step (threshold) which decays as the search progresses. Convergence is thus "held" back until the last stages of the search process.

An iterative optimization procedures built around the concept of self-adaptation called Covariance Matrix Adaptation (CMA) with ($\mu$, A) selection considers the best $\mu$ solutions out of a population with A solutions for recombination. It is an iterative optimization procedures built around the concept of self-adaptation. The parameters of the search strategy evolve together with the solutions. CMA is an evolution strategy with ($\mu$, A) selection considers the best $\mu$ solutions out of a population with A solutions for recombination. Recombination operators then create a (single) parent representation from the $\mu$ selected solutions, and A new children are produced through the use of a probabilistic mutation distribution. CMA-ES (Evolutionary Strategy) uses parameterized multivariate normal distribution for the representation of the mutation distribution.

A hybrid method is used for the optimization of multi-modal problems by identifying promising attraction basins and finding the local optima in these basins. The optimization of multi-modal problems involves two tasks including the identifying promising attraction basins and finding the local optima in these basins. To effectively perform each of these tasks, different search strategies may be used. The hybrid technique of standard MPS takes care of this issue by assigning a different heuristics to each task. MPS's ability to efficiently explore the search space is used during the early stages to identify promising attraction basins.

The implementation and placement of the variety of optical network components described hereinabove greatly affects the implementation of the optical network. Optical networks supporting aggregation of heterogeneous networks at different aggregated bands (licensed, shared and unlicensed bands) will be diverse and with different applications (i.e. 4K/8K video traffic and AR/VR are sensitive to network latency, financial and industrial automation networks require high security, and cloud leased lines need to provide bandwidth on-demand). Some of these applications will be mission critical while others are for entertainment purposes.

Figure 40:
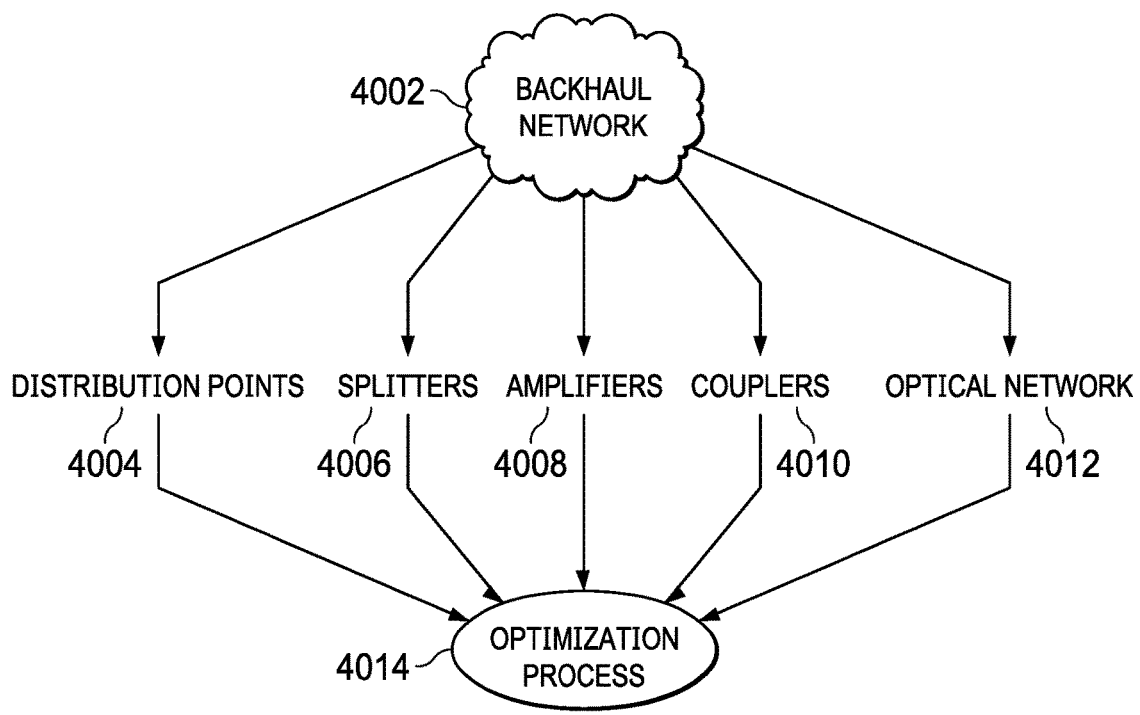
FIG. 40 illustrates the use of an optimization process for selection and placement of components within a backhaul network.

There is a need to optimally locate the poles that support small cells or massive MIMO in a wireless network at the nodes 3802 (FIG. 38). Once such optimal locations are identified, there is a need to provide a hybrid network and fiber backhaul to meet the requirements of the massive amount of traffic for different applications. This backhaul network could be a hybrid of wireless backhaul as well as fiber backhaul as shown in FIG. 37. As shown in FIG. 40, we can leverage the new technologies as described above using a hybrid network to build an optimal backhaul network 4002 with a unique topology and optimally locate the distribution points 4004, splitters 4006, amplifiers 4008, couplers 4010 and the entire optical network 4012 to reduce capex cost, the Opex and maintenance cost while improve reliability. This is accomplished using an optimization process 4014, one example of which will be described hereinbelow. The above components are only some examples of the items that can be optimized for network and any of those components described hereinabove may be optimized to provide the optimize network which may be a backhaul network, edge network, core network or combination thereof.

The wireless backhaul 4002 would be an SDR (software defined radio), SDN (software defined network) and SON (self-organizing network) based mesh network as described above that would include Point-to-Point (P2P), Point-to-Multipoint (P2MP) as well as coordinated multipoint (COMP) massive MIMO multiple beamforming capabilities to construct the mesh network. COMP is a technology that sends and receives signals from multiple sectors or cells to a given UE. By coordinating transmission among multiple cells, interference from other cells can be reduced and the power of the desired signal can be increased. MIMO is a signal transmission technology that uses multiple antennas at both the transmitter and the receiver to perform spatial multiplexing and improve communication quality and spectral efficiency. In this manner if a link is broken, the system would repair itself automatically and self-optimize automatically. The fiber network portion of the network 4002 would include sophisticated topologies (i.e. star, bus, ring, etc.) augmenting existing (ATM/Ethernet/SONET/IP) with GPON/EPON/NGPON-2 supporting different protection methods (1+1, 1:N), number of channels (DWDM) and failover techniques with single hop or multi-hop configurations.

Figure 41:
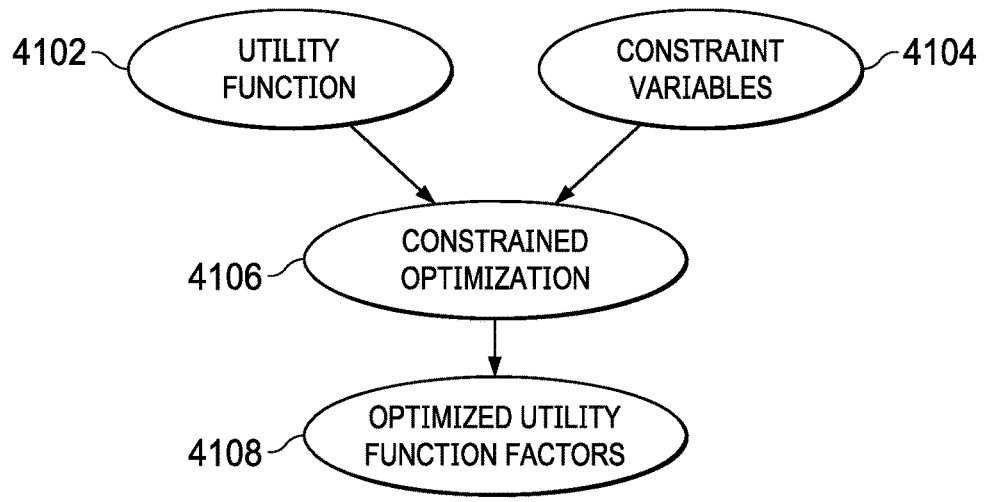
FIG. 41 illustrates a manner for using a constrained optimization process for optimizing utility function factors based upon constraint variables.

Referring now to FIG. 41, there is illustrated the general implementation of an optimization process 4014. The particular process relates to constrained optimization using Lagrange multipliers. However, it should be realized that other types of constrained optimization processes may be utilized. The process involves the determination of a utility function illustrating the various components and placements thereof within an optical network. This type of information may be developed using the for example system data and marketing data. The utility function data and associated variables may comprise things such as the distribution points 4004, splitters 4006, amplifiers 4008, couplers 4010, optical network 4012 and all of the other various network components described hereinabove. The utility functions 4102 are combined with a number of constraint variables 4104 that limit component selection and placement within the optical network. The constraint variables 4104 may comprise any number of variables but examples of these include network nodes providing point to point, point to multipoint and massive MIMO multiple beamforming. The topology used to implement the node network such as star, bus, ring, etc. The augmenting of existing systems such as ATM, ethernet, SONET and IP systems may comprise another type of constraint variable. The different protection methods, such as one +1, one: N, number of channels in failover techniques with single hop or multi-hop configurations make comprise other types of constraint variables.

The determined utility function 4102 and constraint variables 4104 are combined and have a constrained optimization process 4106 applied thereto. Constrained optimization comprises a mathematical optimization process for optimizing the utility function 4102 with respect to the constraint variables in the presence of constraints on these constraint variables 4104. The utility function 4102 is either a cost function, energy function, placement function or other type or combination of functions relating to the optical network which is to be minimized. Constraint variables 4104 can either be hard constraints, which set conditions for the variables that are required to be satisfied, or soft constraints, which have some variable values that are utilized in the utility function 4102 if the conditions of the constraint variables 4104 are not satisfied. Responsive to the application of the constrained optimization process 4106, a number of optimized utility function factors 4108 are generated indicating things such as component types, component placement, node placement, etc. within the optical network.

Figure 42:
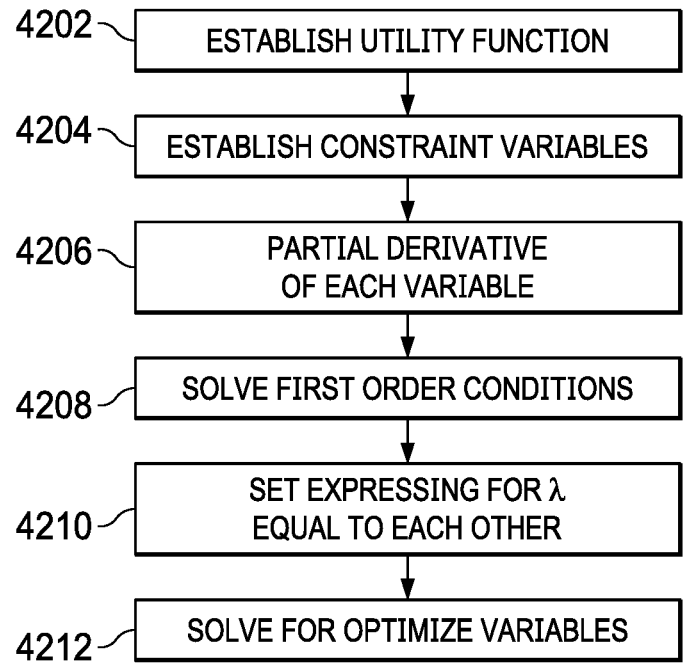
FIG. 42 is a flow diagram illustrating the process for executing a constrained optimization process.

FIG. 42 illustrates a flow diagram of the constrained optimization process 4106. First, the utility function is established at step 4202. In one example, the utility function can be represented by $f(x,y)$ which is the function to be maximized. While the example of $f(x,y)$ comprises only a two variable function, it will be appreciated that any number of variables may be utilized within the utility function with the greater number of variables merely increasing the complexity of the equation. This enables multidimensional space and distance determinations to be defined by the utility function. Next, the constraint variables are established at step 4202. The constraint variables represent a restriction or series of restrictions on the utility function defining the optical network. The constraint variables may be represented by $g(x,y)$. As noted previously the constraint expression may also have more than two variables. Thus, the overall constrained optimization expression (Lagrange Function) would then be represented by the equation:

$$l(x,y)=f(x,y)+\lambda g(x,y)$$

where $\lambda$ is a Lagrangian multiplier.

At step 4206, a partial derivative is taken with respect to each variable in the equation. Thus in the above example, a partial derivative would be taken of both x and y. The x and y variables are the factors that are being maximized by this process. In order to take the partial derivative each of the variables are set equal to zero.

$$\frac{d}{dx}l(x,y) = \frac{d}{dx}f(x,y) + \lambda\frac{d}{dx}g(x,y) = 0$$

$$\frac{d}{dy}l(x,y) = \frac{d}{dy}f(x,y) + \lambda\frac{d}{dy}g(x,y) = 0$$

The first-order conditions for $\lambda$ are solved for at step 4208. The expressions for $\lambda$ are set equal to each other at step 4210 to determine the constraint relationship between the constraint variables. The optimized constraint variables may then be used to solve for the optical network variables separately at step 4212.

Figure 43:
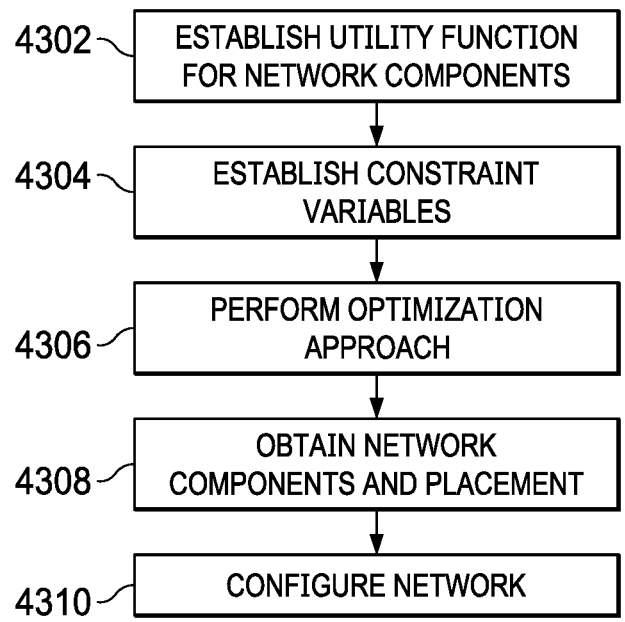
FIG. 43 is a flow diagram illustrating the implementation of a constrained optimization process within an optical/broadband communications network.

Described more particularly with respect to the optical network as described herein, FIG. 43 illustrates a flow diagram describing the optimization process with respect to an optical network. The utility function for the optical network selection of and placement of components is established at step 4302. This would involve the selection and placement of distribution points 4004, splitters 4006, amplifiers 40 await, couplers 4010 and other optical network pieces as described hereinabove. The particular constraint variables most relevant to optimization of the network that reduces capital expenditures and improves system reliability are selected at step 4304. The optimization analysis is then performed at step 4306 based upon the established utility function and constraint variables using, for example, Lagrangian optimization as described hereinabove. While the present example has described the use of Lagrangian optimization, other optimization processes for minimizing capital expenditures and improving system reliability they also be utilized. Responsive to the optimization analysis at step 4306, the needed network components and placement are obtained at step 4308. Based upon this information, the optical network may be configured according to the established parameters at step 4310.

Using the above described system, network nodes and components may be ideally established based upon the system resources and characteristics. This will enable the minimization of capital expenses by the network providers while improving overall system reliability.

It will be appreciated by those skilled in the art having the benefit of this disclosure that a system and method providing network optimization for broadband networks provides an improved manner of selecting and placing network components to minimize capital expenditures while maximizing system reliability. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for generating a backhaul network, comprising:
   providing at least two of a distribution point, a splitter, an amplifier, a coupler and an optical network for use within a backhaul network;
   selecting predetermined locations for the at least two of the distribution point, the splitter, the amplifier, the coupler and the optical network within the backhaul network based upon a constrained optimization process that reduces cost and improves backhaul network reliability;
   configuring the backhaul network by locating the at least two of the distribution point, the splitter, the amplifier, the coupler and the optical network within the backhaul network at the selected predetermined locations, wherein each of the at least two of the distribution point, the splitter, the amplifier, the coupler and the optical network are located at one of the predetermined locations; and
   transmitting and receiving data using the backhaul network having at least two of the distribution point, the splitter, the amplifier, the coupler and the optical network located at one of the predetermined locations.

2. The method of claim 1, wherein the step of selecting further comprises:
   establishing a utility function defining a placement of the predetermined locations of components for the backhaul network;
   establishing constraint variables defining the placement of the predetermined locations of the components of the backhaul network;
   generating a constrained optimization equation based upon the established utility function and the established constraint variables; and
   performing the constrained optimization process that reduces cost and improves the backhaul network reliability using the constrained optimization equation defined by the established utility function and the established constraint variables.

3. The method of claim 2, wherein the step of performing the constrained optimization process further comprises:
   performing a partial derivative for each variable of the constrained optimization equation;
   solving first order conditions of each determined partial derivative;
   setting expressions for $\lambda$ equal to each other; and
   solving for optimized variables.

4. The method of claim 1, wherein backhaul network includes a fiber network configured in at least one of a star, bus or ring topology.

5. The method of claim 1, wherein the backhaul network includes a wireless network including a SDR (software defined radio), SDN (software defined network) and SON (self-organizing network) based mesh network.

6. The method of claim 1 further including providing at least one software defined transceiver using coherent optical detection with DSP (ODSP) for use within the backhaul network.

7. The method of claim 6 further including using flexible grid WDM (wavelength division multiplexing) to reduce channel spacing below 50 GHz within the at least one software defined transceiver.

8. The method of claim 1, wherein the optical network further uses silicon photonics technology using graphene material to enable optical switching, optical routing, optical logic, optical storage and optical signal processing.

9. The method of claim 1, wherein the optical network comprises a simplified time-domain sub-channel granular optical switching technology as a transitional technology from CDC-ROADM(colorless, directionless, and contentionless-reconfigurable optical add-drop multiplexer).

10. The method of claim 1, wherein the optical network comprises an optical transport network (OTN) providing a flexible transmission rate and maximizing bandwidth utilization of network components.

11. A backhaul network, comprising:
    at least two of a distribution point, a splitter, an amplifier, a coupler and an optical network for use within the backhaul network;
    wherein predetermined locations are selected for the at least two of the distribution point, the splitter, the amplifier, the coupler and the optical network within the backhaul network based upon a constrained optimization process that reduces cost and improves backhaul network reliability;
    wherein each of the at least two of the distribution point, the splitter, the amplifier, the coupler and the optical network are located at one of the predetermined locations from the constrained optimization process; and
    wherein the backhaul network transmits and receives data using the backhaul network having at least two of the distribution point, the splitter, the amplifier, the coupler and the optical network located at one of the predetermined locations.

12. The backhaul network of claim 11, wherein the constrained optimization process further comprises:
    an established utility function defining a placement of the predetermined locations of components for the backhaul network;
    established constraint variables defining the placement of the predetermined locations of the components of the backhaul network; and
    a constrained optimization equation based upon the established utility function and the established constraint variables.

13. The backhaul network of claim 12, wherein the constrained optimization process further comprises:

performing a partial derivative for each variable of the constrained optimization equation;
solving first order conditions of each determined partial derivative;
setting expressions for λ equal to each other; and
solving for optimized variables.

14. The backhaul network of claim 11, wherein backhaul network includes a fiber network configured in at least one of a star, bus or ring topology.

15. The backhaul network of claim 11, wherein the backhaul network includes a wireless network including a SDR (software defined radio), SDN (software defined network) and SON (self-organizing network) based mesh network.

16. The backhaul network of claim 11 further including at least one software defined transceiver using coherent optical detection with DSP (ODSP) for use within the backhaul network.

17. The backhaul network of claim 16 further including a processor implementing flexible grid WDM (wavelength division multiplexing) to reduce channel spacing below 50 GHz within the at least one software defined transceiver.

18. The backhaul network of claim 11, wherein the optical network further uses silicon photonics technology using graphene material to enable optical switching, optical routing, optical logic, optical storage and optical signal processing.

19. The backhaul network of claim 11, wherein the optical network comprises a simplified time-domain sub-channel granular optical switching technology as a transitional technology from CDC-ROADM(colorless, directionless, and contentionless-reconfigurable optical add-drop multiplexer).

20. The backhaul network of claim 11, wherein the optical network comprise an optical transport network (OTN) providing a flexible transmission rate and maximizing bandwidth utilization of network components.

21. A backhaul network, comprising:
a wireless network including a plurality of SDRs (software defined radios), SDN (software defined network) and SON (self-organizing network) based mesh network;
at least two of a distribution point, a splitter, an amplifier, a coupler and an optical network for use within the backhaul network;
wherein predetermined locations are selected for the at least two of the distribution point, the splitter, the amplifier, the coupler and the optical network within the backhaul network based upon a constrained optimization process that reduces cost and improves backhaul network reliability;
wherein the constrained optimization process further comprises:
an established utility function defining a placement of the predetermined locations of components for the backhaul network;
established constraint variables defining the placement of the predetermined locations of the components of the backhaul network;
a constrained optimization equation based upon the established utility function and the established constraint variables;
wherein each of the at least two of the distribution point, the splitter, the amplifier, the coupler and the optical network are located at one of the predetermined locations from the constrained optimization process; and
wherein the backhaul network transmits and receives data using the backhaul network having at least two of the distribution point, the splitter, the amplifier, the coupler and the optical network located at one of the predetermined locations.

22. The backhaul network of claim 21, wherein the constrained optimization process further comprises:
performing a partial derivative for each variable of the constrained optimization equation;
solving first order conditions of each determined partial derivative;
setting expressions for λ equal to each other; and
solving for optimized variables.

23. The backhaul network of claim 21, wherein backhaul network includes a fiber network configured in at least one of a star, bus or ring topology.

24. The backhaul network of claim 21, wherein the plurality of SDRs use coherent optical detection with DSP (ODSP) for use within the backhaul network.

25. The backhaul network of claim 24 further including a processor implementing flexible grid WDM (wavelength division multiplexing) to reduce channel spacing below 50 GHz within at least one software defined radio.

26. The backhaul network of claim 21, wherein the optical network further uses silicon photonics technology using graphene material to enable optical switching, optical routing, optical logic, optical storage and optical signal processing.

27. The backhaul network of claim 21, wherein the optical network comprises a simplified time-domain sub-channel granular optical switching technology as a transitional technology from CDC-ROADM(colorless, directionless, and contentionless-reconfigurable optical add-drop multiplexer).

28. The backhaul network of claim 21, wherein the optical network comprise an optical transport network (OTN) providing a flexible transmission rate and maximizing bandwidth utilization of network components.

29. A method for generating a backhaul network, comprising:
providing at least two of a distribution point, a splitter, an amplifier, a coupler and an optical network for use within the backhaul network;
establishing a utility function defining a placement of predetermined locations of the components for the backhaul network;
establishing constraint variables defining placement of the predetermined locations of components of the backhaul network;
generating a constrained optimization equation based upon the established utility function and the established constraint variables;
performing a constrained optimization process that reduces cost and improves backhaul network reliability using the constrained optimization equation defined by the established utility function and the established constraint variables;
selecting predetermined locations for the at least two of the distribution point, the splitter, the amplifier, the coupler and the optical network within the backhaul network based upon the constrained optimization process;
configuring the backhaul network by locating the at least two of the distribution point, the splitter, the amplifier, the coupler and the optical network within the backhaul network at the selected predetermined locations, wherein each of the at least two of the distribution point, the splitter, the amplifier, the coupler and the optical network are located at one of the predetermined locations; and transmitting and receiving data using the backhaul network having at least two of the distribution point, the splitter, the amplifier, the coupler and the optical network located at one of the predetermined locations.

30. The method of claim 29, wherein the step of performing the constrained optimization process further comprises:
performing a partial derivative for each variable of the constrained optimization equation;
solving first order conditions of each determined partial derivative;
setting expressions for $\lambda$ equal to each other; and
solving for optimized variables.

* * * * *